US012719151B2

(12) United States Patent
Jung et al.

(10) Patent No.: US 12,719,151 B2
(45) Date of Patent: Aug. 25, 2026

(54) ANTENNA MODULE DISPOSED IN VEHICLE

(71) Applicant: LG ELECTRONICS INC., Seoul (KR)

(72) Inventors: Kangjae Jung, Seoul (KR); Byeongyong Park, Seoul (KR); Soyeon Lee, Seoul (KR); Dongjin Kim, Seoul (KR); Kukheon Choi, Seoul (KR); Ilnam Cho, Seoul (KR); Byungwoon Jung, Seoul (KR); Uisheon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 33 days.

(21) Appl. No.: 18/993,978

(22) PCT Filed: Jul. 13, 2022

(86) PCT No.: PCT/KR2022/010223

§ 371 (c)(1),
(2) Date: Jan. 13, 2025

(87) PCT Pub. No.: WO2024/014572

PCT Pub. Date: Jan. 18, 2024

(65) Prior Publication Data

US 2026/0018778 A1 Jan. 15, 2026

(51) Int. Cl.
*H01Q 1/12* (2006.01)
*H01Q 13/00* (2006.01)

(52) U.S. Cl.
CPC ........... *H01Q 1/1271* (2013.01); *H01Q 13/00* (2013.01)

(58) Field of Classification Search
CPC ......... H01Q 1/12; H01Q 1/1271; H01Q 13/00
See application file for complete search history.

(56) References Cited

U.S. PATENT DOCUMENTS

2018/0151939 A1* 5/2018 Hashimoto .......... H01Q 1/1271

FOREIGN PATENT DOCUMENTS

| | | |
|---|---|---|
| JP | 2020-162120 | 10/2020 |
| KR | 10-2007-0089650 | 8/2007 |

(Continued)

OTHER PUBLICATIONS

European Patent Office Application Serial No. 22951227.2, Search Report dated Jul. 8, 2025, 8 pages.

(Continued)

*Primary Examiner* — Jimmy T Vu
(74) *Attorney, Agent, or Firm* — LEE, HONG, DEGERMAN, KANG & WAIMEY

(57) ABSTRACT

A vehicle comprises: a glass panel; an antenna assembly disposed on the glass panel; a dielectric substrate; a first region having conductive patterns on one side of the dielectric substrate and including antenna elements configured to radiate radio signals; and a second region including ground conductive patterns and feed patterns. The antenna elements may include: a first radiation structure including a first conductive pattern, a second conductive pattern, and a third conductive pattern; and a second radiation structure including a fourth conductive pattern, a fifth conductive pattern, and a sixth conductive pattern. The size of the second conductive pattern may be smaller than that of the third conductive pattern. The third conductive pattern may face the sixth conductive pattern.

15 Claims, 46 Drawing Sheets

(56) References Cited

FOREIGN PATENT DOCUMENTS

| | | |
|---|---|---|
| KR | 10-2021-0126778 | 10/2021 |
| WO | 2021-256589 | 12/2021 |
| WO | 2022-004913 | 1/2022 |
| WO | 2022-075587 | 4/2022 |

OTHER PUBLICATIONS

Hussein et al., "New broadband L-shaped CPW-fed circularly polarized monopole antenna with asymmetric modified ground plane and a couple series-aligning inverted L-shaped strip," AEU—International Journal of Electronics and Communications, Feb. 2020, 9 pages.

PCT International Application No. PCT/KR2022/010223, International Search Report dated Apr. 11, 2023, 4 pages.

* cited by examiner (a)

(b)

(c)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

ANTENNA MODULE DISPOSED IN VEHICLE

CROSS-REFERENCE TO RELATED APPLICATION

This application is the National Stage filing under 35 U.S.C. 371 of International Application No. PCT/KR2022/010223, filed on Jul. 13, 2022, the contents of which are hereby incorporated by reference herein its entirety.

TECHNICAL FIELD

The present specification relates to a transparent antenna disposed in a vehicle. One specific implementation relates to an antenna assembly made of a transparent material to suppress an antenna region from being visible on vehicle glass.

BACKGROUND ART

A vehicle may perform wireless communication services with other vehicles, nearby objects, infrastructures, or a base station. In this regard, various communication services may be provided through a wireless communication system to which an LTE communication technology or a 5G communication technology is applied. Meanwhile, some of LTE frequency bands may be allocated for 5G communication services.

Meanwhile, a vehicle body and a vehicle roof are formed of a metallic material, which causes a problem of blocking radio waves. Accordingly, a separate antenna structure may be arranged on top of the vehicle body or roof. Alternatively, when the antenna structure is arranged below the vehicle body or roof, a portion of the vehicle body or roof corresponding to an antenna arrangement region may be formed of a non-metallic material.

However, in terms of design, the vehicle body or roof needs to be integrally formed. In this instance, the exterior of the vehicle body or roof may be formed of a metallic material. This may cause antenna efficiency to be drastically lowered due to the vehicle body or roof.

In relation to this, to increase communication capacity without a change in the exterior design of the vehicle, a transparent antenna may be arranged on glass corresponding to a window of the vehicle. However, antenna radiation efficiency and impedance bandwidth characteristics are deteriorated due to electrical loss of the transparent antenna.

When an antenna pattern is formed with a metal mesh structure in which metal lines are interconnected on a dielectric substrate, a transparent antenna from which the metal lines are not visually distinguishable may be implemented. However, when the metal mesh structure is not formed in a dielectric region surrounding an antenna region where the antenna pattern is formed, there is a problem in that the antenna region and the dielectric region are visually distinguished, causing a difference in visibility.

To solve the problem, dummy mesh grids may be arranged even in the dielectric region, but as the dummy mesh grids are arranged, interference occurs between the dummy mesh grids and the antenna pattern, causing a problem in that antenna performance degrades.

Meanwhile, when a transparent antenna is arranged on vehicle glass, a transparent antenna pattern may be electrically connected to a feeding pattern arranged on a separate dielectric substrate. In this regard, feed loss and antenna performance degradation may occur due to the connection between the transparent antenna pattern and the feeding pattern. In addition, a difference in transparency may occur between a transparent region where the transparent antenna pattern is formed and an opaque region where the feeding pattern is formed. Due to the difference in transparency, the region where the antenna is arranged may be visually distinguished from other regions. A method is needed to minimize a difference in visibility between the antenna region and the other regions in the vehicle glass, in spite of the difference in transparency.

DISCLOSURE OF INVENTION

Technical Problem

One or more embodiments of the specification are directed to solving the aforementioned problems and other drawbacks. Another aspect of the specification is to provide a broadband transparent antenna assembly that may be arranged on vehicle glass.

Another aspect of the specification is to improve antenna efficiency of a broadband transparent antenna assembly that may be arranged on vehicle glass.

Another aspect of the specification is to improve isolation characteristics between first and second radiation structures.

Another aspect of the specification is to perform multi-input/multi-output (MIMO) operation with improved isolation characteristics for each of a plurality of frequency bands.

Another aspect of the specification is to provide a broadband antenna structure made of a transparent material, which is capable of reducing feeding loss and improving antenna efficiency while operating in a wide band.

Another aspect of the specification is to improve the efficiency of a feeding structure of a broadband transparent antenna assembly that may be arranged on vehicle glass, and secure the reliability of a mechanical structure including the feeding structure.

Another aspect of the specification is to minimize interference between a dummy mesh grid arranged in a dielectric region and an antenna region.

Another aspect of the specification is to ensure invisibility of a transparent antenna and an antenna assembly including the same without deterioration of antenna performance.

Another aspect of the specification is to ensure both invisibility of a shape of an antenna assembly and invisibility when the antenna assembly is attached to a display or glass.

Another aspect of the specification is to improve visibility of a transparent antenna, without deterioration of antenna performance, through an optimal design of a dummy pattern having an open region.

Solution to Problem

According to one aspect of the disclosure for achieving the above or other purposes, there is provided a vehicle including: a glass panel; an antenna assembly arranged on the glass panel; a dielectric substrate; a first region including antenna elements having conductive patterns on one side of the dielectric substrate and configured to radiate radio signals; and a second region including ground conductive patterns and feeding patterns. Each of the antenna elements may include: a first radiation structure including a first conductive pattern, a second conductive pattern, and a third conductive pattern, and a second radiation structure including a fourth conductive pattern, a fifth conductive pattern, and a sixth conductive pattern. A size of the second conductive pattern may be smaller than that of the third conductive pattern. The third conductive pattern may oppose the sixth conductive pattern.

In an embodiment, the first radiation structure may include a first conductive pattern including a first part and a second part, the first part being perpendicularly connected to the second part, the second part being electrically connected to a first feeding pattern; a second conductive pattern electrically connected to a first part of a first ground conductive pattern; and a third conductive pattern electrically connected to a second part of the first ground conductive pattern. The second conductive pattern may be arranged between the first part of the first conductive pattern and the first ground conductive pattern, and the first part of the first conductive pattern and the third conductive pattern may be arranged on opposite sides with respect to the second part of the first conductive pattern.

In an embodiment, the second radiation structure may include a fourth conductive pattern including a third part and a fourth part, the third part being vertically connected to the fourth part, and the fourth part being electrically connected to a second feeding pattern; a fifth conductive pattern electrically connected to a first part of a second ground conductive pattern; and a sixth conductive pattern electrically connected to a second part of the second ground conductive pattern. The fifth conductive pattern may be arranged between the third part of the fourth conductive pattern and the second ground conductive pattern, and the third part of the fourth conductive pattern and the sixth conductive pattern may be arranged on opposite sides with respect to the fourth part of the fourth conductive pattern.

In an embodiment, the glass panel may include a plurality of heat line patterns. One of the plurality of heat line patterns may be spaced apart from the antenna elements by a first gap.

In an embodiment, the third conductive pattern may be spaced apart from the sixth conductive pattern by a second gap.

In an embodiment, a horizontal length of the first ground conductive pattern may be shorter than a horizontal length from the first conductive pattern to the third conductive pattern. A vertical length of the first ground conductive pattern may be shorter than a vertical length from the first conductive pattern.

In an embodiment, the first conductive pattern and the third conductive pattern may operate in a first dipole antenna mode in a first frequency band. The first conductive pattern and the third conductive pattern may form an asymmetrical structure. The fourth conductive pattern and the sixth conductive pattern may operate in a second dipole antenna mode in the first frequency band. The fourth conductive pattern and the sixth conductive pattern may form an asymmetrical structure.

In an embodiment, the first conductive pattern may operate in a first monopole antenna mode in a second frequency band. The fourth conductive pattern may operate in a second monopole antenna mode in the second frequency band. The second frequency band may be higher than the first frequency band.

In an embodiment, the second conductive pattern may operate in a third frequency band. The fifth conductive pattern may operate in the third frequency band. The third frequency band may be higher than the second frequency band.

In an embodiment, a first boundary side of the first part of the first conductive pattern may have a first step structure. A second boundary side of the first part of the first conductive pattern may have a second step structure, and the second step structure may have a different shape from the first step structure. A third boundary side of the first part of the first conductive pattern may be arranged between a first end of the first boundary side of the first part of the first conductive pattern and a first end of the second boundary side of the first part of the first conductive pattern. A fourth boundary side of the first part of the first conductive pattern may be arranged between a second end of the first boundary side of the first part of the first conductive pattern and a second end of the second boundary side of the first part of the first conductive pattern.

In an embodiment, a portion of the first boundary side of the first part of the first conductive pattern may oppose a first boundary side of the second conductive pattern. A portion of the first boundary side of the second part of the first conductive pattern may oppose a second boundary side of the second conductive pattern.

In an embodiment, a first boundary side of the third conductive pattern may have a third step structure. A first end of the first boundary side of the third conductive pattern may be connected to the second part of the ground conductive pattern. A second boundary side of the third conductive pattern may be arranged on an opposite side to the first boundary side of the third conductive pattern. A third boundary side of the third conductive pattern may be arranged between a first end of the first boundary side of the third conductive pattern and a first end of the second boundary side of the third conductive pattern. A fourth boundary side of the third conductive pattern may be arranged between a second end of the first boundary side of the third conductive pattern and a second end of the second boundary side of the third conductive pattern. The third boundary side of the third conductive pattern may be arranged on an opposite side to the fourth boundary side of the fourth conductive pattern. A portion of the second part of the first conductive pattern may oppose the fourth boundary side of the third conductive pattern.

In an embodiment, a length of the third boundary side of the third conductive pattern may be equal to a length of the third boundary side of the first conductive pattern.

In an embodiment, the first part of the second region may include a first slot. A length of the first slot may be in a range of $\lambda/2$ to $\lambda$, and an open region of the first slot may oppose the feeding patterns.

In an embodiment, the second part of the second region may include a second slot. A length of the second slot may be in a range of $\lambda/2$ to $\lambda$, and an open area of the second slot may oppose the first region.

In an embodiment, the first conductive pattern, the second conductive pattern, and the third conductive pattern may be formed in a metal mesh shape with a plurality of open regions on the dielectric substrate. The first conductive pattern, the second conductive pattern, and the third conductive pattern may form a coplanar waveguide (CPW) structure on the dielectric substrate.

In an embodiment, the antenna assembly may include a plurality of dummy mesh grid patterns on an outside portion of the first region on the dielectric substrate. The plurality of dummy mesh grid patterns may not be connected to the feeding patterns and the ground conductive patterns. The plurality of dummy mesh grid patterns may be separated from each other.

A vehicle according to another aspect of the disclosure may include a glass panel including a transparent region and an opaque region, and an antenna assembly arranged on the glass panel. The antenna assembly may include: a first dielectric substrate; a first region including antenna elements having conductive patterns on one side of the first dielectric substrate and configured to radiate radio signals; a second region including connection patterns connected to the antenna elements and arranged in the opaque region of the glass panel; a second dielectric substrate; and a third region including ground conductive patterns and feeding patterns on one side of the second dielectric substrate. Each of the antenna elements may include: a first radiation structure including a first conductive pattern, a second conductive pattern, and a third conductive pattern, and a second radiation structure including a fourth conductive pattern, a fifth conductive pattern, and a sixth conductive pattern. A size of the second conductive pattern may be smaller than that of the third conductive pattern. The third conductive pattern may oppose the sixth conductive pattern.

In an embodiment, the first radiation structure may include: a first conductive pattern including a first part and a second part, the first part being perpendicularly connected to the second part, and the second part being electrically connected to a first feeding pattern; a second conductive pattern electrically connected to a first part of a first ground conductive pattern; and a third conductive pattern electrically connected to a second part of the first ground conductive pattern, wherein a size of the second conductive pattern is smaller than a size of the third conductive pattern, the second conductive pattern is arranged between the first part of the first conductive pattern and the first ground conductive pattern, and the first part of the first conductive pattern and the third conductive pattern are arranged on opposite sides with respect to the second part of the first conductive pattern.

In an embodiment, the second radiation structure may include: a fourth conductive pattern including a third part and a fourth part, the third part being perpendicularly connected to the fourth part, and the fourth part being electrically connected to a second feeding pattern; a fifth conductive pattern electrically connected to a first part of a second ground conductive pattern; and a sixth conductive pattern electrically connected to a second part of the second ground conductive pattern, wherein a size of the fifth conductive pattern is smaller than a size of the sixth conductive pattern, the fifth conductive pattern is arranged between the third part of the fourth conductive pattern and the second ground conductive pattern, and the third part of the fourth conductive pattern and the sixth conductive pattern are arranged on opposite sides with respect to the fourth part of the fourth conductive pattern.

A vehicle according to still another aspect of the disclosure may include a glass panel, and an antenna assembly arranged on one side of the glass panel. The antenna assembly may include: a first dielectric substrate; a first region including antenna elements having conductive patterns on one side of the first dielectric substrate and configured to radiate radio signals; a second dielectric substrate; a second region including first and second ground conductive patterns and first and second feeding patterns on one side of the second dielectric substrate; and a connection region including third and fourth ground conductive patterns and third and fourth feeding patterns on another side of the second dielectric substrate. Each of the antenna elements may include: a first radiation structure including a first conductive pattern, a second conductive pattern, and a third conductive pattern, and a second radiation structure including a fourth conductive pattern, a fifth conductive pattern, and a sixth conductive pattern. A size of the second conductive pattern may be smaller than that of the third conductive pattern. The third conductive pattern may oppose the sixth conductive pattern.

In an embodiment, the first radiation structure may include: a first conductive pattern including a first part and a second part, the first part being perpendicularly connected to the second part, and the second part being electrically connected to a first feeding pattern; a second conductive pattern electrically connected to a first part of a first ground conductive pattern; and a third conductive pattern electrically connected to a second part of the first ground conductive pattern, wherein a size of the second conductive pattern is smaller than a size of the third conductive pattern, the second conductive pattern is arranged between the first part of the first conductive pattern and the first ground conductive pattern, and the first part of the first conductive pattern and the third conductive pattern are arranged on opposite sides with respect to the second part of the first conductive pattern.

In an embodiment, the second radiation structure may include: a fourth conductive pattern including a third part and a fourth part, the third part being perpendicularly connected to the fourth part, and the fourth part being electrically connected to a second feeding pattern; a fifth conductive pattern electrically connected to a first part of a second ground conductive pattern; and a sixth conductive pattern electrically connected to a second part of the second ground conductive pattern, wherein a size of the fifth conductive pattern is smaller than a size of the sixth conductive pattern, the fifth conductive pattern is arranged between the third part of the fourth conductive pattern and the second ground conductive pattern, and the third part of the fourth conductive pattern and the sixth conductive pattern are arranged on opposite sides with respect to the fourth part of the fourth conductive pattern.

In an embodiment, the first ground conductive pattern may be electrically connected to the third ground conductive pattern by at least one first via. The second ground conductive pattern may be electrically connected to the fourth ground conductive pattern by at least one second via. The first feeding pattern may be electrically connected to the third feeding pattern by at least one third via. The second feeding pattern may be electrically connected to the fourth feeding pattern by at least one fourth via.

In an embodiment, the vehicle may further include connecting elements and a telematics control unit (TCU). The connecting elements may include a first connecting portion, a second connecting portion, and a cable connected between the first connecting portion and the second connecting portion. The first connecting portion may include a first pin, a second pin, and a third pin. The first pin may be connected to a first part of the third ground conductive pattern. The second pin may be connected to the third feeding pattern. The third pin may be connected to a second part of the third ground conductive pattern. The second connecting portion may be connected to the TCU.

A vehicle according to still another aspect of the disclosure may include a glass panel having a transparent region and an opaque region; and an antenna assembly arranged in the transparent region on one side of the glass panel. The antenna assembly may include: a first dielectric substrate; a radiator region including antenna elements having conductive patterns on one side of the first dielectric substrate and configured to radiate a wireless signal; a second dielectric substrate; a first conductive region including first and second ground conductive patterns and first and second feeding patterns on one side of the second dielectric substrate; and a second conductive region including third and fourth ground conductive patterns and third and fourth feeding patterns on another side of the second dielectric substrate. Each of the antenna elements may include: a first radiation structure including a first conductive pattern, a second conductive pattern, and a third conductive pattern, and a second radiation structure including a fourth conductive pattern, a fifth conductive pattern, and a sixth conductive pattern. A size of the second conductive pattern may be smaller than that of the third conductive pattern. The third conductive pattern may oppose the sixth conductive pattern.

In an embodiment, the first radiation structure may include: a first conductive pattern including a first part and a second part, the first part being perpendicularly connected to the second part, and the second part being electrically connected to the first feeding pattern; a second conductive pattern electrically connected to a first part of the first ground conductive pattern; and a third conductive pattern electrically connected to a second part of the first ground conductive pattern, wherein a size of the second conductive pattern is smaller than a size of the third conductive pattern, the second conductive pattern is arranged between the first part of the first conductive pattern and the first ground conductive pattern, and the first part of the first conductive pattern and the third conductive pattern are arranged on opposite sides with respect to the second part of the first conductive pattern.

In an embodiment, the second radiation structure may include: a fourth conductive pattern including a third part and a fourth part, the third part being perpendicularly connected to the fourth part, and the fourth part being electrically connected to the second feeding pattern; a fifth conductive pattern electrically connected to a first part of the second ground conductive pattern; and a sixth conductive pattern electrically connected to a second part of the second ground conductive pattern, wherein a size of the fifth conductive pattern is smaller than a size of the sixth conductive pattern, the fifth conductive pattern is arranged between the third part of the fourth conductive pattern and the second ground conductive pattern, and the third part of the fourth conductive pattern and the sixth conductive pattern are arranged on opposite sides with respect to the fourth part of the fourth conductive pattern.

In an embodiment, the first ground conductive pattern may be electrically connected to the third ground conductive pattern by at least one first via. The second ground conductive pattern may be electrically connected to the fourth ground conductive pattern by at least one second via. The first feeding pattern may be electrically connected to the third feeding pattern by at least one third via. The second feeding pattern may be electrically connected to the fourth feeding pattern by at least one fourth via.

Advantageous Effects of Invention

Hereinafter, the technical effects of a broadband transparent antenna assembly that may be arranged on vehicle glass will be described.

According to the specification, 4G/5G broadband wireless communications in a vehicle may be enabled by providing a broadband transparent antenna assembly having a plurality of conductive patterns that may be arranged on vehicle glass.

According to the specification, the shapes of conductive patterns in a broadband transparent antenna assembly, which may be arranged on vehicle glass, may be optimized, and antenna efficiency may be improved through an asymmetrical conductive pattern structure.

According to the specification, first and second radiation structures may be formed in a symmetrical structure in one axial direction, thereby improving isolation characteristics between the first and second radiation structures.

According to the specification, first and second radiation structures may be formed in a symmetrical structure along one axis while internal conductive patterns may be formed in an asymmetrical structure, thereby performing a multi-input/multi-output (MIMO) operation with improved isolation characteristics for each of a plurality of frequency bands.

According to the specification, the end of a conductive pattern of a transparent dielectric substrate and the end of a conductive pattern of an opaque substrate may be interconnected to overlap each other, thereby reducing feeding loss.

According to the specification, a broadband antenna structure made of a transparent material may be implemented, which may improve antenna efficiency by setting a different antenna operation mode for each frequency band while reducing feeding loss.

According to the specification, the efficiency of a feeding structure of a broadband transparent antenna assembly may be improved by coupling a feeding pattern of the feeding structure, which is implemented with an opaque substrate arranged on an opaque region of vehicle glass, directly with a transparent antenna.

According to the specification, the reliability of a mechanical structure including a feeding structure, may be secured by coupling a feeding pattern of the feeding structure and a conductive pattern of an antenna module through low-temperature bonding.

According to the specification, the difference in visibility between a region where an antenna made of a transparent material is arranged and other regions may be minimized by forming open dummy regions, in which slits are formed, in a dielectric region.

According to the specification, the boundary of an antenna region and the boundary of a dummy pattern region may be spaced apart by a certain gap, thereby securing the invisibility of a transparent antenna and an antenna assembly including the same without deterioration of antenna performance.

According to the specification, an open dummy structure may be formed such that an intersection between metal lines of a dummy region or a point of the corresponding metal line is disconnected, thereby securing the invisibility of a transparent antenna and an antenna assembly including the same without deterioration of antenna performance.

According to the specification, the visibility of a transparent antenna may be improved without deterioration of antenna performance through an optimal design of slits of a dummy pattern having an open region and an open region with a radiator region.

According to the specification, a broadband antenna structure made of a transparent material may be provided through vehicle glass or a display region of an electronic device, thereby reducing feeding loss and improving antenna efficiency while operating in a wide band.

According to the specification, a transparent antenna structure, which is capable of performing wireless communications in 4G and 5G frequency bands while minimizing the variation of antenna performance and a difference in transparency between an antenna region and a surrounding region, may be provided.

Further scope of applicability of the disclosure will become apparent from the following detailed description. It should be understood, however, that the detailed description and specific examples, such as the preferred embodiments, are given by way of illustration only, since various changes and modifications within the technical idea and scope of the disclosure will be apparent to those skilled in the art.

MODE FOR THE INVENTION

Figure 1:
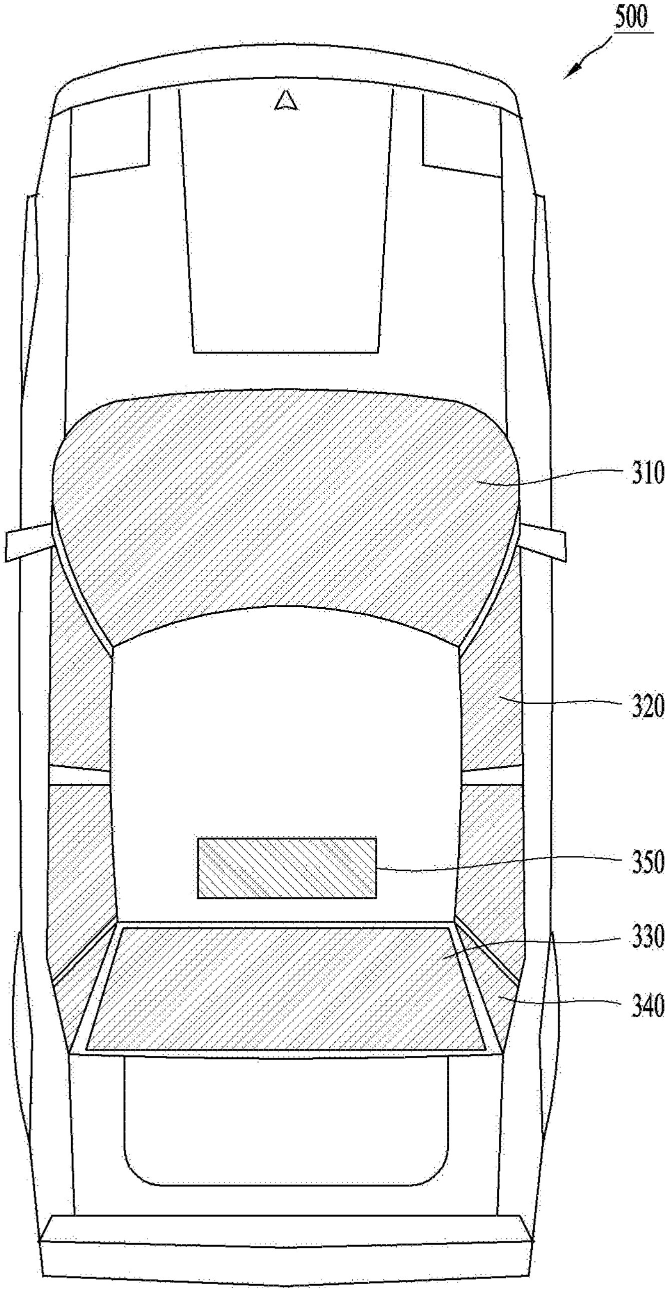
FIG. 1 is a view of vehicle glass on which an antenna structure according to an embodiment of the disclosure is to be arranged.

A description will now be given in detail according to one or more embodiments disclosed herein, with reference to the accompanying drawings. For the sake of a brief description with reference to the drawings, the same or like components regardless reference numerals may be assigned the same reference numeral, and a redundant description thereof will be omitted. Suffixes "module" and "unit" used for elements disclosed in the following description are merely intended for easy description of the specification, and each suffix itself is not intended to give any special meaning or function. In describing the embodiments disclosed herein, moreover, the detailed description will be omitted when a specific description for publicly known technologies to which the invention pertains is judged to obscure the gist of the disclosure. The accompanying drawings are used to help easily understand various technical features, and it should be understood that the embodiments presented herein are not limited by the accompanying drawings. As such, the disclosure should be construed to extend to any alterations, equivalents, and substitutes in addition to those which are particularly set forth in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected to" or "coupled to" another element, the element may be connected to or coupled to the another element or intervening elements may also be present. In contrast, when an element is referred to as being "directly connected to" or "coupled to" another element, there are no intervening elements present.

A singular representation may include a plural representation unless mentioned clearly and differently in context.

In this application, the terms "comprising," "including," "having," etc. should not be construed to necessarily include all of the features, numbers, steps, operations, components, elements, or combinations thereof disclosed herein, and should be construed not to include some of the features, numbers, steps, operations, components, elements, or combinations thereof, or should be construed to further include additional features, numbers, steps, operations, components, elements, or combinations thereof.

An antenna system described herein may be mounted on a vehicle. Configurations and operations according to embodiments may also be applied to a communication system, namely, an antenna system mounted on a vehicle. In this regard, the antenna system mounted on the vehicle may include a plurality of antennas, and a transceiver circuit and a processor both configured to control the plurality of antennas.

Hereinafter, a description will be given of an antenna assembly (antenna module) that may be arranged on a window of a vehicle according to the disclosure, and an antenna system for a vehicle that includes the antenna assembly. In this regard, the antenna assembly may refer to a structure in which conductive patterns are combined on a dielectric substrate, and may also be referred to as an antenna module.

In this regard, FIG. 1 illustrates glass of a vehicle on which an antenna structure according to an embodiment may be arranged. Referring to FIG. 1, a vehicle 500 may include front glass 310, door glass 320, rear glass 330, and quarter glass 340. In some examples, the vehicle 500 may further include top glass 350 arranged on a roof in an upper region.

Therefore, the glass constituting the window of the vehicle 500 may include the front glass 310 arranged in a front region of the vehicle, the door glass 320 arranged in a door region of the vehicle, and the rear glass 330 arranged in a rear region of the vehicle. In some examples, the glass constituting the window of the vehicle 500 may further include the quarter class 340 arranged in a partial region of the door region of the vehicle. In addition, the glass constituting the window of the vehicle 500 may further include the top glass 350 spaced apart from the rear glass 330 and arranged in an upper region of the vehicle. Accordingly, each glass constituting the window of the vehicle 500 may also be referred to as a window.

The front glass 310 may be referred to as a front windshield because it suppresses wind blown from a front side from entering the inside of the vehicle. The front glass 310 may have a two-layer bonding structure having a thickness of about 5.0 to 5.5 mm. The front glass 310 may have a bonding structure of glass/shatterproof film/glass.

The door glass 320 may have a two-layer bonding structure or may be formed of single-layer compressed glass. The rear glass 330 may have a two-layer bonding structure with a thickness of about 3.5 to 5.5 mm or may be formed of single-layer compressed glass. In the rear glass 330, a spaced distance may be required between a transparent antenna and a heat line and AM/FM antenna. The quarter glass 340 may be formed of single-layer compressed glass with a thickness of about 3.5 to 4.0 mm, but is not limited thereto.

The size of the quarter glass 340 may vary depending on a type of vehicle, and may have a size smaller than the sizes of the front glass 310 and the rear glass 330.

Figure 2A:
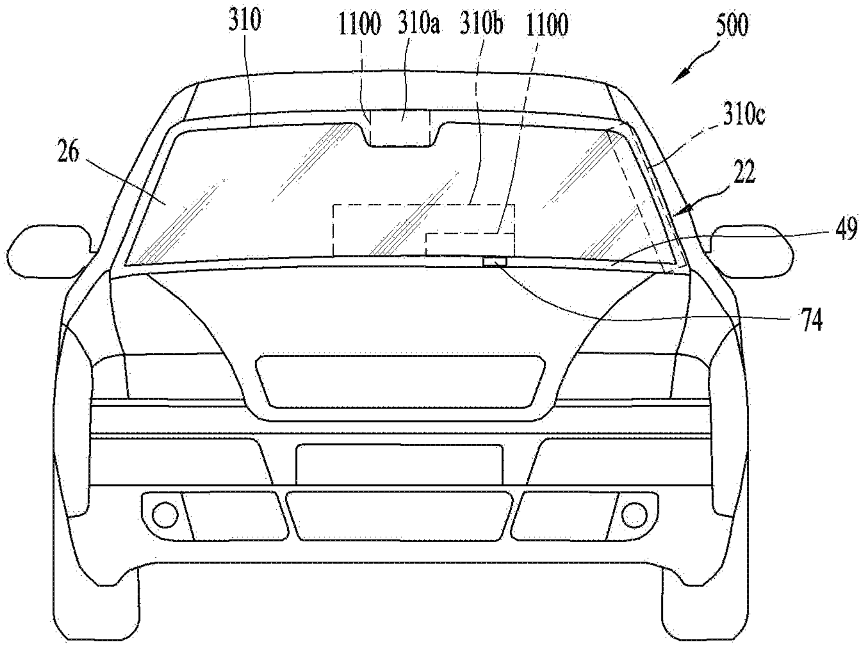
FIG. 2A is a front view of the vehicle of FIG. 1, which has an antenna assembly arranged in different regions of front glass.
Figure 2B:
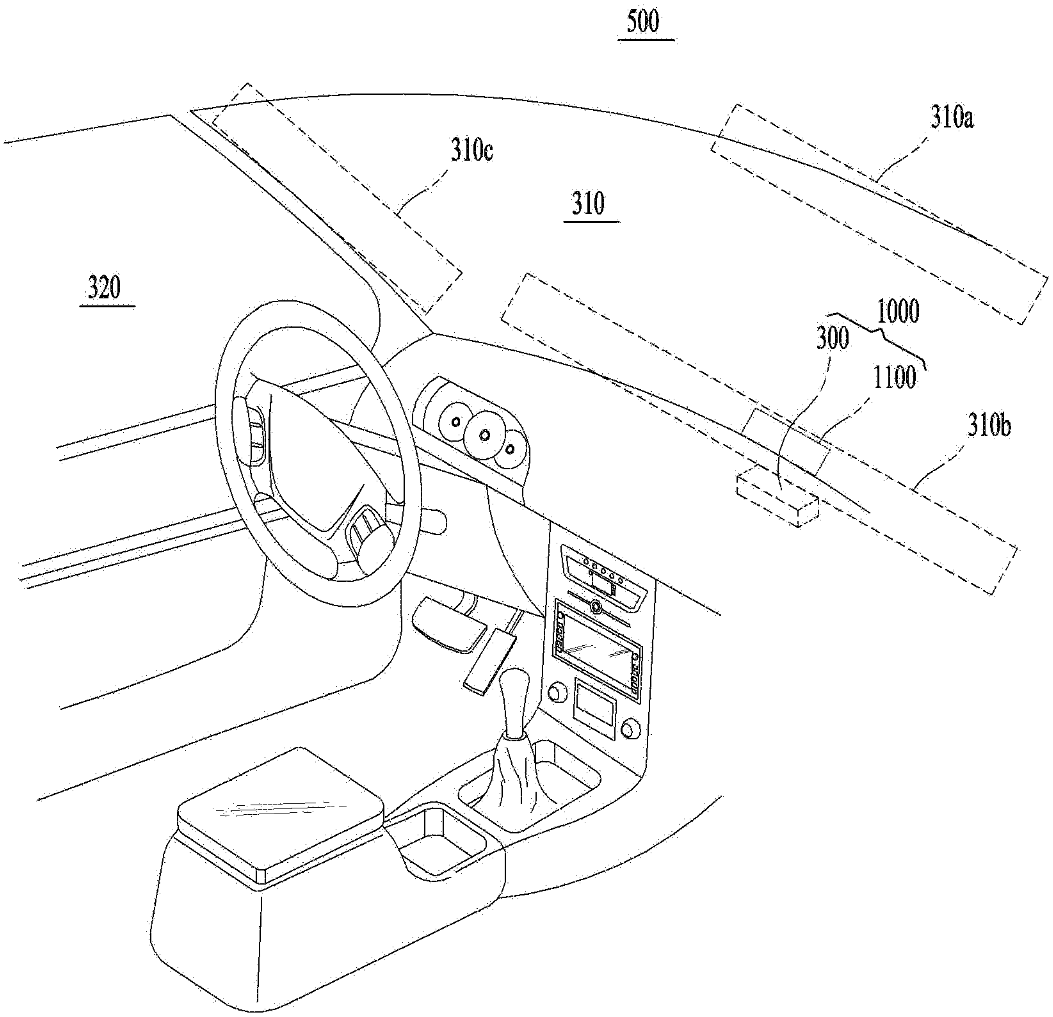
FIG. 2B is a front perspective view illustrating the inside of the vehicle of FIG. 1, which has the antenna assembly arranged in the different regions of the front glass.
Figure 2C:
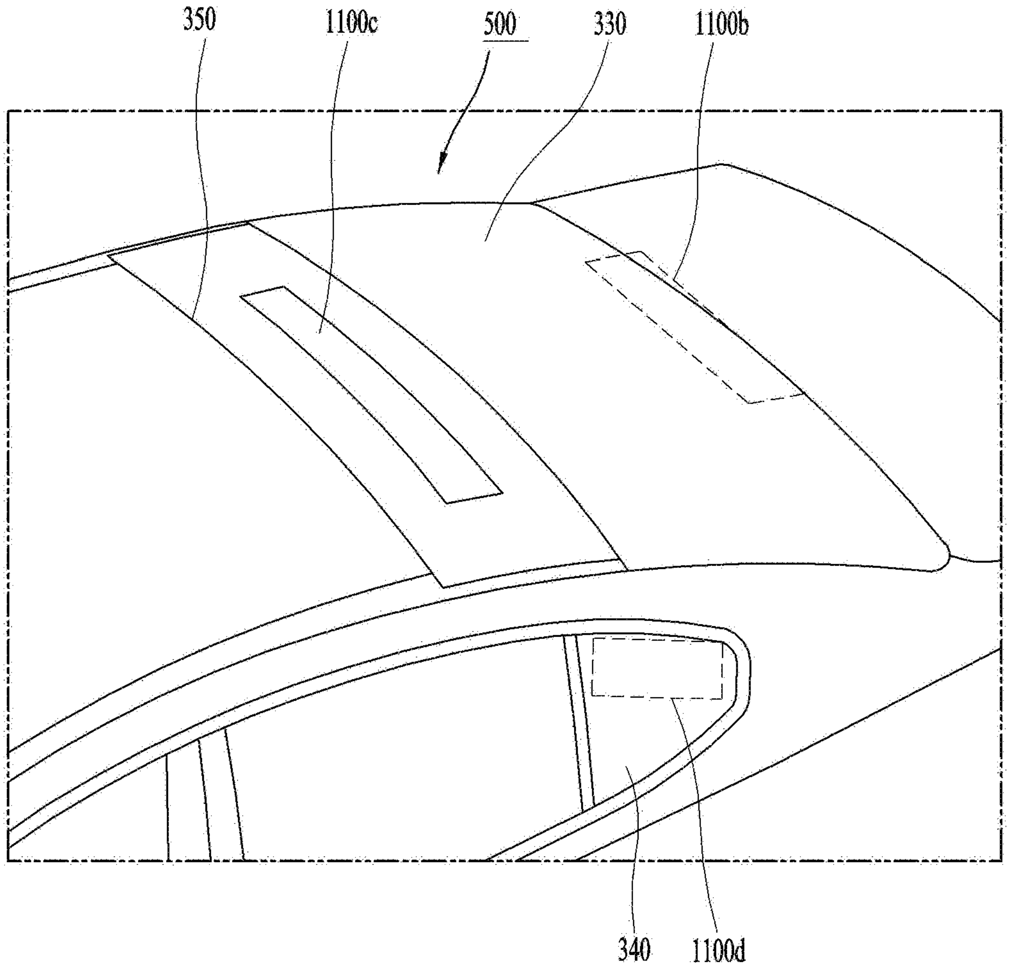
FIG. 2C is a lateral perspective view of the vehicle of FIG. 1, which has the antenna assembly arranged on upper glass.

Hereinafter, a structure in which an antenna assembly according to the disclosure is arranged in different regions of the front glass of a vehicle will be described. An antenna assembly attached to vehicle glass may be implemented as a transparent antenna. In this regard, FIG. 2A is a front view of the vehicle of FIG. 1, which has an antenna assembly arranged in different regions of the front glass. FIG. 2B is a front perspective view illustrating the inside of the vehicle of FIG. 1, which has the antenna assembly arranged in the different regions of the front glass. FIG. 2C is a lateral perspective view of the vehicle of FIG. 1, which has the antenna assembly arranged on upper glass.

Referring to FIG. 2A which is the front view of the vehicle 500, a configuration in which the transparent antenna for the vehicle according to the specification may be arranged is illustrated. A pane assembly 22 may include an antenna arranged in an upper region 310*a*. The pane assembly 22 may include an antenna in the upper region 310*a*, an antenna in a lower region 310*b*, and/or an antenna in a side region 310*c*. The pane assembly 22 may also include translucent pane glass 26 formed of a dielectric substrate. The antenna in the upper region 310*a*, the antenna in the lower region 310*b*, and/or the antenna in the side region 310*c* may be configured to support any one or more of various communication systems.

An antenna module 1100 may be arranged in the upper region 310*a*, the lower region 310*b*, or the side region 310*c* of the front glass 310. When the antenna module 1100 is arranged in the lower region 310*b* of the front glass 310, the antenna module 1100 may extend to a body 49 of a lower region of the translucent pane glass 26. The body 49 of the lower region of the translucent pane glass 26 may have lower transparency than other portions. A portion of a feeder and other interface lines may be arranged on the body 49 of the lower region of the translucent pane glass 26. A connector assembly 74 may be implemented on the body 49 of the lower region of the translucent pane glass 26. The body 49 of the lower region may constitute a vehicle body made of a metal material.

Referring to FIG. 2B, an antenna assembly 1000 may include a telematics control unit (TCU) 300 and an antenna module 1100. The antenna module 1100 may be located in a different region of glass of the vehicle.

Referring to FIGS. 2A and 2B, the antenna assembly may be arranged in the upper region 310*a*, the lower region 310*b*, and/or the side region 310*c* of the vehicle glass. Referring to FIGS. 2A to 2C, the antenna assembly may be arranged on the front glass 310, rear glass 330, quarter glass 340, and upper glass 350 of the vehicle.

Referring to FIGS. 2A to 2C, the antenna arranged in the upper region 310*a* of the front glass 310 of the vehicle may be configured to operate in a low band (LB), a mid band (MB), a high band (HB), and a 5G Sub6 band of 4G/5G communication systems. The antenna in the lower region 310*b* and/or the antenna in the side region 310*c* may also be configured to operate in the LB, MB, HB, and 5G Sub6 band of the 4G/5G communication systems. An antenna structure 1100*b* on the rear glass 330 of the vehicle may also be configured to operate in the LB, MB, HB, and 5G Sub6 band of the 4G/5G communication systems. An antenna structure 1100*c* on the upper glass 350 of the vehicle may also be configured to operate in the LB, MB, HB, and 5G Sub6 band of the 4G/5G communication systems. An antenna structure 1100*d* on the quarter glass 350 of the vehicle may also be configured to operate in the LB, MB, HB, and 5G Sub6 band of the 4G/5G communication systems.

At least a portion of an outer region of the front glass 310 of the vehicle may be defined by the translucent pane glass 26. The translucent pane glass 26 may include a first part in which an antenna and a portion of a feeder are formed, and a second part in which another portion of the feeder and a dummy structure are formed. The translucent pane glass 26 may further include a dummy region in which conductive patterns are not formed. For example, a transparent region of the translucent pane glass 22 may be transparent to secure light transmission and a field of view.

Although it is exemplarily illustrated that conductive patterns may be formed in a partial region of the front glass 310, the conductive patterns may extend to the side glass 320 and the rear glass 330 of FIG. 1, and an arbitrary glass structure. In the vehicle 500, the occupants or driver may view road and surrounding environment through the pane assembly 22. In addition, the occupants or driver may view the road and surrounding environment without interference by the antenna in the upper region 310*a*, the antenna in the lower region 310*b*, and/or the antenna in the side region 310*c*.

Figure 3:
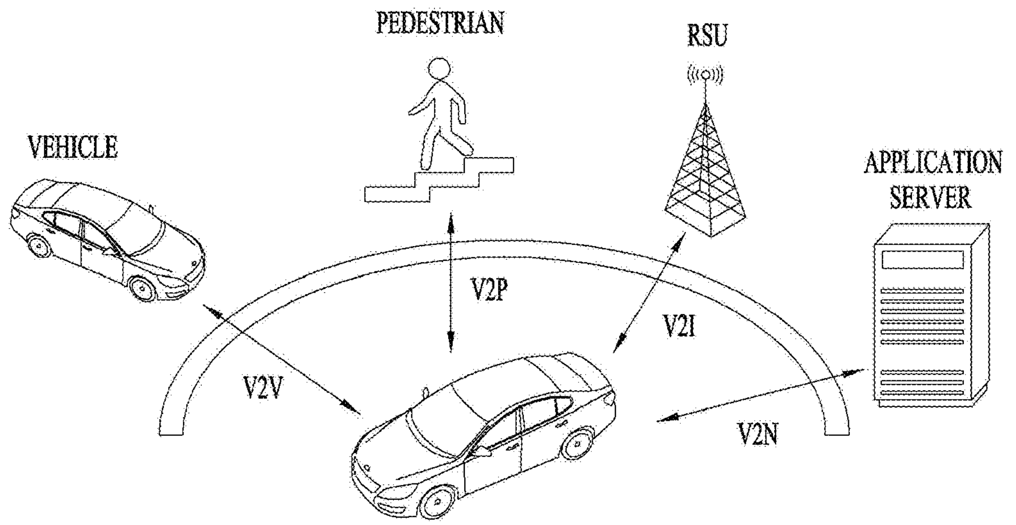
FIG. 3 illustrates types of V2X applications.

The vehicle 500 may be configured to communicate with pedestrians, adjacent infrastructures, and/or servers in addition to adjacent vehicles. FIG. 3 illustrates types of V2X applications. Referring to FIG. 3, vehicle-to-everything (V2X) communication may include communication between a vehicle and each of all entities, such as vehicle-to-vehicle (V2V) communication which refers to communication between vehicles, vehicle-to-infrastructure (V2I) communication which refers to communication between a vehicle and an eNB or a road side unit (RSU), vehicle-to-pedestrian (V2P) communication which refers to communication between a vehicle and a terminal carried by a person (a pedestrian, a cyclist, a vehicle driver, or a passenger), vehicle-to-network (V2N) communication, and the like.

Figure 4:
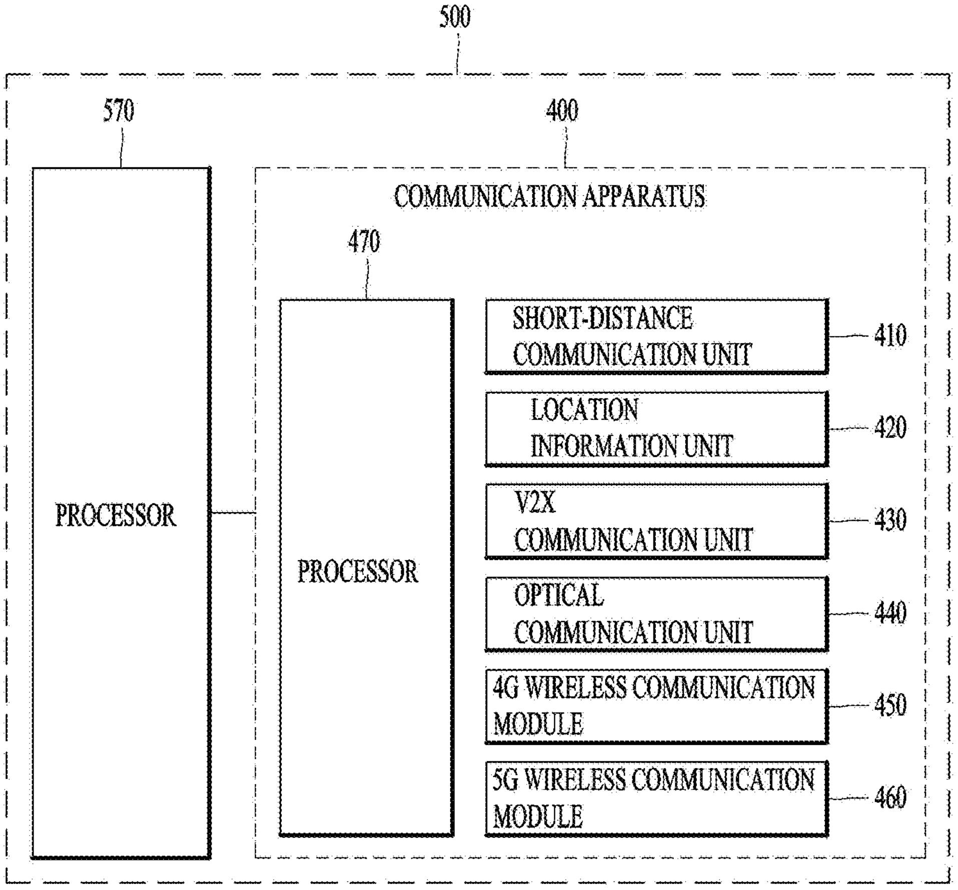
FIG. 4 is a block diagram referenced for explaining a vehicle and an antenna system mounted on the vehicle according to an embodiment of the disclosure.

Meanwhile, FIG. 4 is a block diagram illustrating a vehicle and an antenna system mounted on the vehicle according to an embodiment.

The vehicle 500 may include a communication device 400 and a processor 570. The communication device 400 may correspond to the telematics control unit (TCU) of the vehicle 500.

The communication device 400 may be a device for performing communication with an external device. Here, the external device may be another vehicle, a mobile terminal, or a server. In order to perform communication, the communication device 400 may include a transmission antenna, a reception antenna, and at least one of a radio frequency (RF) circuit and an RF element which may implement various communication protocols. In this regard, the communication device 400 may include a short-range communication unit 410, a location information unit 420, a V2X communication unit 430, an optical communication unit 440, a 4G wireless communication module 450, and a 5G wireless communication module 460. The communication device 400 may include a processor 470. According to an embodiment, the communication device 400 may further include other components in addition to the components described, or may not include some of the components described.

The 4G wireless communication module 450 and the 5G wireless communication module 460 may perform wireless communications with one or more communication systems through one or more antenna modules. The 4G wireless communication module 450 may transmit and/or receive signals to and/or from a device in a first communication system through a first antenna module. Also, the 5G wireless communication module 460 may transmit and/or receive signals to and/or from a device in a second communication system through a second antenna module. The 4G wireless communication module 450 and 5G wireless communication module 460 may also be physically implemented as one integrated communication module. For example, the first communication system and the second communication system may be an LTE communication system and a 5G communication system, respectively. However, the first communication system and the second communication system may not be limited thereto, and may expand to any different communication systems.

The processor of the device within the vehicle 500 may be implemented as a micro control unit (MCU) or a modem. The processor 470 of the communication device 400 may correspond to a modem, and the processor 470 may be implemented as an integrated modem. The processor 470 may acquire surrounding information from other adjacent vehicles, objects, or infrastructures through wireless communication. The processor 470 may perform vehicle control using the acquired surrounding information.

The processor 570 of the vehicle 500 may be a processor of a car area network (CAN) or advanced driving assistance system (ADAS), but is not limited thereto. When the vehicle 500 is implemented in a distributed control manner, the processor 570 of the vehicle 500 may be replaced with a processor of each device.

In some examples, the antenna module arranged in the vehicle 500 may include a wireless communication unit. The 4G wireless communication module 450 may perform transmission and reception of 4G signals with a 4G base station through a 4G mobile communication network. In this instance, the 4G wireless communication module 450 may transmit at least one 4G transmission signal to the 4G base station. In addition, the 4G wireless communication module 450 may receive at least one 4G reception signal from the 4G base station. In this regard, uplink (UL) multi-input/multi-output (MIMO) may be performed based on a plurality of 4G transmission signals transmitted to the 4G base station. In addition, downlink (DL) MIMO may be performed based on a plurality of 4G reception signals received from the 4G base station.

The 5G wireless communication module 460 may perform transmission and reception of 5G signals with a 5G base station through a 5G mobile communication network. Here, the 4G base station and the 5G base station may have a non-stand-alone (NSA) architecture. The 4G base station and the 5G base station may be arranged, for example, in the non-stand-alone (NSA) architecture. Alternatively, the 5G base station may be arranged in a stand-alone (SA) architecture at a separate location from the 4G base station. The 5G wireless communication module 460 may perform transmission and reception of 5G signals with a 5G base station through a 5G wireless communication network. In this instance, the 5G wireless communication module 460 may transmit at least one 5G transmission signal to the 5G base station. In addition, the 5G wireless communication module 460 may receive at least one 5G reception signal from the 5G base station. In this instance, a 5G frequency band may use the same band as a 4G frequency band, and this may be referred to as LTE re-farming. In some examples, a Sub6 frequency band, which is a band of 6 GHz or less, may be used as the 5G frequency band. In contrast, a millimeter-wave (mmWave) band may be used as the 5G frequency band to perform wideband high-speed communication. When the mmWave band is used, the electronic device may perform beamforming for coverage expansion of an area where communication with a base station is possible.

Regardless of the 5G frequency band, in the 5G communication system, MIMO may be supported to be performed a plurality of times, to improve a transmission rate. In this instance, UL MIMO may be performed by a plurality of 5G transmission signals that are transmitted to a 5G base station. DL MIMO may be performed by a plurality of 5G reception signals that are received from the 5G base station.

In some examples, a state of dual connectivity (DC) with both the 4G base station and the 5G base station may be attained through the 4G wireless communication module 450 and the 5G wireless communication module 460. As such, the dual connectivity with the 4G base station and the 5G base station may be referred to as EUTRAN NR DC (EN-DC). In some examples, when the 4G base station and the 5G base station are arranged in a co-located structure, throughput improvement may be achieved by inter-carrier aggregation (inter-CA). Accordingly, when the 4G base station and the 5G base station are arranged in the EN-DC state, the 4G reception signal and the 5G reception signal may be simultaneously received through the 4G wireless communication module 450 and the 5G wireless communication module 460. Short-range communication between electronic devices (e.g., vehicles) may be performed using the 4G wireless communication module 450 and the 5G wireless communication module 460. In one embodiment, after resources are allocated, vehicles may perform wireless communication in a V2V manner without a base station.

Meanwhile, for transmission rate improvement and communication system convergence, carrier aggregation (CA) may be carried out using at least one of the 4G wireless communication module 450 and the 5G wireless communication module 460 and a WiFi communication module. In this regard, 4G+WiFi carrier aggregation (CA) may be performed using the 4G wireless communication module 450 and the WiFi communication module 113. Or, 5G+WiFi CA may be performed using the 5G wireless communication module 460 and the WiFi communication module.

In some examples, the communication device 400 may implement a display device for a vehicle together with a user interface device. In this instance, the display device for the vehicle may be referred to as a telematics apparatus or an audio video navigation (AVN) apparatus.

In some examples, a broadband transparent antenna structure that may be arranged on vehicle glass may be implemented with a single dielectric substrate on the same plane as a CPW feeder. In addition, the broadband transparent antenna structure that may be arranged on the vehicle glass may be implemented with a structure in which grounds are formed on both sides of a radiator, to constitute a broadband structure.

Figure 5A:
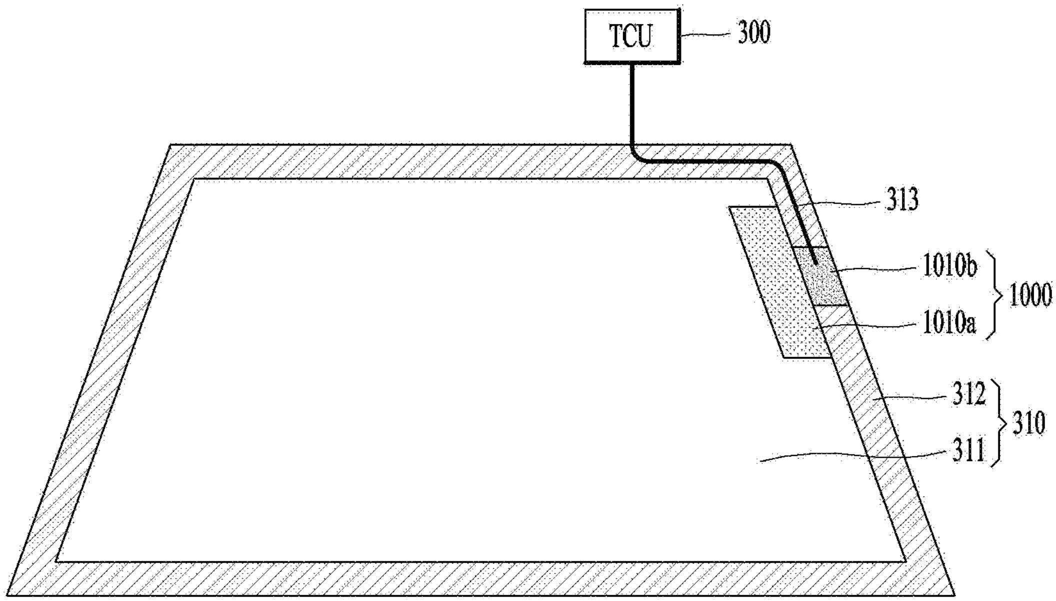
FIGS. 5A and 5C are views of a configuration that an antenna assembly according to the disclosure is arranged on vehicle glass.
Figure 5B:
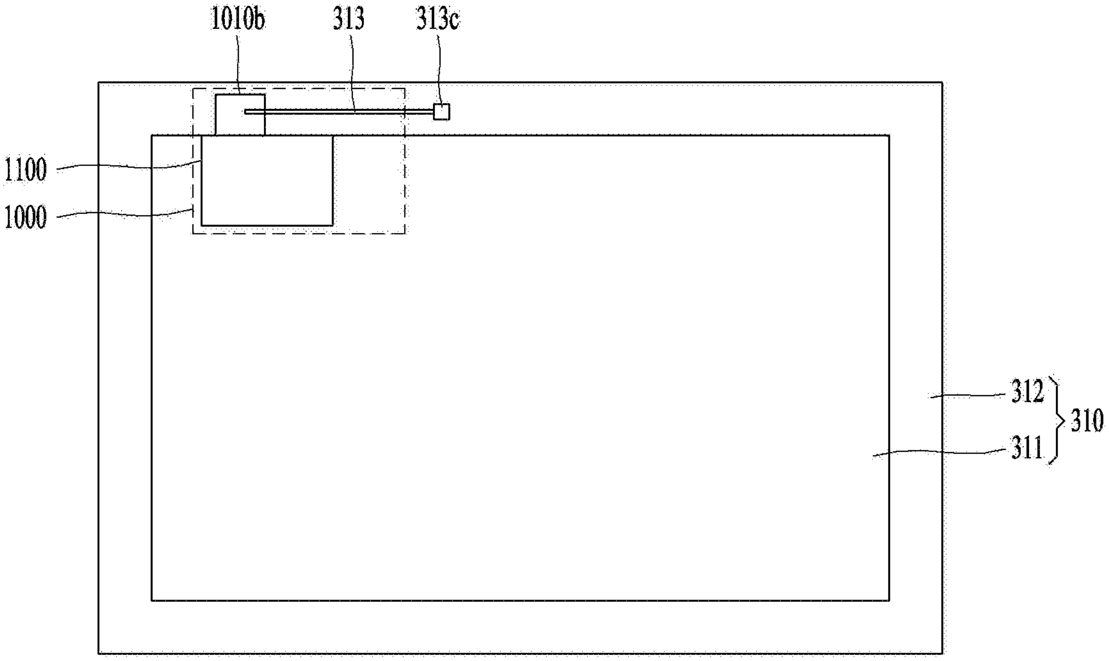

Hereinafter, an antenna assembly associated with a broadband transparent antenna structure according to the specification will be described. In this regard, FIGS. 5A and 5B illustrate configurations in which an antenna assembly according to the specification is arranged on vehicle glass. Referring to FIG. 5A, the antenna assembly 1000 may include a first dielectric substrate 1010*a* and a second dielectric substrate 1010*b*. The first dielectric substrate 1010*a* may be implemented as a transparent substrate and thus may be referred to as a transparent substrate 1010*a*. The second dielectric substrate 1010*b* may be implemented as an opaque substrate 1010*b*.

The glass panel 310 may be configured to include a transparent region 311 and an opaque region 312. The opaque region 312 of the glass panel 310 may be a frit region formed as a frit layer. The opaque region 312 may be formed to surround the transparent region 311. The opaque region 312 may be formed outside the transparent region 311. The opaque region 312 may form a boundary region of the glass panel 310.

A signal pattern formed on a dielectric substrate 1010 may be connected to the telematics control unit (TCU) 300 through a connector part 313 such as a coaxial cable. The telematics control unit (TCU) 300 may be mounted inside the vehicle, but is not limited thereto. The telematics control unit (TCU) 300 may be arranged on a dashboard inside the vehicle or a ceiling region inside the vehicle, but is not limited thereto.

Figure 5C:
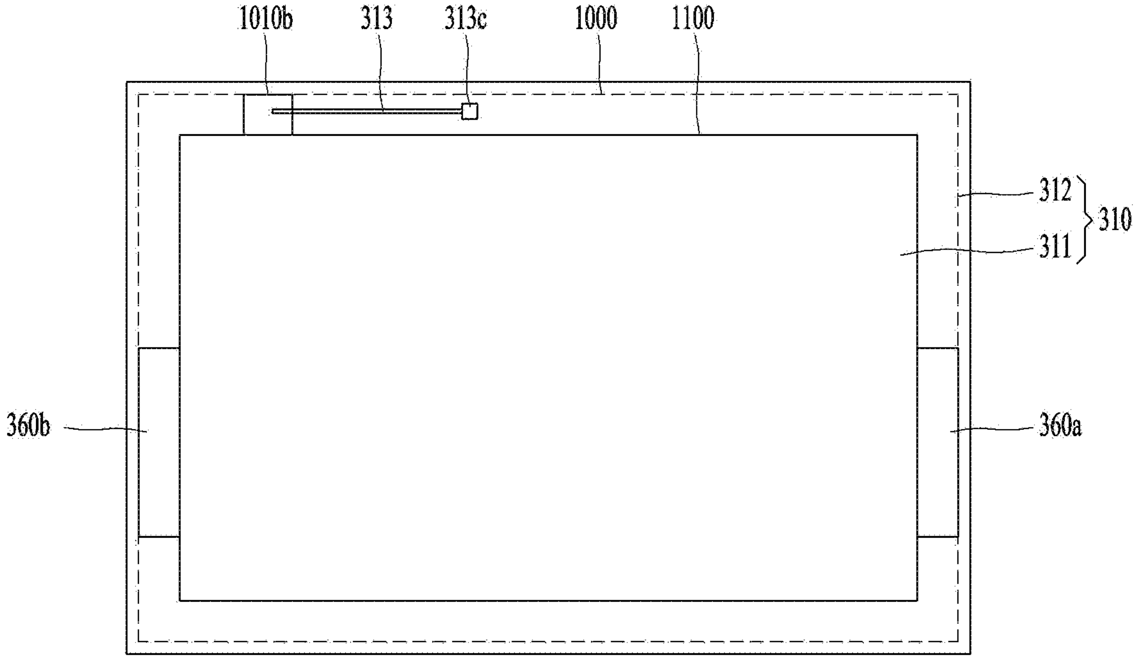

FIG. 5B illustrates a configuration in which the antenna assembly 1000 is arranged in a partial region of the glass panel 310. FIG. 5C illustrates a configuration in which the antenna assembly 1000 is arranged in an entire region of the glass panel 310.

Referring to FIGS. 5B and 5C, the glass panel 310 may include the transparent region 311 and the opaque region 312. The opaque region 312 that is a non-visible area with transparency below a certain level may be referred to as a frit region, black printing (BP) region, or black matrix (BM) region. The opaque region 312 corresponding to the non-visible area may be formed to surround the transparent region 311. The opaque region 312 may be formed in a region outside the transparent region 311. The opaque region 312 may form a boundary region of the glass panel 310. A second dielectric substrate 1010*b* or heating pads 360*a* and 360*b* corresponding to a feeding substrate may be arranged in the opaque region 312. The second dielectric substrate 1010*b* arranged in the opaque region 312 may be referred to as an opaque substrate. Even when the antenna assembly 1000 is arranged in the entire region of the glass panel 310 as illustrated in FIG. 5C, the heating pads 360*a* and 360*b* may be arranged in the opaque region 312.

Referring to FIG. 5B, the antenna assembly 1000 may include a first transparent dielectric substrate 1010*a* and a second dielectric substrate 1010*b*. Referring to FIGS. 5B and 5C, the antenna assembly 1000 may include an antenna module 1100 configured with conductive patterns, and a second dielectric substrate 1010*b*. The antenna module 1100 may be provided with a transparent electrode part to be implemented as a transparent antenna module. The antenna module 1100 may include one or more antenna elements. The antenna module 1100 may include a MIMO antenna and/or other antenna elements for wireless communication. The other antenna elements may include at least one of GNSS/radio/broadcasting/WiFi/satellite communication/UWB, and remote keyless entry (RKE) antennas for vehicle applications.

Referring to FIGS. 5A to 5C, the antenna assembly 1000 may be interfaced with the TCU 300 through the connector part 313. The connector part 313 may include a connector 313*c* on an end of a cable to be electrically connected to the TCU 300. A signal pattern formed on the second dielectric substrate 1010*b* of the antenna assembly 1000 may be connected to the TCU 300 through the connector part 313 such as a coaxial cable. The antenna module 1100 may be electrically connected to the TCU 300 through the connector part 313. The TCU 300 may be arranged inside the vehicle, but is not limited thereto. The TCU 300 may be arranged on a dashboard inside the vehicle or a ceiling region inside the vehicle, but is not limited thereto.

In some examples, when the transparent antenna assembly according to the disclosure is attached to the inside or surface of the glass panel 310, a transparent electrode part including an antenna pattern and a dummy pattern may be arranged in the transparent region 311. On the other hand, an opaque substrate part may be arranged in the opaque region 312.

Figure 6A:
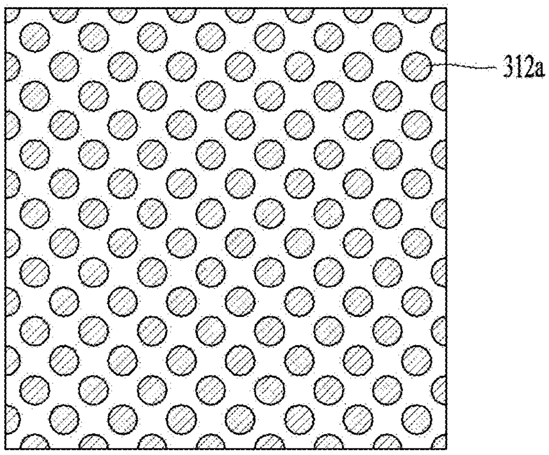
FIG. 6A is a view of various embodiments of a frit pattern according to the disclosure.
Figure 6A:
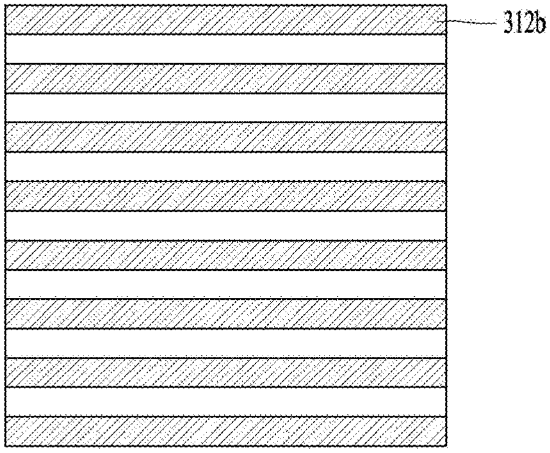
Figure 6A:
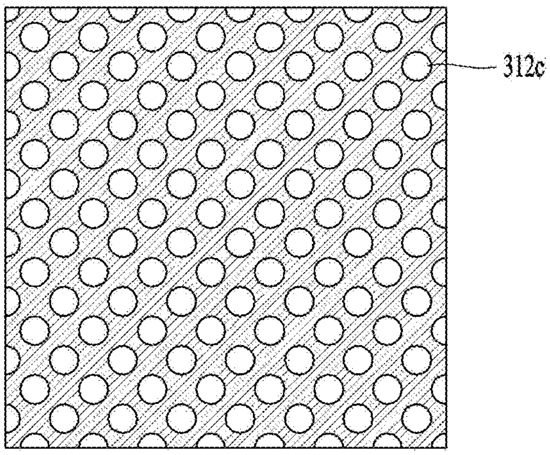
Figure 6B:
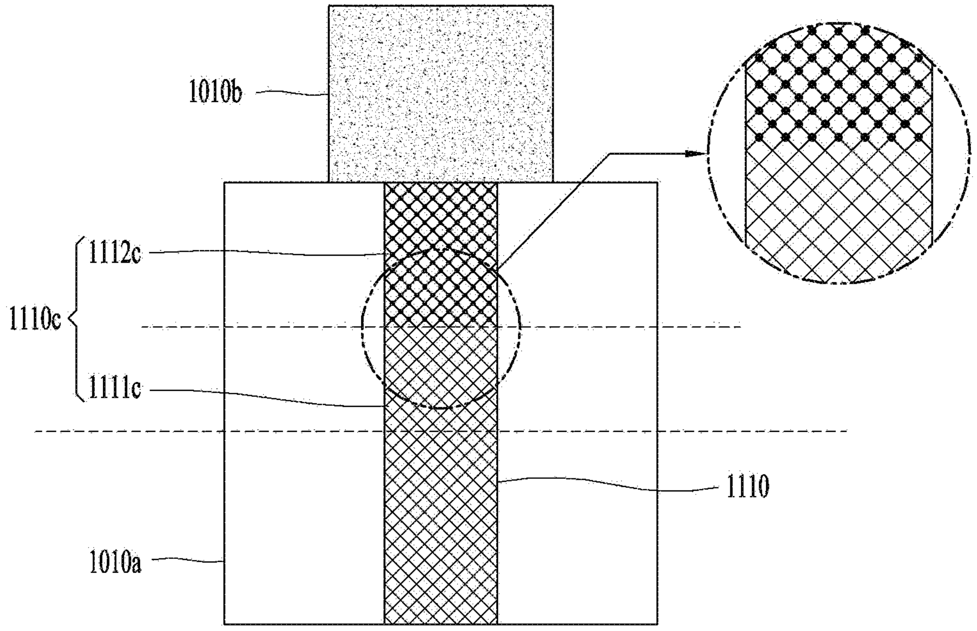
FIGS. 6B and 6C are views of transparent antenna patterns according to embodiments and structures in which the respective transparent antenna patterns are arranged on vehicle glass.
Figure 6B:
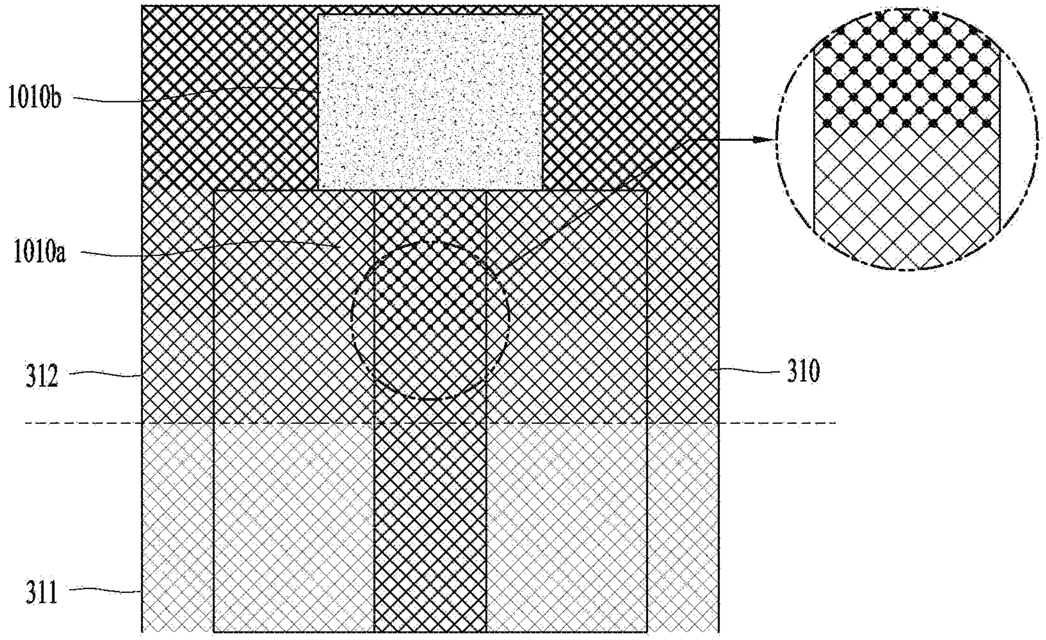
Figure 6C:
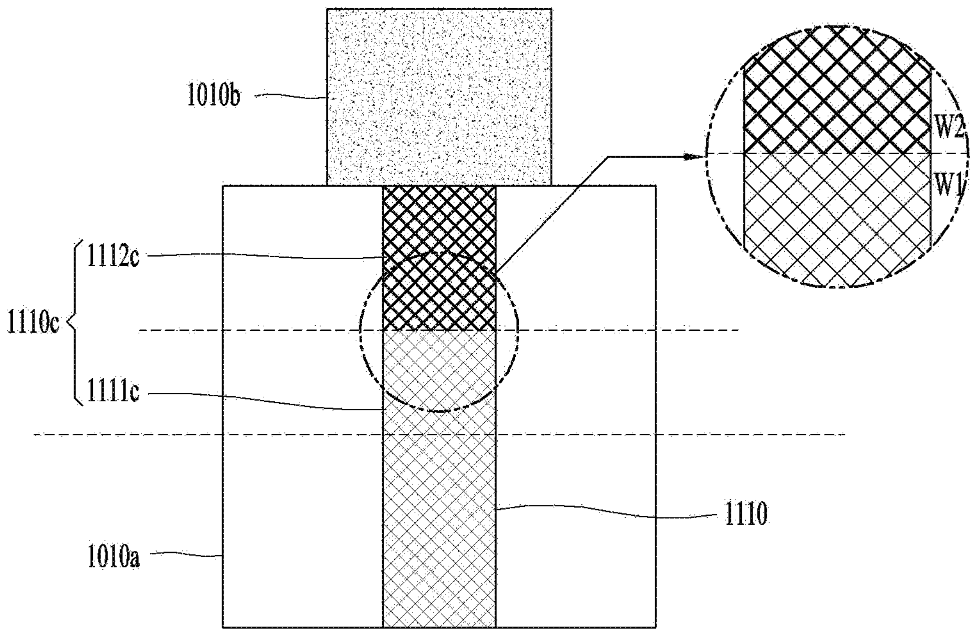
Figure 6C:
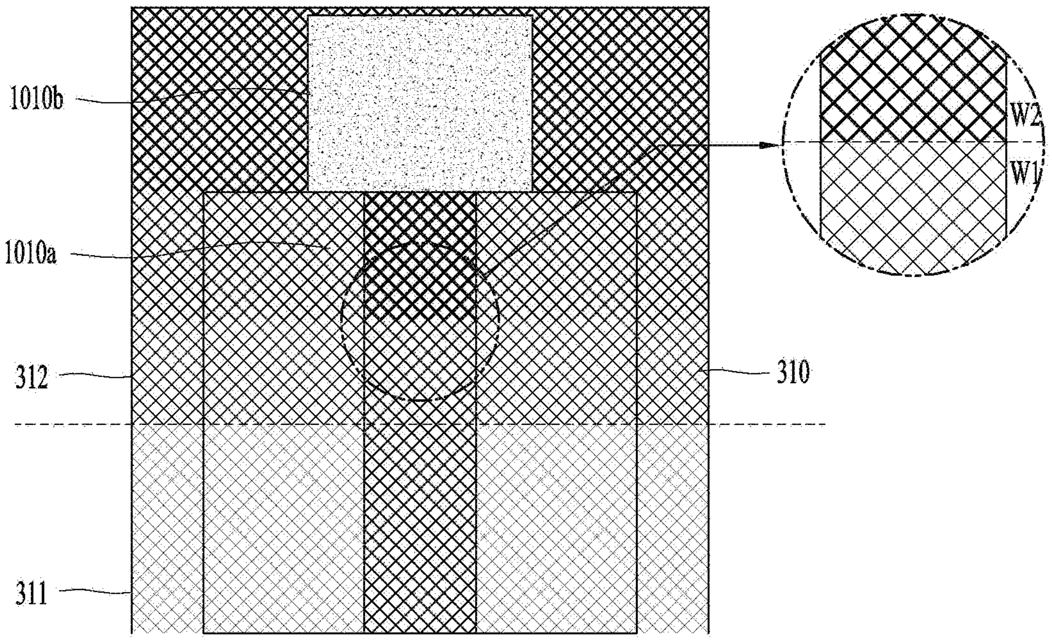

The antenna assembly formed on the vehicle glass according to the disclosure may be arranged in the transparent region and the opaque region. In this regard, FIG. 6A illustrates various embodiments of frit patterns according to the specification. FIGS. 6B and 6C illustrate transparent antenna patterns according to embodiments and structures in which the respective transparent antenna patterns are arranged on vehicle glass.

Referring to (a) of FIG. 6A, a frit pattern 312*a* may be a metal pattern in a circular (polygonal, or elliptical) shape with a certain diameter. The frit pattern 312*a* may be arranged in a two-dimensional (2D) structure in both axial directions. The frit pattern 312*a* may be formed in an offset structure where center points between patterns forming adjacent rows are spaced apart by a certain distance.

Referring to (b) of FIG. 6A, the frit pattern 312*b* may be formed as a rectangular pattern in one axial direction. The frit pattern 312*c* may be arranged in a one-dimensional structure in one axial direction or in a 2D structure in both axial directions.

Referring to (c) of FIG. 6A, the frit pattern 312*c* may be formed as a slot pattern, which is formed by removing a metal pattern in a circular (polygonal or elliptical) shape with a certain diameter. The frit pattern 312*b* may be arranged in a 2D structure in both axial directions. The frit pattern 312*c* may be formed in an offset structure where center points between patterns forming adjacent rows are spaced apart by a certain distance.

Referring to FIGS. 5A to 6C, the opaque substrate 1010*b* and the transparent substrate 1010*a* may be electrically connected to each other in the opaque region 312. In this regard, a dummy pattern, which is electrically very small to have a certain size or less, may be positioned adjacent to the antenna pattern to secure the invisibility of a transparent antenna pattern. Accordingly, a pattern within a transparent electrode may be made invisible to the naked eye without deterioration of antenna performance. The dummy pattern may be designed to have similar optical transmittance to that of the antenna pattern within a certain range.

The transparent antenna assembly including the opaque substrate 1010*b* bonded to the transparent electrode part may be mounted on the glass panel 310. In this regard, to ensure invisibility, the opaque substrate 1010*b* connected to an RF connector or coaxial cable may be arranged in the opaque region 312 of the vehicle glass. Meanwhile, the transparent electrode part may be arranged in the transparent region 311 of the vehicle glass to ensure the invisibility of the antenna from outside of the vehicle glass.

A portion of the transparent electrode part may be attached to the opaque region 312 in some cases. The frit pattern of the opaque region 312 may be gradated from the opaque region 312 to the transparent region 311. The transmission efficiency of a transmission line may be improved while improving the invisibility of the antenna when the optical transmittance of the frit pattern is adjusted to match the optical transmittance of the transparent electrode part within a certain range. Meanwhile, sheet resistance may be reduced while ensuring invisibility by adopting a metal mesh shape similar to the frit pattern. In addition, the risk of disconnection of the transparent electrode layer during manufacturing and assembly may be reduced by increasing the line width of a metal mesh grid in a region connected to the opaque substrate 1010*b*.

Referring to (a) of FIG. 6A and FIG. 6B, a conductive pattern 1110 of the antenna module may include metal mesh grids with the same line width in the opaque region 312. The conductive pattern 1110 may include a connection pattern 1110*c* for connecting the transparent substrate 1010*a* and the opaque substrate 1010*b*. In the opaque region 312, the connection pattern 1110*c* and the frit patterns of a certain shape on both side surfaces of the connection pattern 1110*c* may be arranged at certain distances. The connection pattern 1110*c* may include a first transmittance section 1111*c* with a first transmittance and a second transmittance section 1112*c* with a second transmittance.

The frit patterns 312*a* formed in the opaque region 312 may include metal grids with a certain diameter arranged in one axial direction and another axial direction. The metal grids of the frit patterns 312*a* which correspond to the second transmittance section 1112*c* of the connection pattern 1110*c* may be arranged at intersections of the metal mesh grids.

Referring to (b) of FIG. 6A and FIG. 6B, the frit patterns 312*b* formed in the opaque region 312 may include slot grids, each of which has a certain diameter and is formed by removing a metal region, arranged in one axial direction and another axial direction. The slot grids of the frit patterns 312*b* may be arranged between the metal mesh grids in the connection pattern 1110*c*. Accordingly, the metal regions of the frit patterns 312*b* where slot grids are not formed may be arranged at the intersections of the metal mesh grids.

Referring to FIGS. 6A and 6C, the connection pattern 1110*c* may include metal mesh grids with a first line width W1 in the first transmittance section 1111*c* adjacent to the transparent region 311. The connection pattern 1110*c* may be formed with a second line width W2 thicker than the first line width W1 in the second transmittance section 1112*c* adjacent to the opaque substrate 1010*b*. In this regard, the first transparency of the first transmittance section 1111*c* may be set to be higher than the second transparency of the second transmittance section 1112*c*.

When the transparent antenna assembly is attached to the inside of the vehicle glass as illustrated in FIGS. 5A to 5C, the transparent electrode part may be arranged in the transparent region 311 and the opaque substrate 1010*b* may be arranged in the opaque region 312. In this regard, the transparent electrode part may be arranged in the opaque region 312 in some cases.

Metal patterns of a low-transmittance pattern electrode part and a high-transmittance pattern electrode part that are located in the opaque region 312 may partially be arranged in a gradation area of the opaque region 312. When the antenna pattern and a transmission line portion of the low-transmission pattern electrode part are configured as a transparent electrode, a decrease in antenna gain may be caused by the deterioration of transmission efficiency due to an increase in sheet resistance. As a way to overcome this loss of gain, the transmittance of the frit pattern 312 where an electrode is located and the transmittance of the transparent electrode may be made equal to each other within a certain range.

Low sheet resistance may be achieved by increasing the line width of the transparent electrode located in a region where the transmittance of the frit pattern 312*a*, 312*b*, 312*c* is low or by adding the same shape as that of the frit pattern 312*a*, 312*b*, 312*c*. Accordingly, invisibility may be secured while solving the problem of deteriorated transmission efficiency. The transmittance and pattern of the opaque region 312 are not limited to the structure of FIG. 6A and may differ depending on a glass manufacturer or vehicle manufacturer. Accordingly, the shape and transparency (line width and separation distance) of the transparent electrode of the transmission line may change in various ways.

Figure 7A:
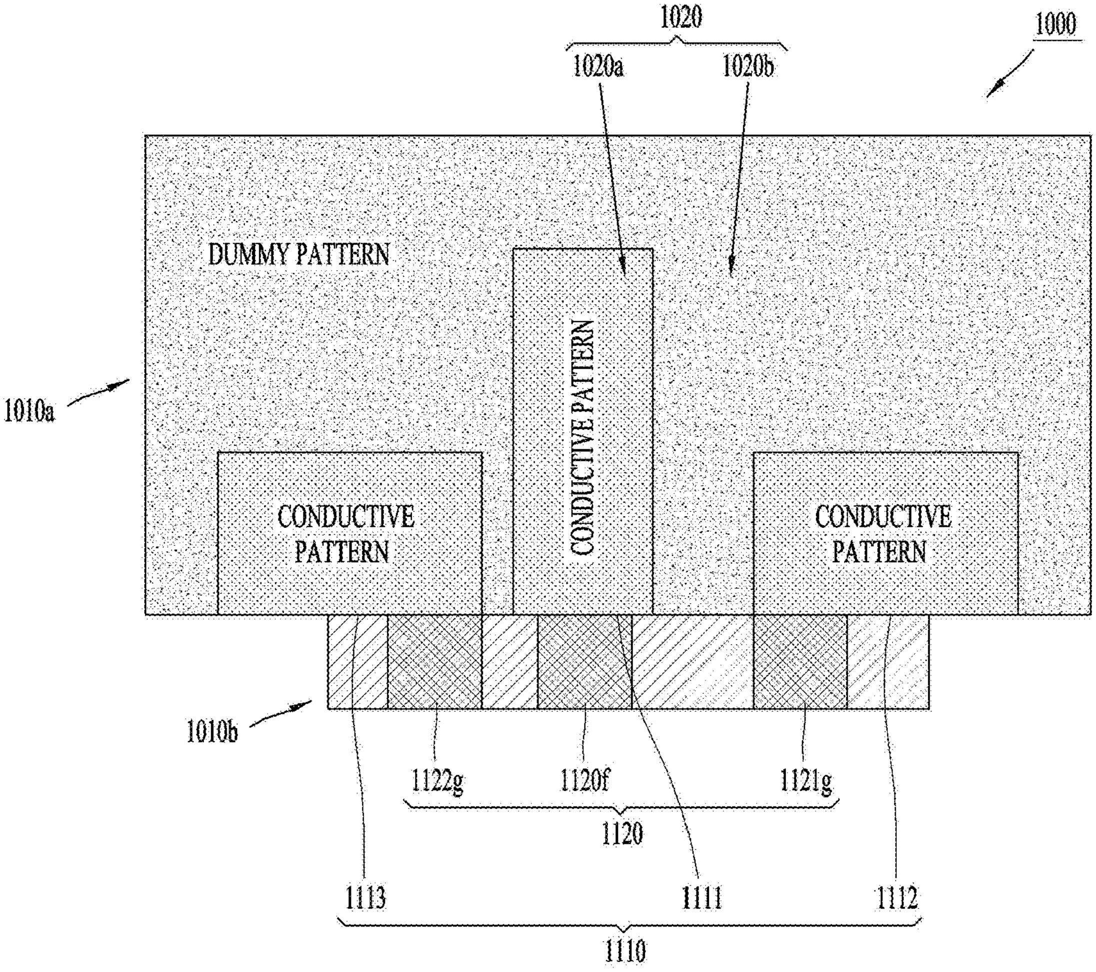
FIG. 7A is a view of a front side and a cross-section of a transparent antenna assembly according to the disclosure.
Figure 7A:
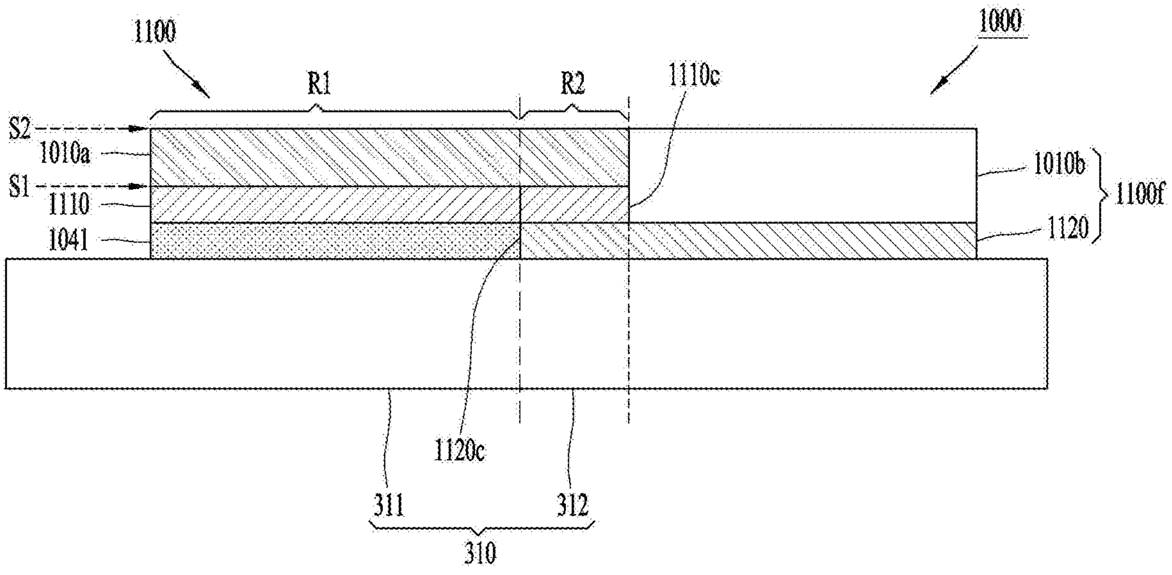
Figure 7B:
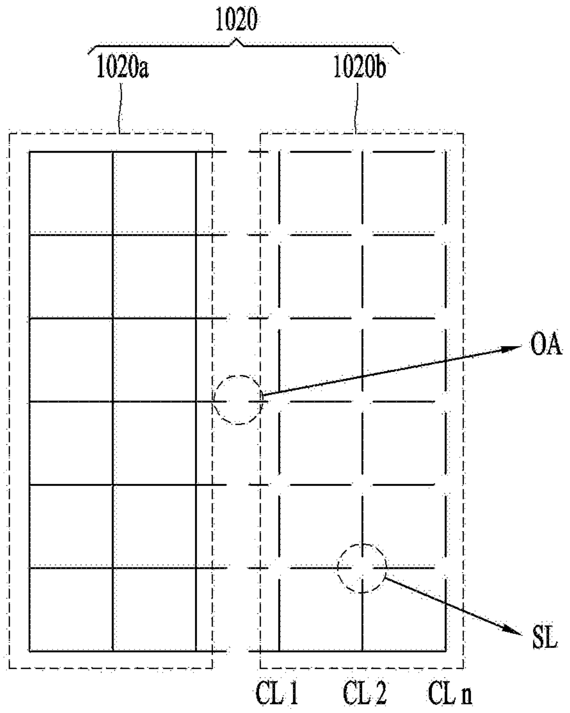
FIG. 7B is a view of a grid structure of a metal mesh radiator region and a dummy metal mesh region according to embodiments.
Figure 7B:
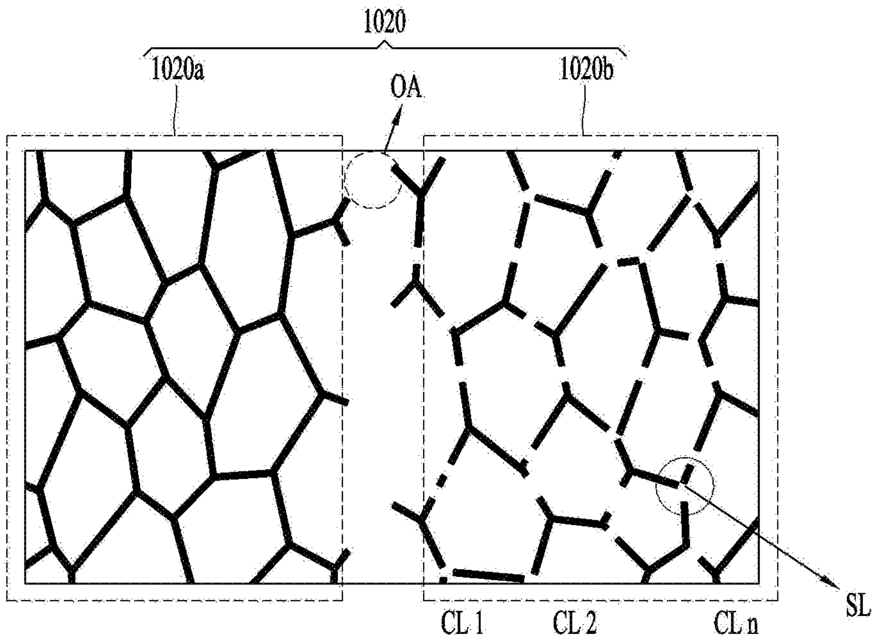

FIG. 7A shows a front view and a cross-sectional view of a transparent antenna assembly according to the disclosure. FIG. 7B illustrates a grid structure of a metal mesh radiator region and a dummy metal mesh region according to embodiments.

(a) of FIG. 7A is a front view of a transparent antenna assembly 1000, and (b) of FIG. 7A is a cross-sectional view of the transparent antenna assembly 1000, showing the layered structure of the transparent antenna assembly 1000. Referring to FIG. 7A, the antenna assembly 1000 may include a first transparent dielectric substrate 1010*a* and a second dielectric substrate 1010*b*. Conductive patterns 1110 that serves as a radiator may be arranged on one surface of the first transparent dielectric substrate 1010*a*. A feeding pattern 1120*f* and ground patterns 1121*g* and 1122*g* may be formed on one surface of the second dielectric substrate 1010*b*. The conductive patterns 1110 operating as the radiator may be configured to include one or more conductive patterns. The conductive patterns 1110 may include a first pattern 1111 connected to the feeding pattern 1120*f*, and a second pattern 1112 connected to the ground pattern 1121*g*. The conductive patterns 1110 may further include a third pattern 1113 connected to the ground pattern 1122*g*.

The conductive patterns 1110 constituting the antenna module may be implemented as a transparent antenna. Referring to FIG. 7B, the conductive patterns 1110 may be metal grid patterns 1020*a* with a certain line width or less to form a metal mesh radiator region. To maintain a certain level of transparency, dummy metal grid patterns 1020*b* may be formed in inner regions between adjacent patterns among the first to third patterns 1111, 1112, and 1113 of the conductive patterns 1100 or outer regions of them. The metal grid patterns 1020*a* and the dummy metal grid patterns 1020*b* may form a metal mesh layer 1020.

(a) of FIG. 7B illustrates a structure including typical metal grid patterns 1020*a* and dummy metal grid patterns 1020*b*. (b) of FIG. 7 illustrates a structure including atypical metal grid patterns 1020*a* and dummy metal grid patterns 1020*b*. As illustrated in (a) of FIG. 7B, the metal mesh layer 1020 may be formed in a transparent antenna structure by a plurality of metal mesh grids. The metal mesh layer 1020 may be formed in a typical metal mesh shape, such as a square shape, a diamond shape, or a polygonal shape. Conductive patterns may be configured such that the plurality of metal mesh grids operate as a feeding line or radiator. The metal mesh layer 1020 may constitute a transparent antenna region. As one example, the metal mesh layer 1020 may have a thickness of about 2 mm, but is not limited thereto.

The metal mesh layer 1020 may include the metal grid patterns 1020*a* and the dummy metal grid patterns 1020*b*. The metal grid patterns 1020*a* and the dummy metal grid patterns 1020*b* may have ends disconnected from each other to form opening areas OA, thereby being electrically disconnected. The dummy metal grid patterns 1020*b* may have slits SL formed so that ends of mesh grids CL1, CL2, . . . , CLn are not connected.

Referring to (b) of FIG. 7B, the metal mesh layer 1020 may be formed by a plurality of atypical metal mesh grids. The metal mesh layer 1020 may include the metal grid patterns 1020*a* and the dummy metal grid patterns 1020*b*. The metal grid patterns 1020*a* and the dummy metal grid patterns 1020*b* may have ends disconnected from each other to form the opening areas OA, thereby being electrically disconnected. The dummy metal grid patterns 1020*b* may have slits SL formed so that ends of mesh grids CL1, CL2, . . . , CLn are not connected.

Figure 8A:
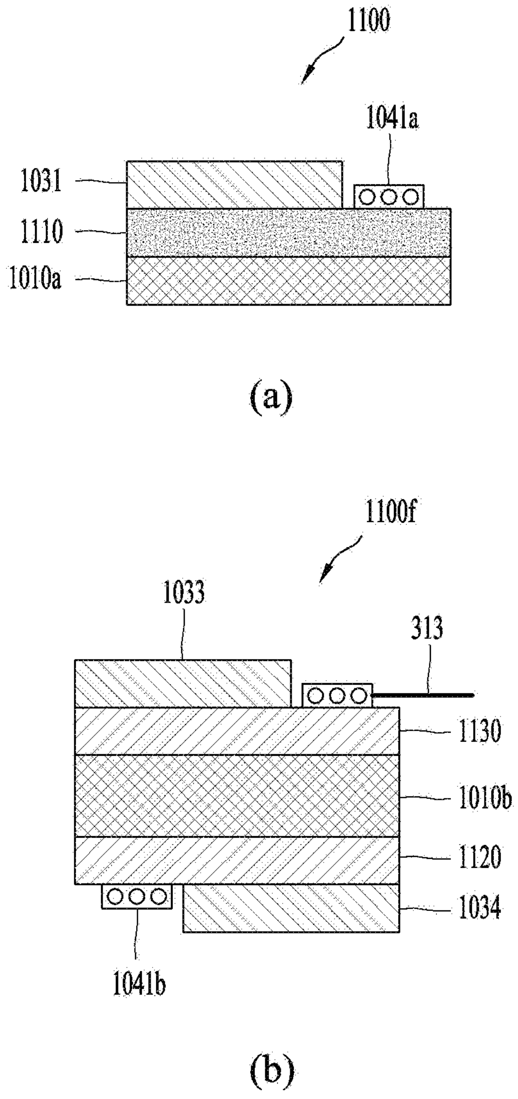
FIG. 8A is a view of a layered structure of an antenna module and a feeding module.
Figure 8B:
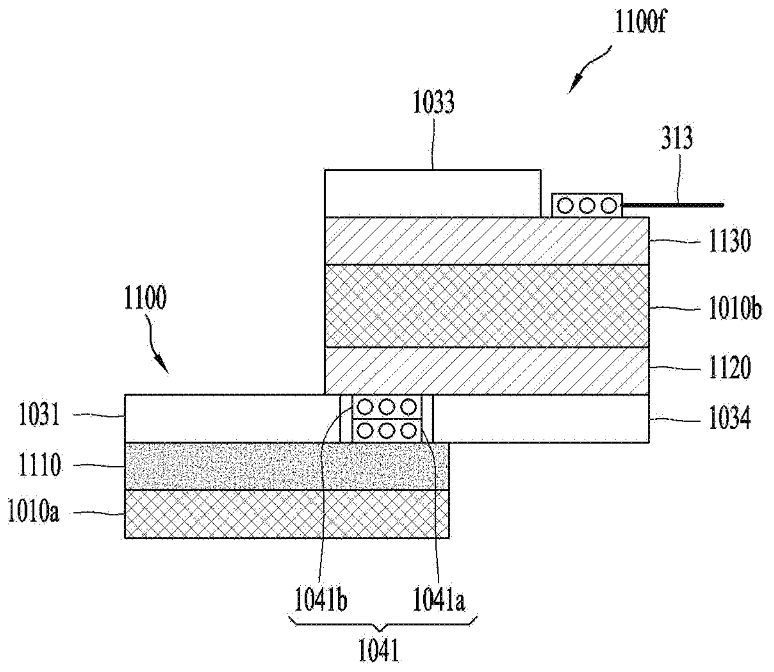
FIG. 8B is a view of an opaque substrate including a layered structure, in which the antenna module and the feeding structure are coupled to each other, and a coupling region.
Figure 8B:
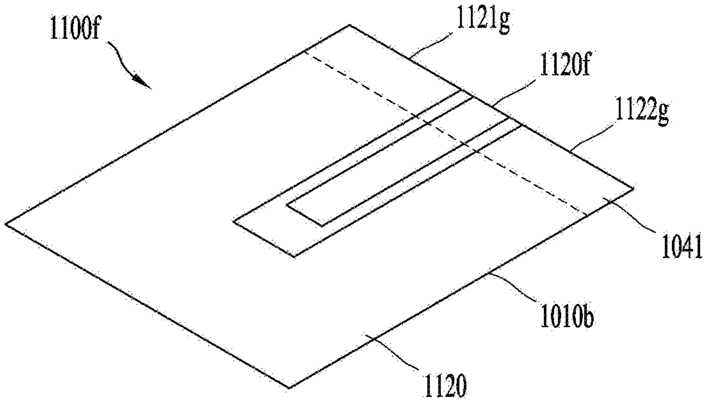

Meanwhile, the transparent substrate on which the transparent antenna according to the specification is formed may be arranged on the vehicle glass. In this regard, FIG. 8A illustrates the layered structure of an antenna module and a feeding pattern. FIG. 8B illustrates an opaque substrate including the layered structure, in which the antenna module and the feeding structure are coupled to each other, and a coupling region.

Referring to (a) of FIG. 8A, the antenna module 1100 may include a first transparent dielectric substrate 1010*a* formed on a first layer, and a first conductive pattern 1110 formed on a second layer arranged on the first layer. The first conductive pattern 1110 may be implemented as the metal mesh layer 1020 including the metal grid patterns 1020*a* and the dummy metal grid patterns 1020*b*, as illustrated in FIG. 7B. The antenna module 1100 may further include a protective layer 1031 and an adhesive layer 1041*a* arranged on the second layer.

Referring to (b) of FIG. 8A, a feeding structure 1100*f* may include a second dielectric substrate 1010*b*, a second conductive pattern 1120, and a third conductive pattern 1130. The feeding structure 1100*f* may further include first and second protective layers 1033 and 1034 stacked on the second conductive pattern 1120 and the third conductive pattern 1130, respectively. The feeding structure 1100*f* may further include an adhesive layer 1041*b* formed on a partial region of the second conductive pattern 1120.

The second conductive pattern 1120 may be arranged on one surface of the second dielectric substrate 1010*b* implemented as an opaque substrate. The third conductive pattern 1130 may be arranged on another surface of the second dielectric substrate 1010*b*. The first protective layer 1033 may be formed on the third conductive pattern 1130. The second protective layer 1034 may be formed below the second conductive pattern 1120. Each of the first and second protective layers 1033 and 1034 may be configured to have a low permittivity below a certain value, enabling low-loss feeding to the transparent antenna region.

Referring to (a) of FIG. 8B, the antenna module 1100 may be coupled with the feeding structure 1100*f* including the second dielectric substrate 1010*b*, which is the opaque substrate. The first conductive pattern 1110 implemented as the metal mesh layer, which is the transparent electrode layer, may be formed on top of the first transparent dielectric substrate 1010*a*. The protective layer 1031 may be formed on top of the first conductive pattern 1110. The protective layer 1031 and the first adhesive layer 1041*a* may be formed on top of the first conductive pattern 1110. The first adhesive layer 1041*a* may be formed adjacent to the protective layer 1031.

The first adhesive layer 1041*a* formed on the first conductive pattern 1110 may be bonded to the second adhesive layer 1041*b* formed below the second conductive layer 1120. The first transparent dielectric substrate 1010*a* and the second dielectric substrate 1010*b* may be adhered by the bonding between the first and second adhesive layers 1041*a* and 1041*b*. Accordingly, the metal mesh grids formed on the first transparent dielectric substrate 1010*a* may be electrically connected to the feeding pattern formed on the second dielectric substrate 1010*b*.

The second conductive pattern 1120 and the third conductive pattern 1130 may be arranged on one surface and another surface of the second dielectric substrate 1010*b*, thereby implementing the feeding structure 1100*f*. The feeding structure 1100*f* may be implemented as a flexible printed circuit board (FPCB), but is not limited thereto. The first protective layer 1033 may be arranged on the third conductive pattern 1130, and the second protective layer 1034 may be arranged below the second conductive pattern 1120. The adhesive layer 1041*b* below the third conductive pattern 1130 may be bonded to the adhesive layer 1041*a* of the antenna module 1100. Accordingly, the feeding structure 1100*f* may be coupled with the antenna module 1100 and the first and second conductive patterns 1110 and 1120 may be electrically connected.

The antenna module 1100 implemented with the first transparent dielectric substrate 1010*a* may be formed to have a first thickness. The feeding structure 1100*f* implemented with the second dielectric substrate 1010*b* may be formed to have a second thickness. For example, the thicknesses of the dielectric substrate 1010*a*, the first conductive pattern 1110, and the protective layer 1031 of the antenna module 1100 may be 75 μm, 9 μm, and 25 μm, respectively. The first thickness of the antenna module 1100 may be 109 μm. The thicknesses of the second dielectric substrate 1010*b*, the second conductive pattern 1120, and the third conductive pattern 1130 of the feeding structure 1100*f* may be 50 μm, 18 μm, and 18 μm, respectively, and the thicknesses of the first and second protective layers 1033 and 1034 may be 28 μm. Accordingly, the second thickness of the feeding structure 1100*f* may be 142 μm. Since the adhesive layers 1041*a* and 1041*b* are formed on the first conductive pattern 1110 and below the second conductive pattern 1120, the entire thickness of the antenna assembly may be smaller than the sum of the first thickness and the second thickness. For example, the antenna assembly 1000 including the antenna module 1100 and the feeding structure 1100*f* may have a thickness of 198 μm.

Referring to (b) of FIG. 8B, the conductive pattern 1120 may be formed on one surface of the second dielectric substrate 1010*b* forming the feeding structure 1100*f*. The conductive pattern 1120 may be formed in a CPW-type feeding structure that includes the feeding pattern 1120*f* and the ground patterns 1121*g* and 1122*g* formed on both sides of the feeding pattern 1120*f*. The feeding structure 1100*f* may be coupled with the antenna module 1100, as illustrated in (a) of FIG. 8B, through a region where the adhesive layer 1041 is formed.

The antenna module and the feeding structure constituting the antenna assembly according to the specification may be arranged on the vehicle glass and coupled through a specific coupling structure. In this regard, FIG. 9A illustrates a coupling structure of a transparent antenna that is arranged in a transparent region and a frit region of a vehicle glass.

Figure 9A:
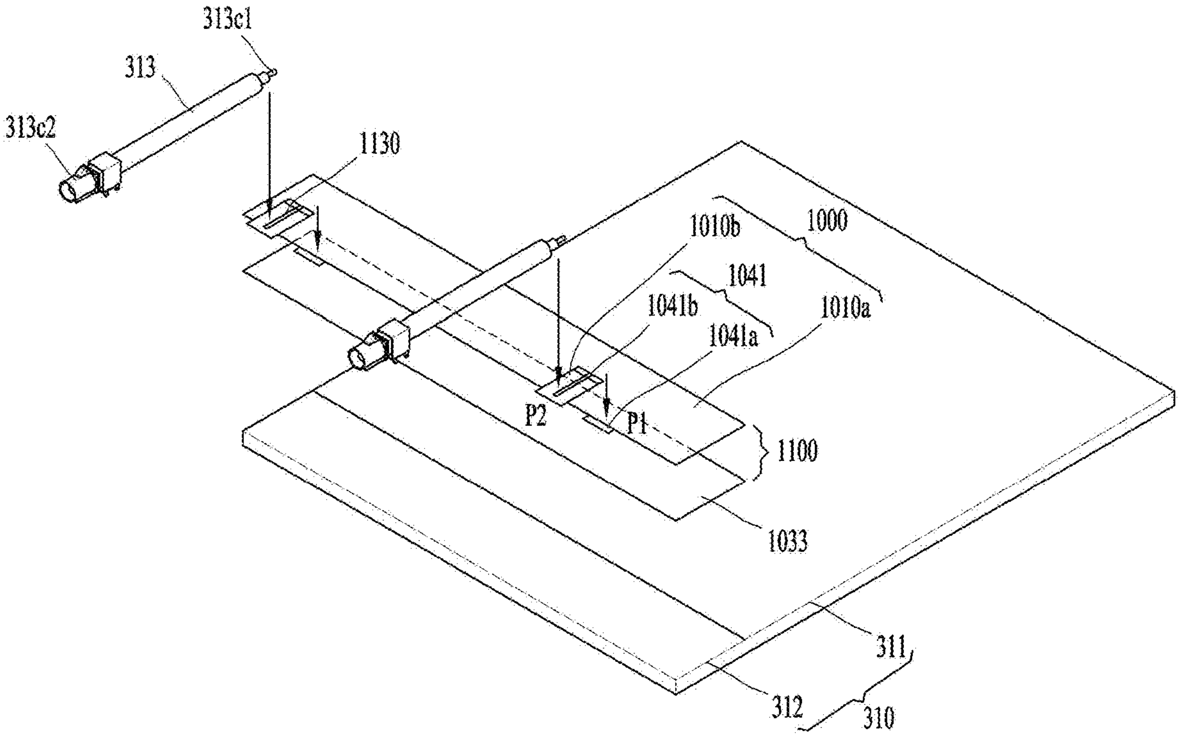
FIG. 9A is a view of a coupling structure of a transparent antenna that is arranged in a transparent region and a frit region of vehicle glass.

Referring to FIG. 9A, the first transparent dielectric substrate 1010*a* may be adhered to the glass panel 310 through the adhesive layer 1041. The conductive pattern of the first transparent dielectric substrate 1010*a* may be bonded to the conductive pattern 1130 of the second dielectric substrate 1010*b* through ACF bonding. ACF bonding involves bonding of a tape, to which metal balls are added, to a bonding surface at high temperature/high pressure (e.g., 120 to 150 degrees, 2 to 5 Mpa) for a few seconds, and may be achieved by allowing electrodes to be in contact with each other through the metal balls therebetween. ACF bonding may electrically connect conductive patterns and simultaneously provide adhesive strength by thermally hardening the adhesive layer 1041.

The first transparent dielectric substrate 1010*a*, on which the transparent electrode layer is formed, and the second dielectric substrate 1010*b* in the form of FPCB may be attached to each other through local soldering. The connection pattern of the FPCB and the transparent antenna electrode may be connected through the local soldering using a coil in a magnetic field induction manner. During such local soldering, an increase in temperature of a soldered portion may not occur or the FPCB may be maintained flat without deformation. Accordingly, an electrical connection with high reliability may be achieved through the local soldering between the conductive patterns of the first transparent dielectric substrate 1010*a* and the second dielectric substrate 1010*b*.

The first transparent dielectric substrate 1010*a*, the metal mesh layer 1020 of FIG. 7A, the protective layer 1033, and the adhesive layer 1041 may form a transparent electrode. The second dielectric substrate 1010*b*, which is the opaque substrate, may be implemented as the FPCB, but is not limited thereto. The second dielectric substrate 1010*b*, which is the FPCB with the feeding pattern, may be connected to the connector part 313 and the transparent electrode.

The second dielectric substrate 1010*b*, which is the opaque substrate, may be attached to a partial region of the first transparent dielectric substrate 1010*a*. The first transparent dielectric substrate 1010*a* may be formed in the transparent region 311 of the glass panel 310. The second dielectric substrate 1010*b* may be formed in the opaque region 312 of the glass panel 310. The partial region of the first transparent dielectric substrate 1010*a* may be formed in the opaque region 312, and the first transparent dielectric substrate 1010*a* may be coupled to the second dielectric substrate 1010*b* in the opaque region 312.

The first transparent dielectric substrate 1010*a* and the second dielectric substrate 1010*b* may be adhered by the bonding between the adhesive layers 1041*a* and 1041*b*. A position at which the second dielectric substrate 1010*b* is bonded to the adhesive layer 1041 may be set to a first position P1. A position at which the connector part 313 is soldered to the opaque substrate 1010*b* may be set to a second position P2.

Figure 9B:
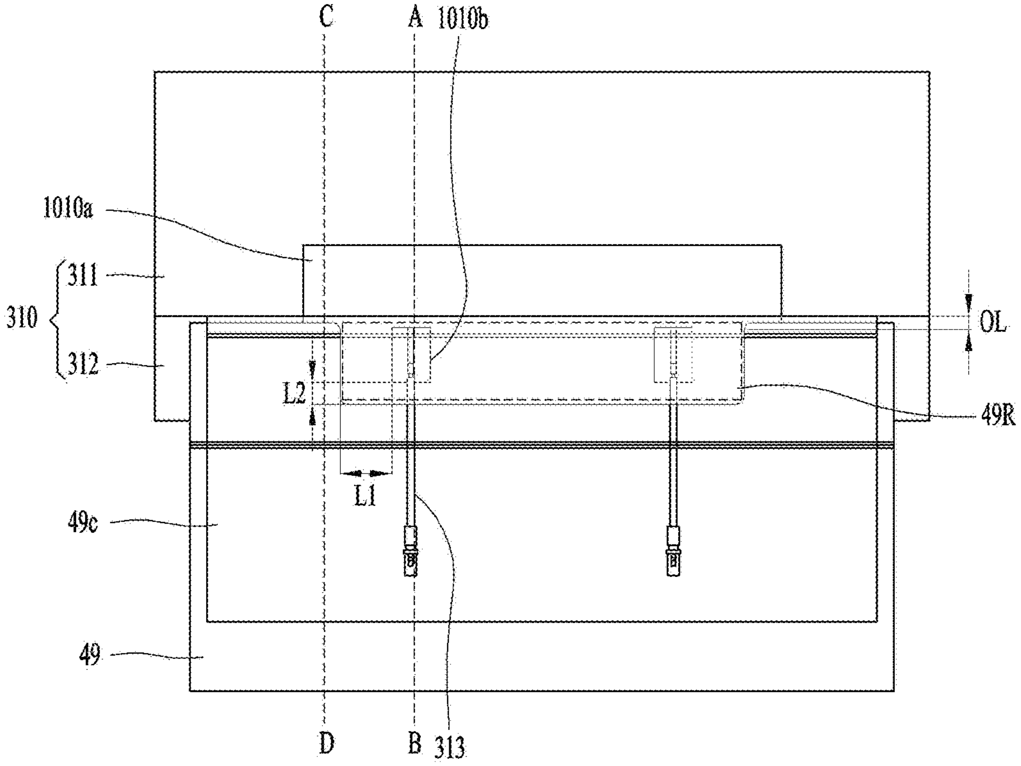
FIG. 9B is an enlarged front view of a region where glass with the transparent antenna of FIG. 9A is coupled to a body structure of the vehicle.
Figure 9C:
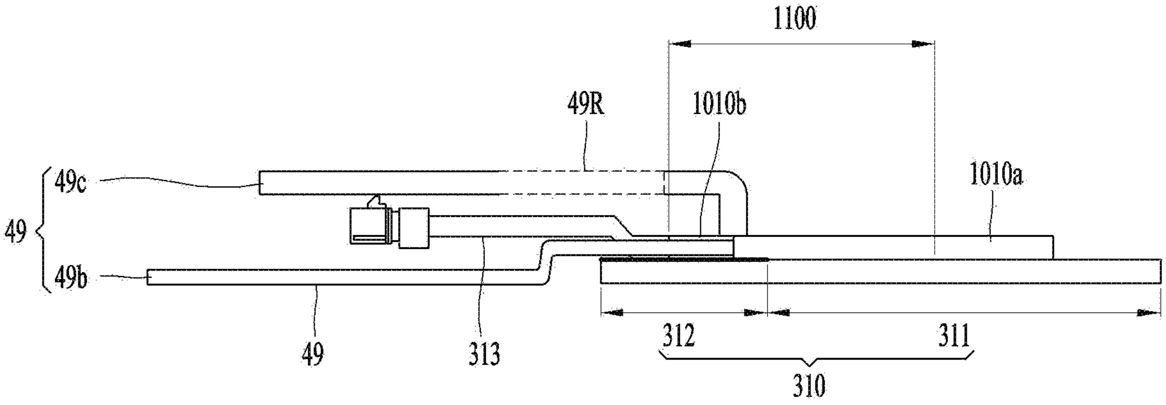
FIG. 9C is a cross-sectional view of the coupling structure between the vehicle glass and the body structure of FIG. 9B, viewed from different positions.
Figure 9C:
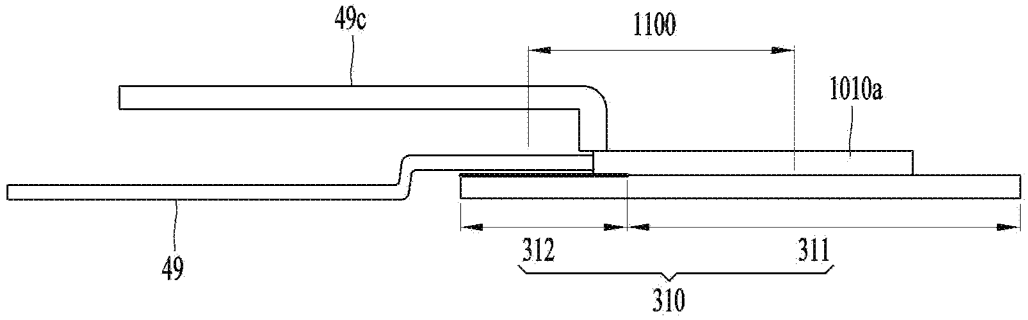

Meanwhile, the vehicle glass on which the antenna assembly according to the specification is formed may be coupled to a body structure of the vehicle. In this regard, FIG. 9B is an enlarged front view of a region where glass with the transparent antenna of FIG. 9A is coupled to a body structure of a vehicle. FIG. 9C is a cross-sectional view illustrating the coupling structure between the vehicle glass and the body structure of FIG. 9B, viewed from different positions.

Referring to FIG. 9B, the first transparent dielectric substrate 1010*a* on which a transparent antenna is formed may be arranged in the transparent region 311 of the glass panel 310. The second dielectric substrate 1010*b* may be arranged in the opaque region 312 of the glass panel 310. Since the transmittance of the opaque region 312 is lower than that of the transparent region 311, the opaque region 312 may also be referred to as a black matrix (BM) region. A portion of the first transparent dielectric substrate 1010*a* on which the transparent antenna is formed may extend up to the opaque region 312 corresponding to the BM region. The first transparent dielectric substrate 1010*a* and the opaque region 312 may be formed to overlap each other by an overlap length OL in one axial direction.

(a) of FIG. 9C is a cross-sectional view of the antenna assembly, cut along the line AB in FIG. 9B. (a) of FIG. 9C is a cross-sectional view of the antenna assembly, cut along the line CD in FIG. 9B.

Referring to FIG. 9B and (a) of FIG. 9C, the first transparent dielectric substrate 1010*a* on which the transparent antenna is formed may be arranged in the transparent region 311 of the glass panel 310. The second dielectric substrate 1010*b* may be arranged in the opaque region 312 of the glass panel 310. The partial region of the first transparent dielectric substrate 1010*a* may extend up to the opaque region 312, so that the feeding pattern formed on the second dielectric substrate 1010*b* and the metal mesh layer of the transparent antenna are bonded and connected to each other.

An interior cover 49*c* may be configured to accommodate the connector part 313 connected to the second dielectric substrate 1010*b*. The connector part 313 may be arranged in a space between a body 49*b* made of a metal material and the interior cover 49*c*, and the connector part 313 may be coupled to an in-vehicle cable. The interior cover 49*c* may be arranged in an upper region of the body 49*b* made of the metal material. The interior cover 49*c* may be formed with one end bent to be coupled to the metal body 49*b*.

The interior cover 49*c* may be made of a metal material or dielectric material. When the interior cover 49*c* is made of a metal material, the interior cover 49*c* and the body 49*b* made of the metal material may constitute a metal frame 49. In this regard, the vehicle may include the metal frame 49. The opaque region 312 of the glass panel 310 may be supported by a portion of the metal frame 49. To this end, a portion of the body 49*b* of the metal frame 49 may be bent to be coupled to the opaque region 312 of the glass panel 310.

When the interior cover 49*c* is made of a metal material, at least a portion of a metal region of the interior cover 49*c* in the upper region of the second dielectric substrate 1010*b* may be cut out. A recess portion 49R from which the metal region has been cut out may be formed in the interior cover 49*c*. Accordingly, the metal frame 49 may include the recess portion 49R. The second dielectric substrate 1010*b* may be placed within the recess portion 49R of the metal frame 49.

The recess portion 49R may also be referred to as a metal cut region. One side of the recess portion 49R may be formed to be spaced apart from one side of the opaque substrate 1010*b* by a first length L1 which is equal to or greater than a threshold value. A lower boundary side of the recess portion 49R may be formed to be spaced apart from a lower boundary side of the opaque substrate 1010*b* by a second length L2 which is equal to or greater than a threshold value. As the metal is removed from the partial region of the interior cover 49*c* made of the metal material, signal loss and changes in antenna characteristics due to a surrounding metal structure may be suppressed.

Referring to FIG. 9B and (b) of FIG. 9C, a recess portion like a metal cut region may not be formed in the interior cover 49*c* in a region where the connector part and the opaque substrate are not arranged. In this regard, while protecting the internal components of the antenna module 1100 by use of the interior cover 49*c*, internal heat may be dissipated to the outside through the recess portion 49R of FIG. 9B and (a) of FIG. 9C. In addition, whether it is necessary to repair a connected portion may be immediately determined through the recess portion 49R of the interior cover 49*c*. Meanwhile, since the recess portion is not formed in the interior cover 49*c* in a region where the connector part and the second dielectric substrate are not arranged, the internal components of the antenna module 1100 may be protected.

Meanwhile, an antenna assembly 1000 according to the specification may be formed in various shapes on a glass panel 310, and the glass panel 310 may be attached to a vehicle frame. In this regard, FIG. 10 illustrates a stacked structure of an antenna assembly and an attachment region between vehicle glass and a vehicle frame according to embodiments.

Figure 10:
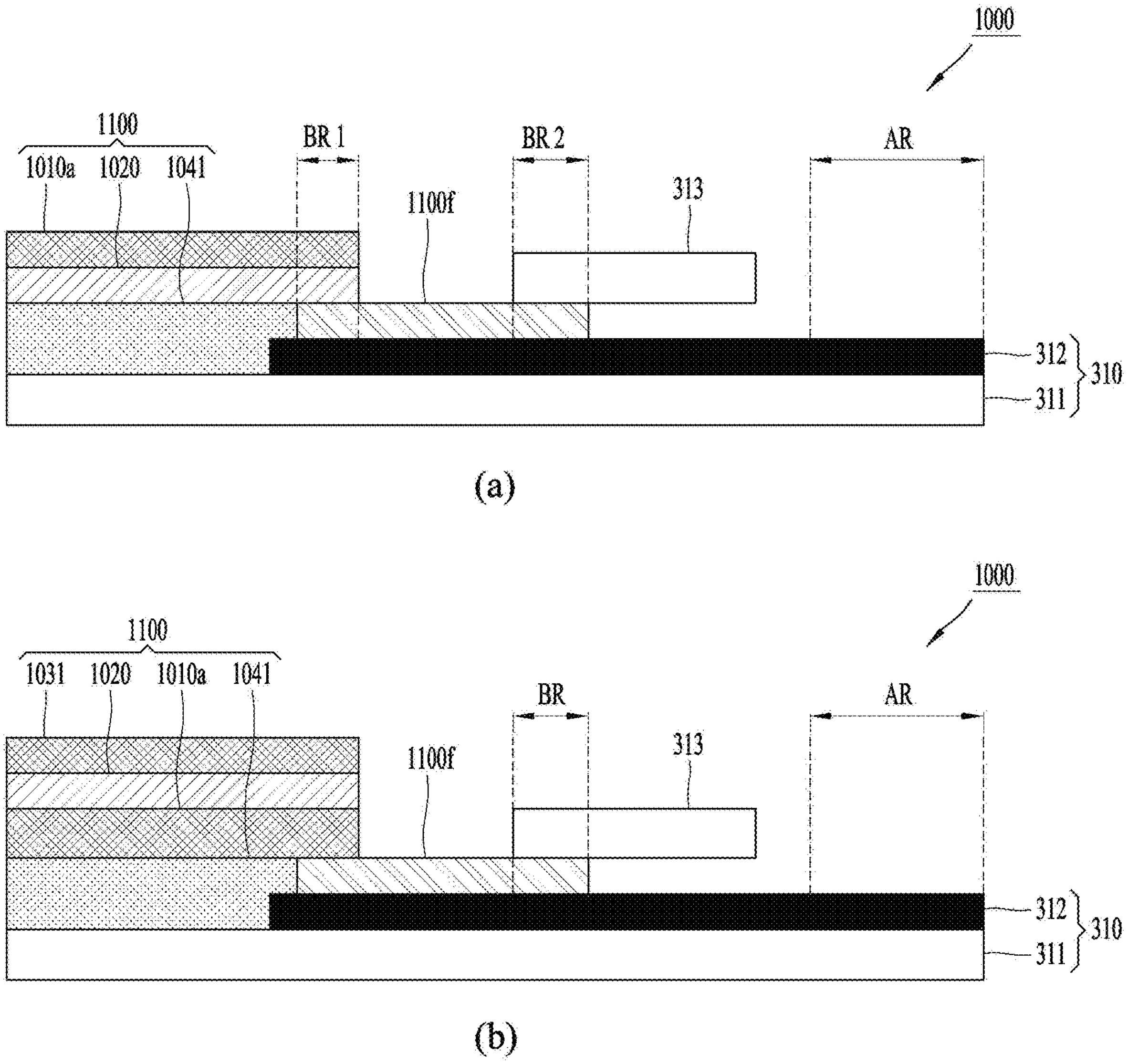
FIG. 10 is a view of a stacked structure of an antenna assembly and an attachment region between vehicle glass and a vehicle frame according to embodiments.

Referring to (a) of FIG. 10, the glass panel 310 may include a transparent region 311 and an opaque region 312. The antenna assembly 1000 may include an antenna module 1100 and a feeding structure 1100*f*. The antenna module 1100 may include a first transparent dielectric substrate 1010*a*, a transparent electrode layer 1020, and an adhesive layer 1041. The feeding structure 1100*f* implemented as the opaque substrate and the transparent electrode layer 1020 implemented as the transparent substrate may be electrically connected to each other. The feeding structure 1100*f* and the transparent electrode layer 1020 may be directly connected through a first bonding region BR1. The feeding structure 1100*f* and the connector part 313 may be directly connected through a second bonding region BR2. Heat may be applied for bonding in the first and second bonding regions BR1 and BR2. Accordingly, the bonding regions BR1 and BR2 may be referred to as heating sections. An attachment region AR corresponding to a sealant region for attachment of the glass panel 310 to the vehicle frame may be formed on a side end area in the opaque region 312 of the glass panel 310.

Referring to (b) of FIG. 10, the glass panel 310 may include a transparent region 311 and an opaque region 312. The antenna assembly 1000 may include an antenna module 1100 and a feeding structure 1100*f*. The antenna module 1100 may include a protective layer 1031, the transparent electrode layer 1020, a first transparent dielectric substrate 1010*a*, and an adhesive layer 1041. The feeding structure 1100*f* implemented as an opaque substrate may overlap a partial region of the antenna module 1100 implemented as a transparent substrate. The feeding structure 1100*f* and the transparent electrode layer 1020 of the antenna module 1100 may be connected in a coupled-feeding manner. The feeding structure 1100*f* and the connector part 313 may be directly connected through a bonding region BR. Heat may be applied for bonding in the bonding region BR1. Accordingly, the bonding region BR may be referred to as a heating section. An attachment region AR corresponding to a sealant region for attachment of the glass panel 310 to the vehicle frame may be formed on a side end area in the opaque region 312 of the glass panel 310.

Referring to (a) and (b) of FIG. 10, the transparent substrate 1010*a* may include a (hard) coating layer to protect the transparent electrode layer 1020 from an external environment. Meanwhile, a UV-cut component may be added to the adhesive layer 1041 to suppress yellowing due to sunlight.

Figure 11:
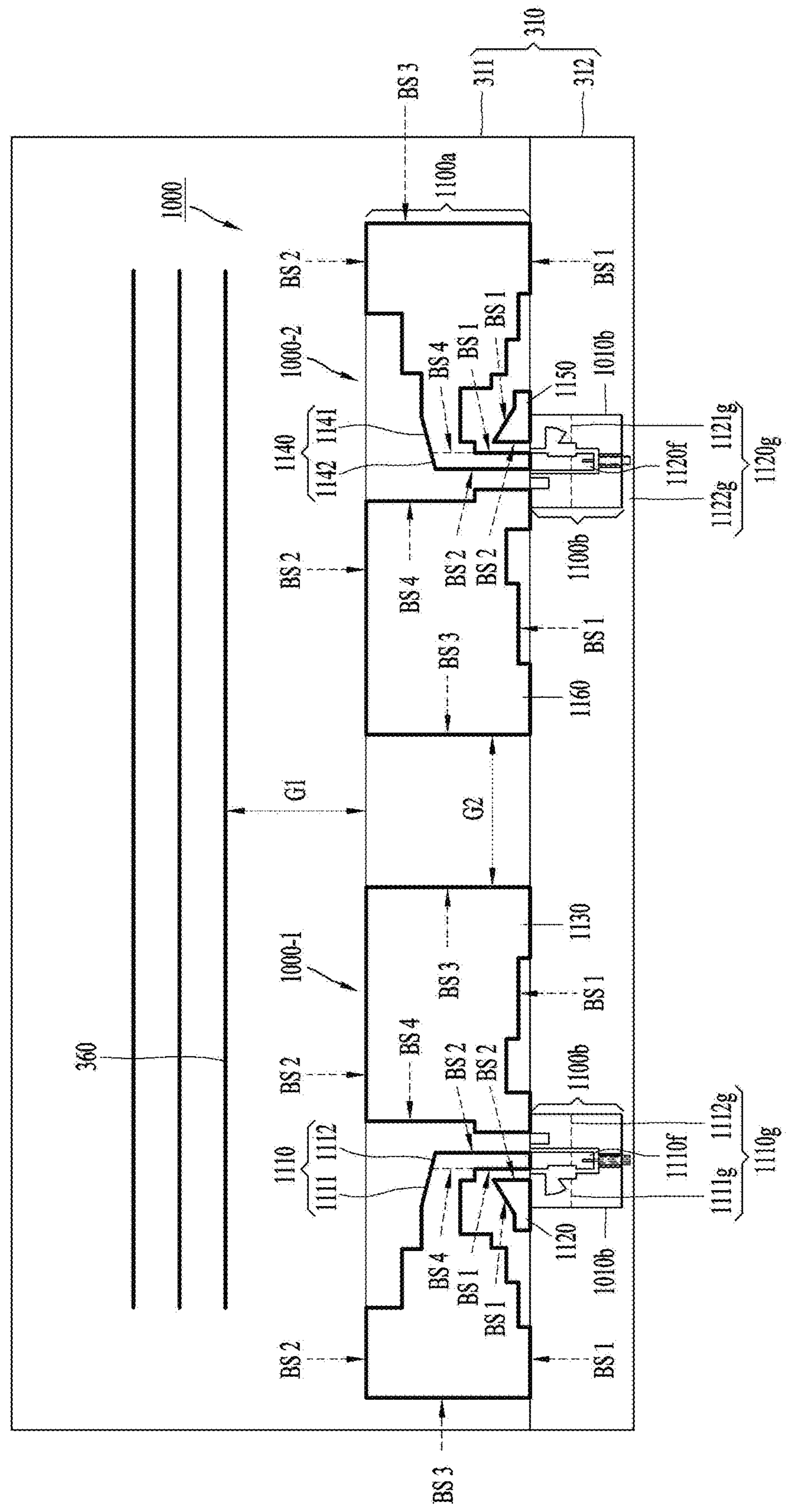
FIG. 11 is a front view of an antenna assembly that may be attached on vehicle glass according to the disclosure.

Hereinafter, a vehicle having an antenna assembly that may be attachable to vehicle glass according to this specification will be described with reference to the drawings. In this regard, FIG. 11 is a front view of an antenna assembly that may be attached on vehicle glass according to the disclosure. And, FIG. 12A is a view of a structure in which the antenna assembly of FIG. 11 is arranged on rear glass on which a plurality of heat line patterns are arranged.

Figure 12A:
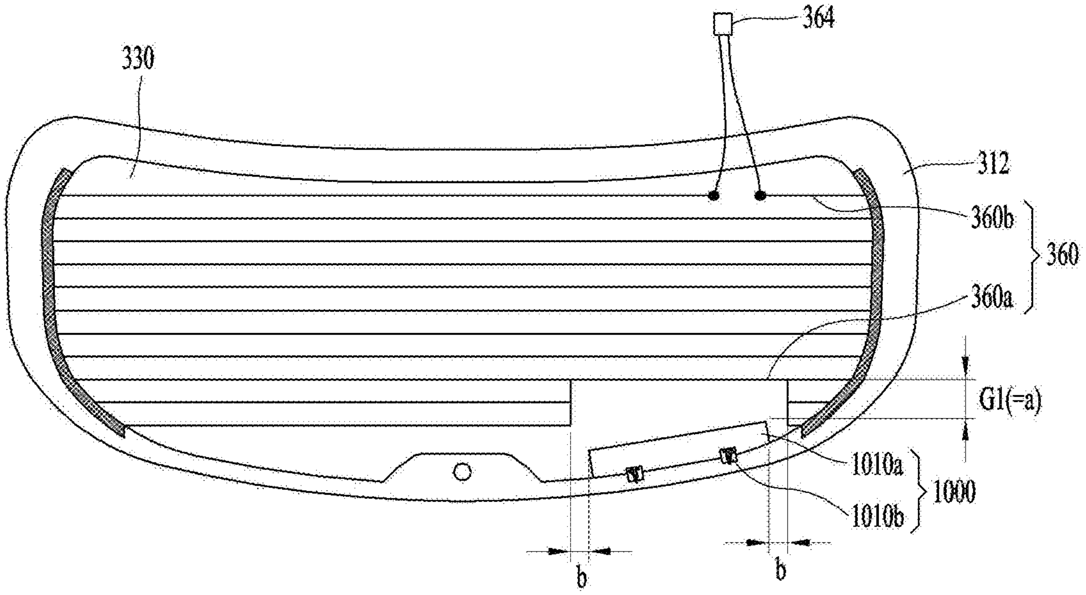
FIG. 12A is a view of a structure in which the antenna assembly of FIG. 11 is arranged on rear glass on which a plurality of heat line patterns are arranged.

Referring to FIGS. 9A, 11, and 12A, the vehicle may include a glass panel 310 and an antenna assembly 1000. The antenna assembly 1000 may be arranged on the glass panel 310.

A first region 1100*a* may include antenna elements 1100 that include conductive patterns on one side of the first dielectric substrate 1010*a* and are configured to radiate radio signals. A second region 1100*b* may include a ground conductive pattern 1110*g* and a feeding pattern 1110*f*. The first region 1100*a* and the second region 1100*b* may also be referred to as a radiator region and a ground region (or a feeding region), respectively.

The antenna elements 1100 may include a plurality of antenna structures and may also be referred to as an antenna module 1100. The antenna elements 1100 may include a first radiation structure 1100-1 and a second radiation structure 1110-2.

Each of the first radiation structure 1100-1 and the second radiation structure 1100-2 formed in the first region 1100*a* of the antenna assembly 1000 may be implemented with two or more conductive patterns and configured to operate in a plurality of frequency bands. The plurality of conductive patterns formed in the first region 1100*a* may include a first conductive pattern 1110 and a third conductive pattern 1130. The plurality of conductive patterns may further include a first conductive pattern 1110, a second conductive pattern 1120, and a third conductive pattern 1130.

The first radiation structure 1100-1 may include the first conductive pattern 1110, the second conductive pattern 1120, and the third conductive pattern 1130. The first conductive pattern 1110 may include a plurality of sub-patterns, namely, a plurality of conductive parts. The first conductive pattern 1110 may include a first part 1111 and a second part 1112. The first part 1111 may be formed perpendicularly to the second part 1112. The second part 1112 may be electrically connected to the feeding pattern 1110*f*. In this regard, "being electrically connected" may mean that the respective conductive parts are connected directly or by being spaced apart at a certain gap.

The second conductive pattern 1120 may be arranged in one side region or lower region of the first conductive pattern 1110. The second conductive pattern 1120 may be electrically connected to a first part 1111*g* of the ground conductive pattern 1110*g*. The second conductive pattern 1120 may further be arranged on the antenna assembly 1000 to resonate further in a frequency band different from the operating frequency bands of the first conductive pattern 1110 and the third conductive pattern 1130.

The third conductive pattern 1130 may be arranged in another side region of the first conductive pattern 1110. The third conductive pattern 1130 may be electrically connected to a second part 1112*g* of the ground conductive pattern 1110*g*. The size of the second conductive pattern 1120 may be smaller than the size of the third conductive pattern 1130. Accordingly, the antenna assembly 1000 may operate as a radiator in a higher frequency band by the second conductive pattern 1120.

The second conductive pattern 1120 may be located between the first part 1111 of the first conductive pattern 1110 and the ground conductive pattern 1110*g*. The second conductive pattern 1110 may be located between the first part 1111 of the first conductive pattern 1110 and the second part 1112 of the first conductive pattern 1110. Accordingly, the second conductive pattern 1120 may be arranged in a lower region of the first conductive pattern 1110, and the size of the antenna assembly 1000 may be reduced compared to the case where the second conductive pattern 1120 is arranged in one side region of the first conductive pattern 1110. The first part 1111 of the first conductive pattern 1110 and the third conductive pattern 1130 may be arranged on opposite sides with respect to the second part 1112 of the first conductive pattern 1110. The first part 1111 of the first conductive pattern 1110 and the third conductive pattern 1130 may be arranged in one side region and another side region with respect to the second part 1112 of the first conductive pattern 1110.

The second radiation structure 1100-2 may include a fourth conductive pattern 1140, a fifth conductive pattern 1150, and a third conductive pattern 1160. The fourth conductive pattern 1140 may include a plurality of sub-patterns, namely, a plurality of conductive parts. The fourth conductive pattern 1140 may include a third part 1141 and a fourth part 1142. The third part 1141 may be formed perpendicularly to the fourth part 1142. The fourth part 1142 may be electrically connected to the feeding pattern 1110*f*. In this regard, "being electrically connected" may mean that the respective conductive part are connected directly or by being spaced apart at a certain gap.

The fifth conductive pattern 1150 may be arranged in one side region or a lower region of the fourth conductive pattern 1140. The fifth conductive pattern 1150 may be electrically connected to a first part 1121*g* of the second ground conductive pattern 1120*g*. The fifth conductive pattern 1150 may further be arranged on the antenna assembly 1000 to resonate further in a frequency band different from the operating frequency bands of the fourth conductive pattern 1140 and the sixth conductive pattern 1160.

The sixth conductive pattern 1160 may be arranged in another side region of the fourth conductive pattern 1140. The sixth conductive pattern 1160 may be electrically connected to a second part 1122*g* of a second ground conductive pattern 1120*g*. The size of the fifth conductive pattern 1150 may be smaller than the size of the sixth conductive pattern 1160. Accordingly, the antenna assembly 1000 may operate as a radiator in a higher frequency band by the fifth conductive pattern 1150.

The fifth conductive pattern 1150 may be arranged between the third part 1141 of the fourth conductive pattern 1140 and the second ground conductive pattern 1120*g*. The fifth conductive pattern 1140 may be arranged between the third part 1141 of the fourth conductive pattern 1140 and the fourth part 1142 of the fourth conductive pattern 1110. Accordingly, the fifth conductive pattern 1150 may be arranged in a lower region of the fourth conductive pattern 1140, and the size of the antenna assembly 1000 may be reduced compared to the case where the fifth conductive pattern 1150 is arranged in one side region of the fourth conductive pattern 1140. The third part 1141 of the fourth conductive pattern 1140 and the sixth conductive pattern 1160 may be arranged on opposite sides with respect to the fourth part 1142 of the fourth conductive pattern 1140. The third part 1141 of the fourth conductive pattern 1140 and the sixth conductive pattern 1160 may be arranged in one side region and another side region with respect to the fourth part 1142 of the fourth conductive pattern 1140.

The first radiation structure 1100-1 and the second radiation structure 1100-2 may have a symmetrical structure with respect to one axis. With regard to this, the third conductive pattern 1130 of the first radiation structure 1100-1 may be arranged to oppose the sixth conductive pattern 1160 of the second radiation structure 1100-2. The first conductive pattern 1110 and the fourth conductive pattern 1140 may be spaced apart by a certain distance or more by the third and sixth conductive patterns 1130 and 1160, which are connected with the ground conductive patterns 1110*g* and 1120*g*. For example, the second conductive pattern 1120 and the fifth conductive pattern 1150 may be spaced apart by at least a certain distance by the third and sixth conductive patterns 1130 and 1160, which are connected with the ground conductive patterns 1110*g* and 1120*g*.

By virtue of the structure in which the third and sixth conductive patterns 1130 and 1160 oppose each other, the isolation between the first conductive pattern 1110 and the fourth conductive pattern 1140 that operate in a monopole antenna mode may be improved in a second frequency band. Also, by virtue of the structure in which the third and sixth conductive patterns 1130 and 1160 oppose each other, the isolation between the second conductive pattern 1120 and the fifth conductive pattern 1150 may be improved in a third frequency band.

The first radiation structure 1100-1 and the second radiation structure 1100-2 may be configured to perform MIMO. By the structure in which the third and sixth conductive patterns 1130 and 1160 oppose each other, the isolation between the first radiation structure 1100-1 and the second radiation structure 1100-2 may be improved in the second and third frequency bands. The isolation between the first radiation structure 1100-1 and the second radiation structure 1100-2 may be improved even in the first frequency band by virtue of an asymmetrical structure between the first and third conductive patterns 1110 and 1130 and an asymmetrical structure between the fourth and fifth conductive patterns 1140 and 1160.

Meanwhile, the antenna assembly according to the specification may be arranged on vehicle glass on which a plurality of heat line patterns are arranged. Referring to FIG. 12, a plurality of heat line patterns 360 may be arranged on the rear glass 330 with being spaced apart from each other in one axial direction or another axial direction. The antenna assembly 1000 may be arranged in the lower region of the rear glass 330, but is not limited thereto. The antenna assembly 1000, as illustrated in FIG. 1, may be arranged in a specific region of at least one of the front glass 320, side glass 320, door glass 320, rear glass 330, quarter glass 340, and upper glass 350.

The antenna assembly 1000 may be arranged to be spaced apart from a heat line pattern 360*a*, which is arranged in a lower region, among the plurality of heat line patterns 360 by a first gap G1 (G1=a) in one axial direction. The antenna assembly 1000 may be arranged at certain gaps b in another axial direction from heat line patterns, which are arranged in one side and another side regions, among the plurality of heat line patterns 360. Additionally, the first and second radiation structures 1100-1 and 1100-2 of the antenna assembly 1000 may be arranged to be spaced apart from each other by a second gap G2 in the another axial direction. Accordingly, the third conductive pattern 1130 may be spaced apart from the sixth conductive pattern 1160 by the second gap G2. For example, the third conductive pattern 1130 and the sixth conductive pattern 1160 may be spaced apart from each other by at least 31 mm (0.12 λg, @600 MHz).

One end and another end of a heat line pattern 360*b*, which is located in an upper region, among the plurality of heat line patterns 360 may be connected to a heat line connector 363. Accordingly, the plurality of heat line patterns 360 may be operably coupled with a control unit that controls the heat lines of the vehicle.

Referring to FIGS. 9A, 11, and 12A, the glass panel 310 may include a plurality of heat line patterns 360. One of the plurality of heat line patterns 360 may be arranged to be spaced apart from the antenna elements 1100 by the first gap G1. The third conductive pattern 1130 may be spaced apart from the sixth conductive pattern by the second gap G2.

Lengths of the first region 1100*a*, which is a radiator region constituting the antenna assembly 1000, in one axis and another axis may be formed longer than lengths of the second region 1100*b*, which is a feeding region, in the one axis and the another axis. In this regard, a horizontal length of the first ground conductive pattern 1110*g* may be shorter than a horizontal length from the first conductive pattern 1110 to the fourth conductive pattern 1140. a vertical length of the first ground conductive pattern may be shorter than a vertical length from the first conductive pattern 1110. An area of the second dielectric substrate 1010*b*, on which the ground conductive patterns 1110*g* and 1120*g* are formed, may be smaller than an area of the first dielectric substrate 1010*a*, on which the conductive patterns 1110 to 1130 and 1140 to 1160 are formed. The vertical length from the first conductive pattern 1110 may be 35.6 mm. A vertical length of the antenna assembly 1000 arranged in the transparent region 311 and the opaque region 312 may be 55.8 mm. A vertical length of the first ground conductive pattern may be 55.8-35.6=20.2 mm.

Meanwhile, an area of the third and sixth conductive patterns 1130 and 1160 connected to the ground conductive patterns 1110*g* and 1120*g* may be larger by a certain ratio than an area of the first and fourth conductive patterns 1110 and 1140 connected to the feeding patterns 1110*f* and 1120G. In this regard, the first and fourth conductive patterns 1110 and 1140 may each be formed such that each of upper and lower regions has a step structure. In some examples, the third and sixth conductive patterns 1130 and 1160 may be formed such that any one of the upper and lower regions has a step structure.

The area of the third and sixth conductive patterns 1130 and 1160 may be at least 10% larger than the area of the first and fourth conductive patterns 1110 and 1140. For example, the area of the third and sixth conductive patterns 1130 and 1160 may be 1640 $mm^2$, and the area of the first and fourth conductive patterns 1110 and 1140 may be 1445 $mm^2$. In some embodiments, the area of the second and fifth conductive patterns 1120 and 1150 connected to the ground conductive patterns 1110*g* and 1120*g* may be 58 $mm^2$.

In some embodiments, the antenna assembly according to the specification may be arranged on vehicle glass on which a plurality of heat line patterns are arranged. Referring to FIG. 12, a plurality of heat line patterns 360 may be arranged on the rear glass 330 with being spaced apart from each other in one axial direction or another axial direction. The antenna assembly 1000 may be arranged in the lower region of the rear glass 330, but is not limited thereto. The antenna assembly 1000, as illustrated in FIG. 1, may be arranged in a specific region of at least one of the front glass 320, side glass 320, door glass 320, rear glass 330, quarter glass 340, and upper glass 350.

The antenna assembly 1000 may be arranged to be spaced apart from a heat line pattern 360*a*, which is arranged in a lower region, among the plurality of heat line patterns 360 by a first gap G1 in one axial direction. The antenna assembly 1000 may be arranged to be spaced apart from heat line patterns, which are arranged in the lower region, among the plurality of heat line patterns 360 by a second gap G2 in another axial direction. One end and another end of a heat line pattern 360*b*, which is located in an upper region, among the plurality of heat line patterns 360 may be connected to a heat line connector 363. Accordingly, the plurality of heat line patterns 360 may be operably coupled with a control unit that controls the heat lines of the vehicle.

Referring to FIGS. 9A, 11, and 12A, the glass panel 310 may include a plurality of heat line patterns 360. The size of the plurality of heat line patterns 360 may be sufficiently larger than that of the first dielectric substrate 1000 by at least a certain ratio. In this regard, the size of the plurality of heat line patterns 360 may be larger than or equal to a first size in a horizontal axial direction and larger than or equal to a second size in a vertical axial direction. The first size in the horizontal axial direction may be set to be larger than the second size in the vertical axial direction. Based on 600 MHZ, which is the lowest frequency among antenna operating frequencies, the first size in the horizontal axial direction may be 3 $\lambda g$ or more, which corresponds to three wavelengths. The second size in the vertical axial direction may be at least 1.5 $\lambda g$ as a 1.5 wavelength. In this regard, the permittivity of the glass panel 310 may be set to about 6.7, but is not limited thereto.

One of the plurality of heat line patterns 360 may be arranged to be spaced apart from the antenna elements by a first gap G1 (G1=a) in one axial direction. The third conductive pattern 1130 may be spaced apart from the sixth conductive pattern by a second gap G2. In some examples, the plurality of heat line patterns 360 may be formed spaced apart from one end and another end of the antenna assembly 1000 by a certain gap b in another axial direction.

As described above, the heat line patterns 360 and the conductive patterns in the antenna assembly 1000 need to be spaced apart from each other by the certain gap, i.e., the first gap G1. In this regard, FIG. 12B is a view of frequency-dependent antenna efficiency characteristics according to a gap change between the heat line patterns and the conductive patterns in the antenna assembly.

Referring to FIGS. 11 and 12A, the third and sixth conductive patterns 1130 and 1160 may be formed up to the top of the antenna assembly 1000. Accordingly, the gap between the heat line patterns 360 and the conductive patterns in the antenna assembly 1000 may correspond to the first gap G1, which is the gap from the top of the antenna assembly 1000 to the bottom of the plurality of heat line patterns 360.

Figure 12B:
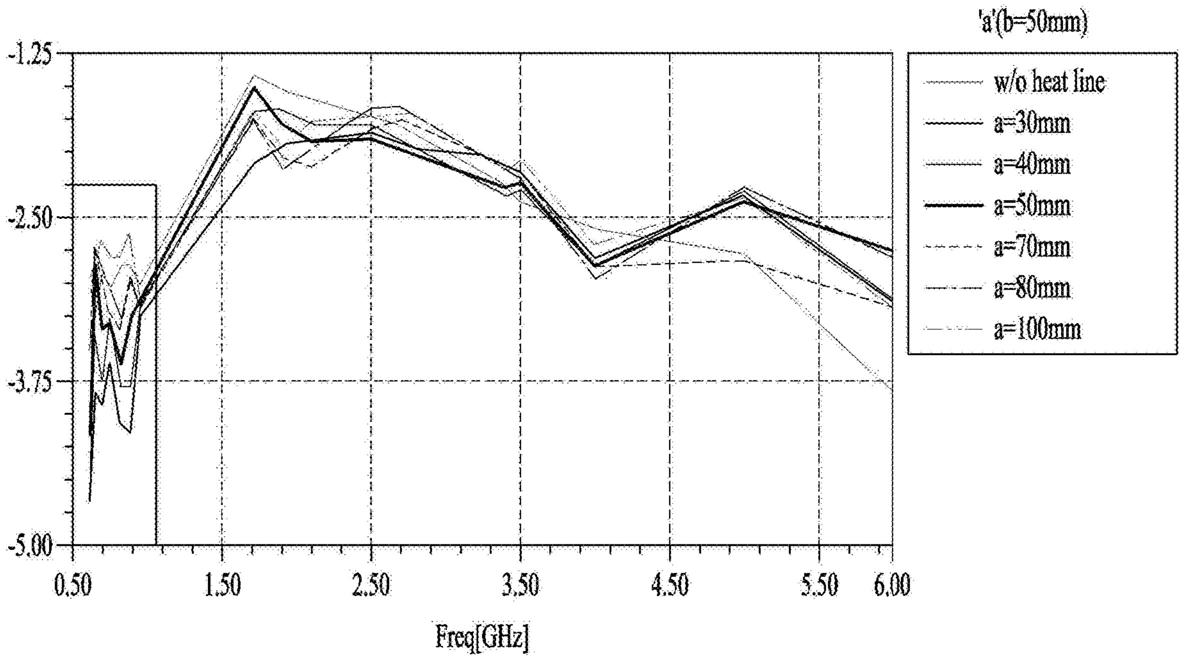
FIG. 12B is a view of frequency-dependent antenna efficiency characteristics according to a gap change between the heat line patterns and conductive patterns inside the antenna assembly.

Referring to FIGS. 11 to 12B, the first gap G1, which corresponds to the gap from the top of the antenna assembly 1000 to the bottom of the plurality of heat line patterns 360, may be indicated by a. In some examples, the gap in the another axial direction from the one end and another end of the antenna assembly 1000 to the plurality of heat line patterns 360 may be indicated by b.

Referring to FIG. 12B, it may be seen that the antenna efficiency has the highest value when the gap a is set to 100 (a=100 mm) in the LB band for 4G/5G wireless communications. For example, the gap b in the another axial direction from the one end and another end of the antenna assembly 1000 to the plurality of heat line patterns 360 may be set to 50 mm (b=50 mm).

Therefore, the heat line patterns 360 and the antenna elements need to be spaced apart from each other by at least a certain gap. In this regard, the heat line patterns 360 need to be spaced apart by at least 100 mm (a=100 mm) from the top of the antenna assembly 1000 and by at least 50 mm (b=50 mm) from the one end and another end of the antenna assembly 1000. Compared to a structure without heat line patterns, a structure in which the heat line patterns 360 are arranged at a=100 mm may exhibit higher antenna efficiency characteristics in the LB band.

Accordingly, the radiation pattern for low elevation may be improved without changing the antenna efficiency. In this regard, the conductor structure formed by the heat line patterns 360 may reflect beams formed by the antenna elements, thereby improving the radiation pattern component in a desired section, for example, a low-elevation section. Accordingly, the radiation pattern component in an upper direction of the vehicle may be formed in a lower direction, thereby increasing the low-elevation gain of the antenna module.

Figure 13A:
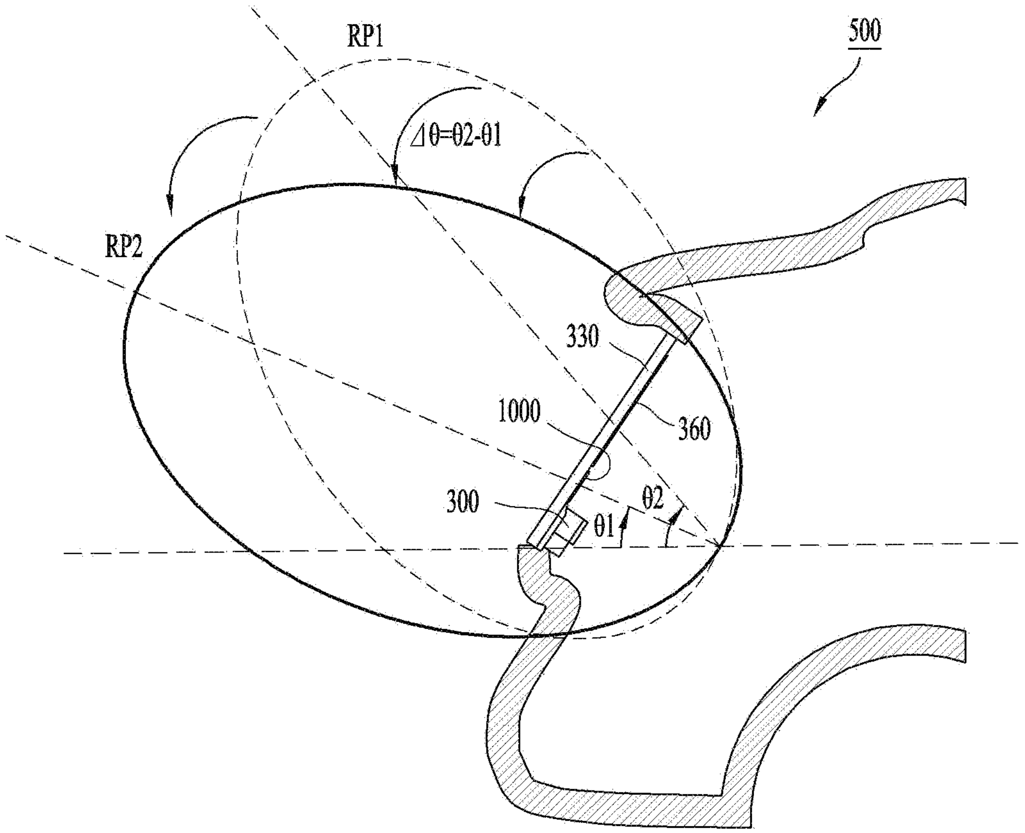
FIG. 13A is a view of comparing radiation patterns according to the presence or absence of the arrangement of the heat line patterns in a structure, in which the antenna assembly of FIG. 11 is arranged on the rear glass of the vehicle.
Figure 13B:
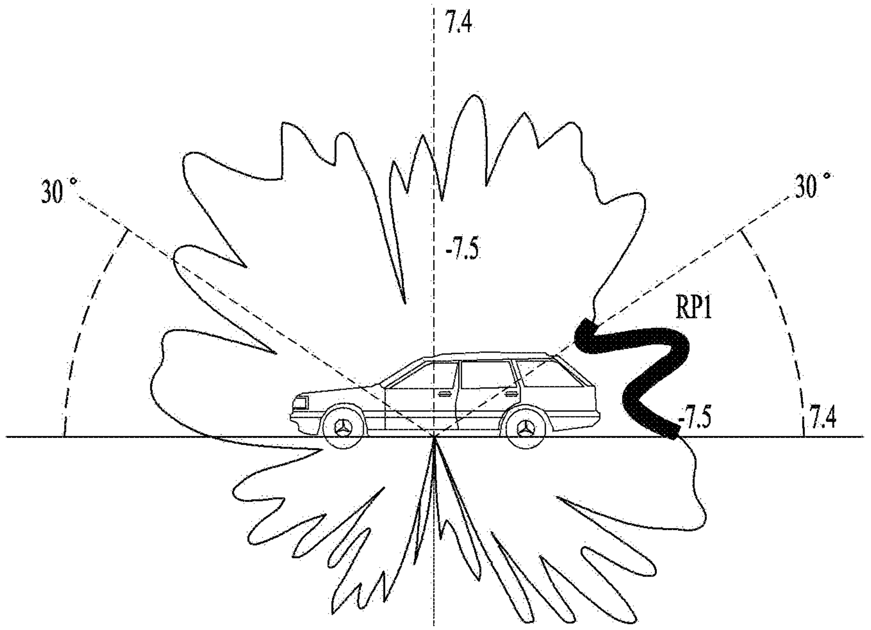
FIG. 13B is a view of comparing low-elevation radiation patterns when the heat line patterns are formed in the structure, in which the antenna assembly is arranged on the rear glass of the vehicle.
Figure 13B:
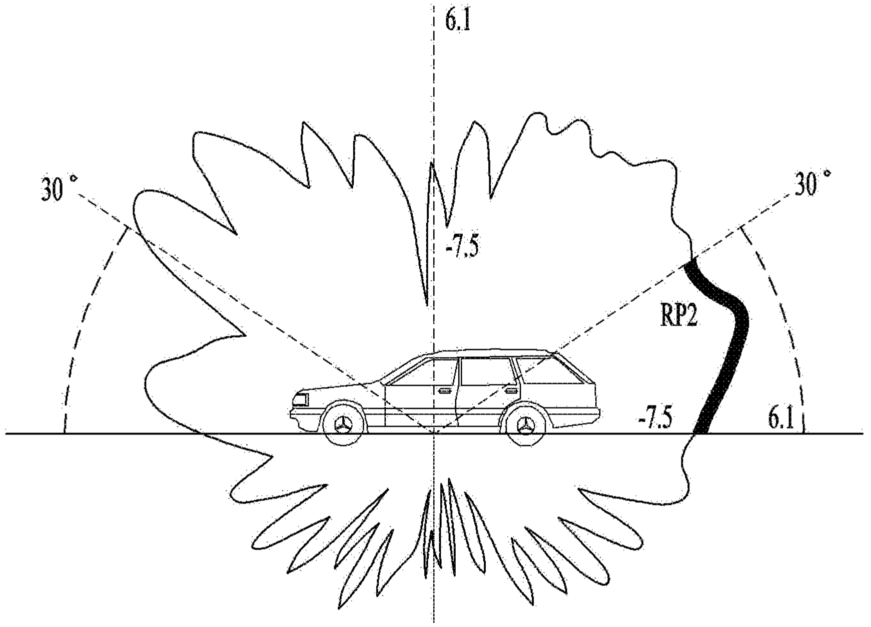

Meanwhile, when the antenna assembly according to the specification is arranged on vehicle glass, the shape of an antenna radiation pattern may change due to the heat line patterns. In this regard, FIG. 13A is a view of comparing radiation patterns according to the presence or absence of the arrangement of the heat line patterns in a structure, in which the antenna assembly of FIG. 11 is arranged on the rear glass of the vehicle. FIG. 13B is a view of comparing low-elevation radiation patterns when the heat line patterns are formed in the structure, in which the antenna assembly is arranged on the rear glass of the vehicle.

Referring to FIGS. 11, 12A, and 13A, the heat line patterns 360 may be formed in the upper region of the rear glass 330 of the vehicle 500. The antenna assembly 1000 having the transparent antenna structure may be formed in the lower region of the heat line patterns 360. A telematics control unit (TCU) 300 may be arranged below the antenna assembly 1000 of the transparent antenna structure. When no heat line pattern is arranged on the rear glass 330, a first radiation pattern RP1 may have a peak value at a first angle in an elevation angle direction. When the heat line patterns are arranged on the rear glass 330, a second radiation pattern RP2 may have a smaller peak value at a second angle $\theta 2$ than that at a first angle $\theta 1$ in the elevation angle direction. Accordingly, as the heat line patterns are arranged on the rear glass 330, the second radiation pattern RP2 may have a low elevation characteristic, by a difference $\Delta\theta$ in beam peak angle of $\theta 1$-$\theta 2$, compared to the first radiation pattern RP1.

Referring to FIG. 13B, the low elevation characteristics in a certain angle range toward in a rearward direction of the vehicle are compared according to the presence or absence of the heat line patterns. In this regard, to ensure stable wireless communication via the vehicle, the radiation pattern should be above a certain level within a range of about 30 degrees in the forward and rearward directions of the vehicle. For this purpose, the heat line patterns 360 need to be arranged in the upper region of the antenna assembly 1000, as illustrated in FIGS. 11, 12A, and 13A. Accordingly, the low elevation beam characteristics may be realized in a certain angle range in the rearward direction of the vehicle, as in FIG. 11C.

(a) of FIG. 13B illustrates the first radiation pattern RP1 when the antenna assembly is formed on rear glass on which no heat line pattern is arranged. The first radiation pattern RP1 may have a value below a reference value in a certain angle range based on a horizontal plane. The first radiation pattern RP1 may have a value below-7.5 dBi in a range of 30 degrees with respect to the horizontal plane. (b) of FIG. 13B illustrates the second radiation pattern RP2 when the antenna assembly is formed on rear glass on which heat line patterns are arranged. The second radiation pattern RP2 may have a value of at least a reference value in a certain angle range based on a horizontal plane. The second radiation pattern RP2 may have a value of at least −7.5 dBi in a range of 30 degrees with respect to the horizontal plane.

Figure 14A:
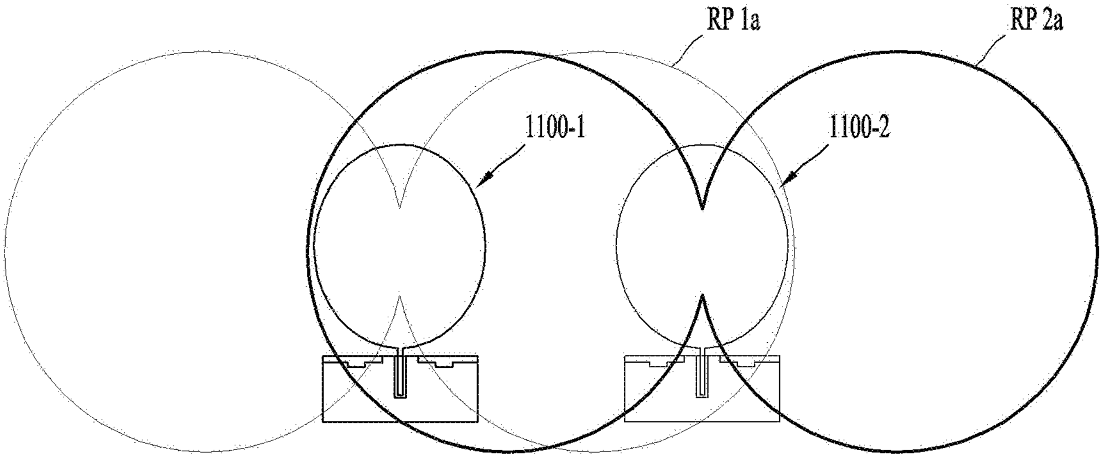
FIG. 14A is a view of comparing the radiation pattern of a monopole antenna operating in a single band with the radiation pattern of the antenna assembly according to the disclosure.
Figure 14A:
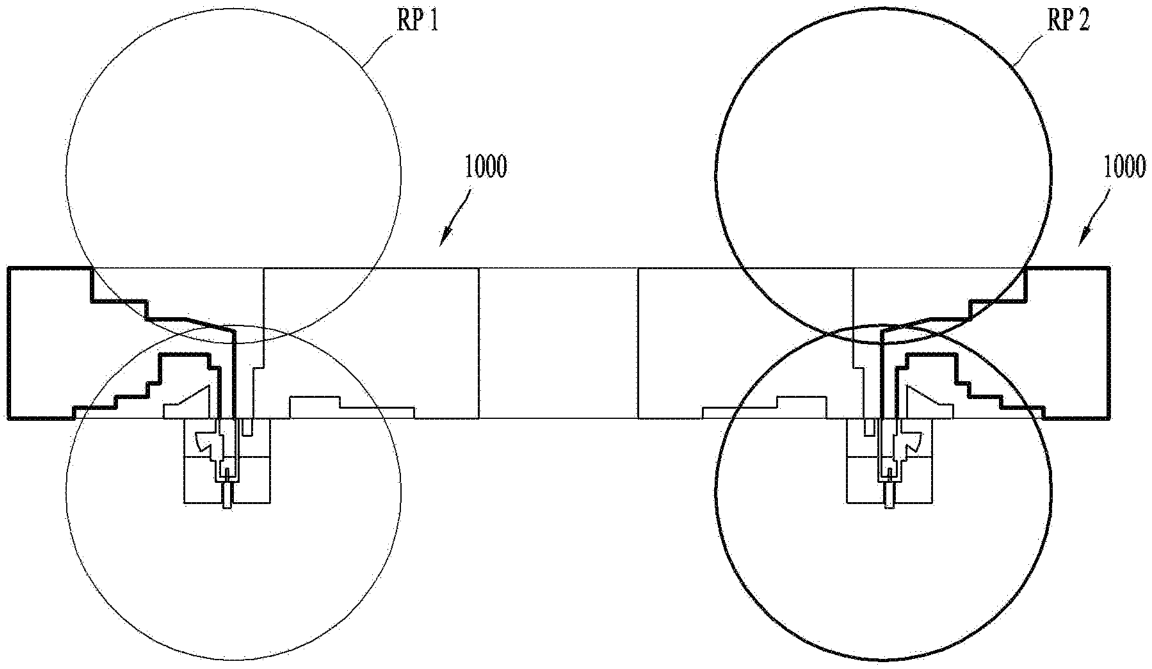
Figure 14B:
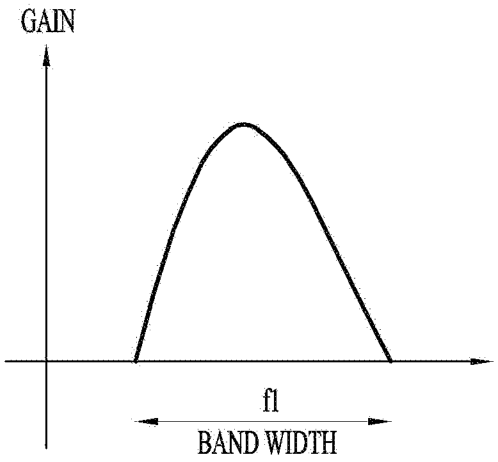
FIG. 14B is a view of comparing the gain characteristic of the monopole antenna of FIG. 14A with the gain characteristic of the antenna assembly according to the disclosure.
Figure 14B:
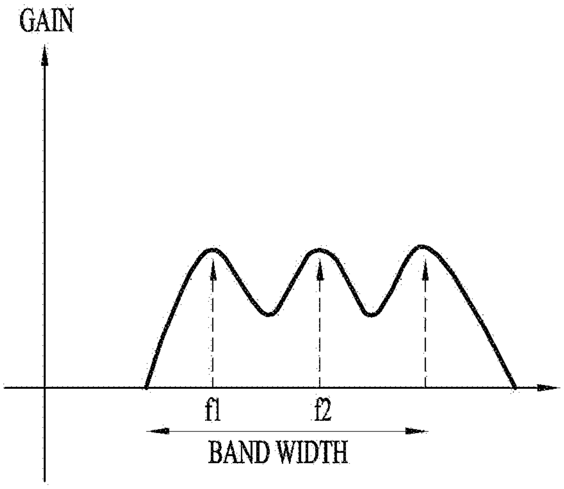

The antenna assembly according to the disclosure may operate as a broadband antenna to perform 4G wireless communication and 5G wireless communication. The antenna assembly according to the disclosure may operate in a dipole antenna mode to reduce interference between antenna elements during a multi-input and multi-output (MIMO) operation. In this regard, FIG. 14A is a view of comparing the radiation pattern of a monopole antenna operating in a single band with the radiation pattern of the antenna assembly according to the disclosure. FIG. 14B is a view of comparing the gain characteristic of the monopole antenna of FIG. 14A with the gain characteristic of the antenna assembly according to the disclosure.

Referring to (a) of FIG. 14A, radiation patterns RP1*a* and RP2*a* of monopole antennas 1100-1 and 1100-2 may be formed in a direction parallel to the antenna elements. For example, the radiation patterns may be formed in one side direction and another side direction of the antenna elements. Therefore, when monopole antennas 1100*a* are arranged spaced apart from each other for performing a MIMO operation, interference between antenna elements may occur.

In some examples, referring to (b) of FIG. 14A, the radiation patterns RP1 and RP2 of the antenna assembly 1000 may be formed in a direction perpendicular to an antenna array. For example, the radiation patterns may be formed in upper and lower directions of the antenna elements. Therefore, even when the antenna assemblies 1100 are arranged spaced apart for performing the MIMO operation, interference between the antenna elements may be minimized to a certain level or less.

Referring to (a) of FIG. 14A and (a) of FIG. 14B, the monopole antennas 1100-1 and 1100-2 may operate to resonate in a single frequency band. The monopole antennas 1100-1 and 1100-2 may operate as radiators only within a certain frequency band based on a central frequency f1. Therefore, it may be impossible to cover the full frequency band for 4G/5G wireless communications.

In some examples, referring to (b) of FIG. 14A and (b) of FIG. 14B, the antenna assembly 1000 may operate to resonate in a plurality of frequency bands. The antenna assembly 1000 may operate as a radiator in first to third frequency bands based on a plurality of resonant frequencies, for example, f1, f2, and f3. The antenna assembly 1000 may operate in first, second, and third modes in the first, second, and third frequency bands, respectively. Accordingly, the antenna assembly 1000 may operate as a radiator in all of a low band (LB), mid band (MB), and high band (HB) for 4G/5G wireless communications and 5G Sub6 band.

Figure 15A:
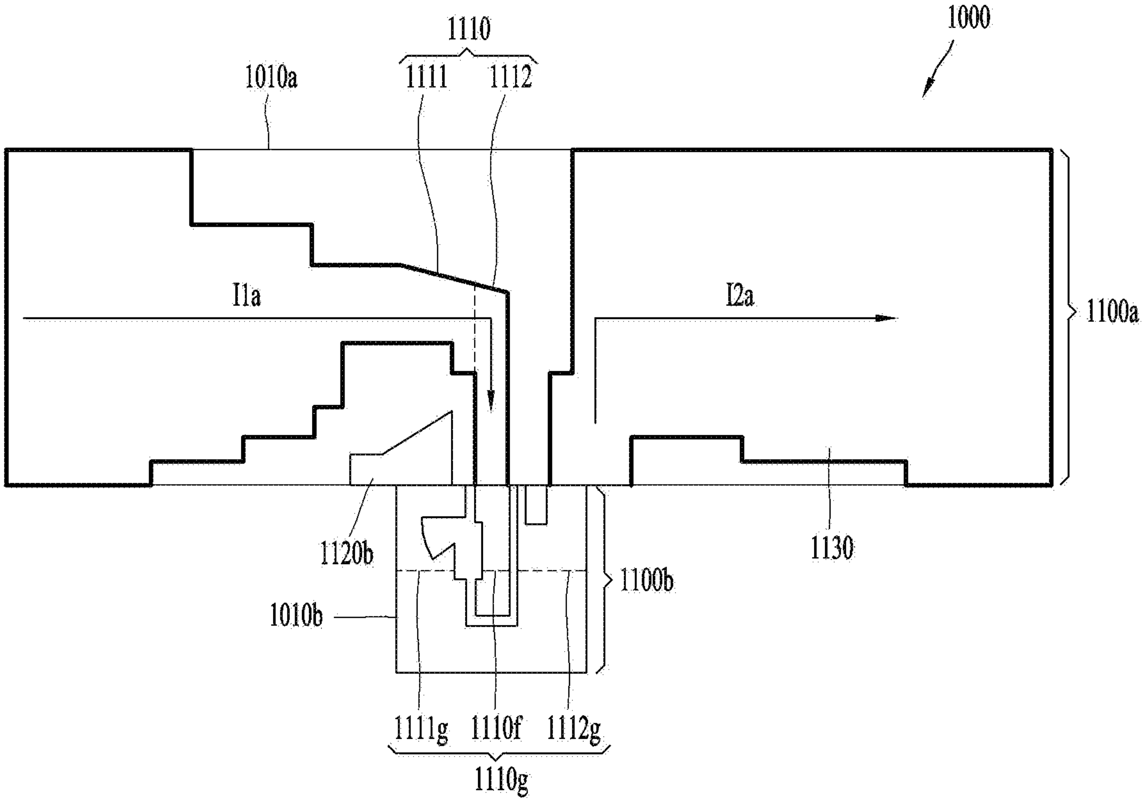
FIGS. 15A to 15C are conceptual views of an operating principle of the antenna assembly of FIG. 11 in each frequency band.
Figure 15B:
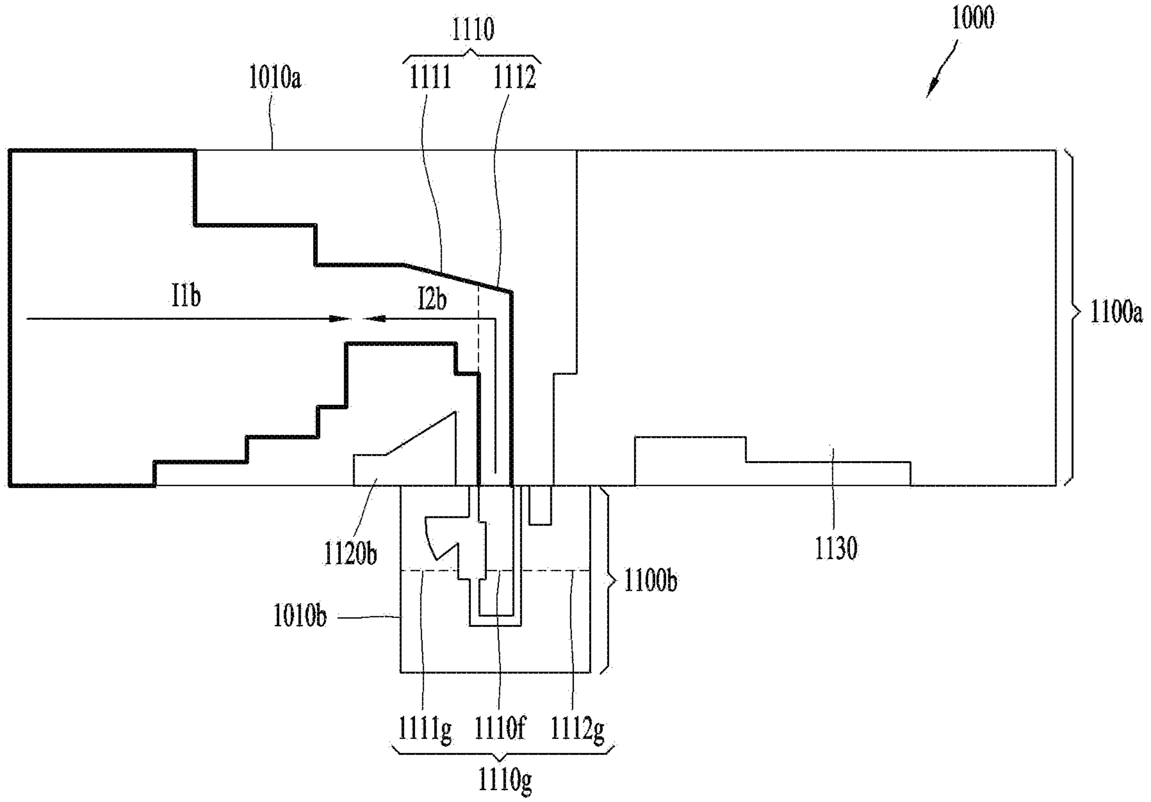
Figure 15C:
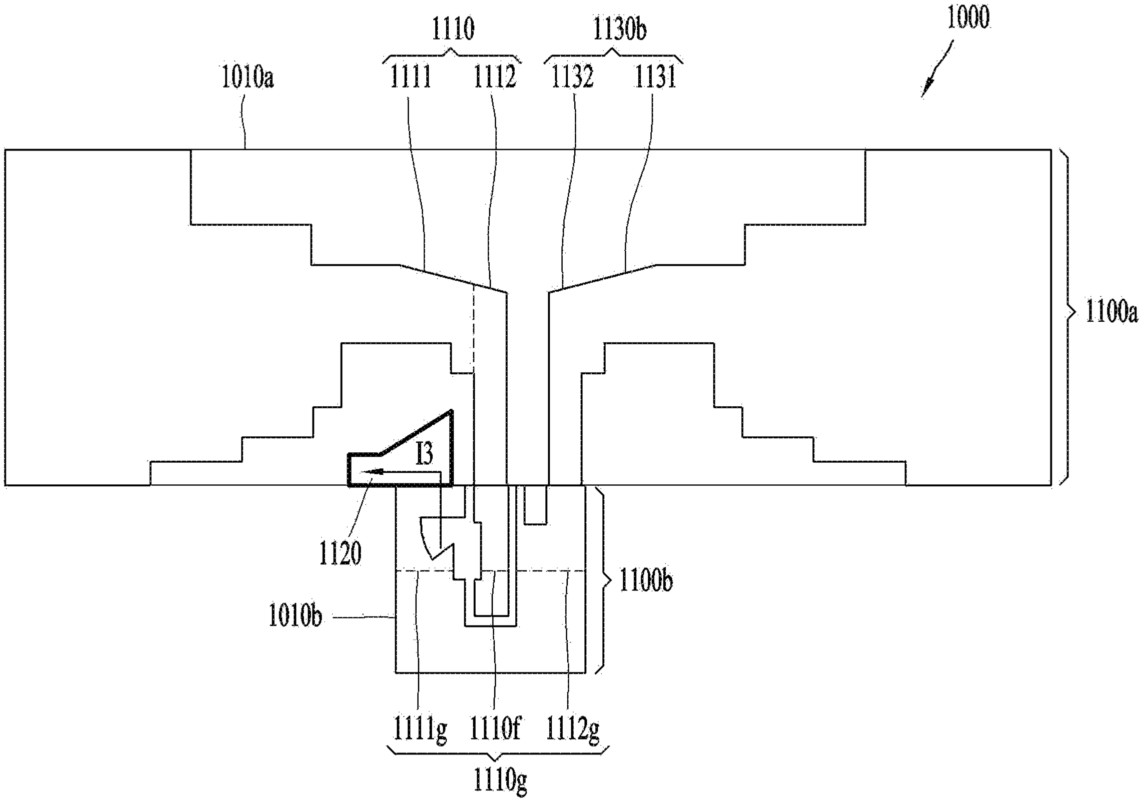

To this end, the antenna assembly 1000 may operate as a radiator in each frequency band through each of a plurality of conductive patterns of the antenna assembly 1000 and combinations thereof. FIGS. 15A to 15C are conceptual views of an operating principle of the antenna assembly 1000 of FIG. 11 in each frequency band.

Referring to FIGS. 11, 14B, and 15A, the antenna assembly 1000 may operate in a dipole antenna mode in a first frequency band of 617 to 960 MHz. The first frequency band is not limited to this and may change depending on the application for 4G/5G LB communications. The first conductive pattern 1110 and the third conductive pattern 1130 of the first radiation structure 1100-1 may operate in a first dipole antenna mode in the first frequency band. The first conductive pattern 1110 and the third conductive pattern 1130 may configure an asymmetrical structure. The fourth conductive pattern 1140 and the sixth conductive pattern 1160 of the second radiation structure 1100-2 may operate in a second dipole antenna mode in the first frequency band. The fourth conductive pattern 1140 and the sixth conductive pattern 1160 may configure an asymmetrical structure.

In the first radiation structure 1100-1, the first conductive pattern 1110 may have a step structure in which a plurality of conductive parts have different heights. The third conductive pattern 1130 may have a linear structure in which a plurality of conductive parts are linear in an upper region. A lower region of the third conductive pattern 1130 may have end portions formed at different points for impedance matching. In the second radiation structure 1100-2, the fourth conductive pattern 1140 may have a step structure in which a plurality of conductive parts have different heights. The sixth conductive pattern 1160 may have a linear structure in which a plurality of conductive parts are linear in an upper region. A lower region of the sixth conductive pattern 1160 may have end portions formed at different points for impedance matching.

Referring to FIGS. 11, 14B, and 15B, the antenna assembly 1000 may operate in a monopole antenna mode in a second frequency band of 1520 to 4500 MHz. In this regard, the second frequency band which is a frequency band higher than the first frequency band may change depending on the application for 4G/5G MB/HB communications. The first conductive pattern 1110 of the first radiation structure 1100-1 may operate in a first monopole antenna mode in the second frequency band. The fourth conductive pattern 1140 of the second radiation structure 1100-2 may operate in a second monopole antenna mode in the second frequency band. With regard to this, a first current I1*b* may be formed from the first part 1111 to the second part 1112 of the first conductive pattern 1110 in the second frequency band. Also, a second current I2*b* may be formed from the second part 1112 to the first part 1111 of the first conductive pattern 1110 in the second frequency band. Accordingly, the first conductive pattern 1110 may operate in the monopole antenna modes in the second frequency band.

Interference between the plurality of antenna elements in the second frequency band may be more reduced than that in the first frequency band even when the antenna assembly 1000 operates in the monopole antenna mode in the second frequency band because the second frequency band is set to be higher than the first frequency band. Therefore, the antenna assembly 1000 may operate in a dipole antenna mode to reduce interference between the antenna elements in the first frequency band. The antenna assembly 1000 may operate in the monopole antenna mode for broadband operation in the second frequency band.

Referring to FIGS. 11, 14B, and 15C, the antenna assembly 1000 may operate as a radiator through additional resonance in a third frequency band of 4500 to 6000 MHz. In this regard, a third current I3 may be formed in the second conductive pattern 1120 in the third frequency band. The third current I3 may be formed in the second conductive pattern 1120 in the third frequency band. Accordingly, the third conductive pattern 1130 may operate as a radiator in the third frequency band.

In this regard, the third frequency band which is a frequency band higher than the second frequency band may change depending on the application for 4G/5G UHB and 5G Sub6 communications. The second conductive pattern 1120 of the first radiation structure 1100-1 may operate as a first radiator in the third frequency band. The fifth conductive pattern 1150 of the second radiation structure 1100-1 may operate as a second radiator in the third frequency band. The third frequency band may be set to be higher than the second frequency band. Accordingly, the antenna assembly 1000 may operate as a radiator even in the third frequency band in addition to the first and second frequency bands, thereby covering the full frequency band for 4G/5G wireless communications.

The first conductive pattern 1110 of the first radiation structure 1100-1 may be coupled with the third conductive pattern 1130 to operate in the first monopole antenna mode in the first frequency band, and separately operate in the second dipole antenna mode in the second frequency band. To this end, the first conductive pattern 1110 may be formed in a step structure and thus optimized for broadband operation. In this regard, the first conductive pattern 1110 may be formed to have a plurality of boundary sides.

Likewise, the fourth conductive pattern 1140 of the second radiation structure 1100-2 may be coupled with the sixth conductive pattern 1160 to operate in the second monopole antenna mode in the first frequency band, and separately operate in the second dipole antenna mode in the second frequency band. To this end, the fourth conductive pattern 1140 may be formed in a step structure and thus optimized for broadband operation. In this regard, the fourth conductive pattern 1140 may be formed to have a plurality of boundary sides.

The first part 1111 of the first conductive pattern 1110 of the first radiation structure 1100-1 may have a plurality of boundary sides. The first part 1111 of the first conductive pattern 1110 may have a first boundary side BS1 to a fourth boundary side BS4.

The first boundary side BS1 of the first part 1111 of the first conductive pattern 1110 may have a first step structure. The second boundary side BS2 of the first part 1111 of the first conductive pattern 1110 may have a second step structure. The second step structure may have a different shape from the first step structure.

The third boundary side BS3 of the first part 1111 of the first conductive pattern 1110 may be arranged between a first end of the first boundary side BS1 of the first part 1111 of the first conductive pattern 1110 and a first end of the second boundary side BS2 of the first part 1111 of the first conductive pattern 1110. The fourth boundary side BS4 of the first part 1111 of the first conductive pattern 1110 may be arranged between a second end of the first boundary side BS1 of the first part 1111 of the first conductive pattern 1110 and a second end of the second boundary side BS2 of the first part 1111 of the first conductive pattern 1110. Accordingly, the shape of the first part 1111 of the first conductive pattern 1110 may be optimized for broadband operation in the first and second frequency bands.

The second conductive pattern 1120 may also be formed to have first and second boundary sides BS1 and BS2. A portion of the first boundary side BS1 of the first part 1111 of the first conductive pattern 1110 may be arranged to oppose the first boundary side BS1 of the second conductive pattern 1120. A portion of the first boundary side BS1 of the first part 1111 of the first conductive pattern 1110 may be arranged to oppose the second boundary side BS2 of the second conductive pattern 1120.

The third conductive pattern 1130 may also be formed to have a plurality of boundary sides for a step structure. The third conductive pattern 1130 may have a first boundary side BS1 to a fourth boundary side BS4. The first boundary side BS1 of the third conductive pattern 1130 may have a third step structure. A first end of the first boundary side BS1 of the third conductive pattern 1130 may be connected to the second part 1112*g* of the ground conductive pattern 1110*g*. The second boundary side BS2 of the third conductive pattern 1130 may be arranged on the opposite side of the first boundary side BS1 of the third conductive pattern 1130.

The third boundary side BS3 of the third conductive pattern 1130 may be arranged between a first end of the first boundary side BS1 of the third conductive pattern 1130 and a first end of the second boundary side BS2 of the third conductive pattern 1130. The fourth boundary side BS4 of the third conductive pattern 1130 may be arranged between a second end of the first boundary side BS1 of the third conductive pattern 1130 and a second end of the second boundary side BS2 of the third conductive pattern 1130. The third boundary side BS3 of the third conductive pattern 1130 may be arranged on the opposite side of the fourth boundary side BS4 of the third conductive pattern 1130. A portion of the second part 1112 of the first conductive pattern 1110 may be arranged to oppose the fourth boundary side BS4 of the third conductive pattern 1130.

The third boundary side BS3 of the third conductive pattern 1130 and the third boundary side BS3 of the first conductive pattern 1110 may have the same length. Accordingly, the antenna assembly 1000 may be implemented by the lengths of the third boundary sides BS3 of the first and third conductive patterns 1110 and 1130, and an overall antenna size may be minimized.

Similar to the first radiation structure 1100-1, the second radiation structure 1100-1 may have a plurality of boundary sides. The fourth conductive pattern 1140 to sixth conductive pattern 1160 of the second radiation structure 1100-1 may each have a plurality of boundary sides. The third part 1141 of the fourth conductive pattern 1140 may have a plurality of boundary sides. The third part 1141 of the fourth conductive pattern 1140 may have a first boundary side BS1 to a fourth boundary side BS4.

The first boundary side BS1 of the third part 1141 of the fourth conductive pattern 1140 may have a first step structure. The second boundary side BS2 of the third part 1141 of the fourth conductive pattern 1140 may have a second step structure. The second step structure may have a different shape from the first step structure.

The third boundary side BS3 of the third part 1141 of the fourth conductive pattern 1140 may be arranged between a first end of the first boundary side BS1 of the third part 1141 of the fourth conductive pattern 1140 and a first end of the second boundary side BS2 of the third part 1141 of the fourth conductive pattern 1140. The fourth boundary side BS4 of the third part 1141 of the fourth conductive pattern 1140 may be arranged between a second end of the first boundary side BS1 of the third part 1141 of the fourth conductive pattern 1140 and a second end of the second boundary side BS2 of the third part 1141 of the fourth conductive pattern 1140. Accordingly, the shape of the third part 1141 of the fourth conductive pattern 1140 may be optimized for broadband operation in the first and second frequency bands.

The sixth conductive pattern 1160 may also be formed to have first and second boundary sides BS1 and BS2. A portion of the first boundary side BS1 of the third part 1141 of the fourth conductive pattern 1140 may be arranged to oppose the first boundary side BS1 of the fifth conductive pattern 1150. A portion of the first boundary side BS1 of the third part 1141 of the fourth conductive pattern 1140 may be arranged to oppose the second boundary side BS2 of the fifth conductive pattern 1150.

The sixth conductive pattern 1160 may also be formed to have a plurality of boundary sides for a step structure. The sixth conductive pattern 1160 may have a first boundary side BS1 to a fourth boundary side BS4. The first boundary side BS1 of the sixth conductive pattern 1160 may have a third step structure. A first end of the first boundary side BS1 of the sixth conductive pattern 1160 may be connected to the second part 1112*g* of the second ground conductive pattern 1120*g*. The second boundary side BS2 of the sixth conductive pattern 1160 may be arranged on the opposite side of the first boundary side BS1 of the sixth conductive pattern 1160.

The third boundary side BS3 of the sixth conductive pattern 1160 may be arranged between a first end of the first boundary side BS1 of the third conductive pattern and a first end of the second boundary side BS2 of the sixth conductive pattern 1160. The fourth boundary side BS4 of the sixth conductive pattern 1160 may be arranged between a second end of the first boundary side BS1 of the sixth conductive pattern 1160 and a second end of the second boundary side BS2 of the third conductive pattern 1130. The third boundary side BS3 of the sixth conductive pattern 1160 may be arranged on the opposite side of the fourth boundary side BS4 of the sixth conductive pattern 1160. A portion of the fourth part 1142 of the fourth conductive pattern 1140 may be arranged to oppose the fourth boundary side BS4 of the sixth conductive pattern 1160.

The third boundary side BS3 of the sixth conductive pattern 1160 and the third boundary side BS3 of the fourth conductive pattern 1140 may have the same. Accordingly, the antenna assembly 1000 may be implemented by the lengths of the third boundary sides BS3 of the fourth and sixth conductive patterns 1140 and 1160, and an overall antenna size may be minimized.

Figure 16A:
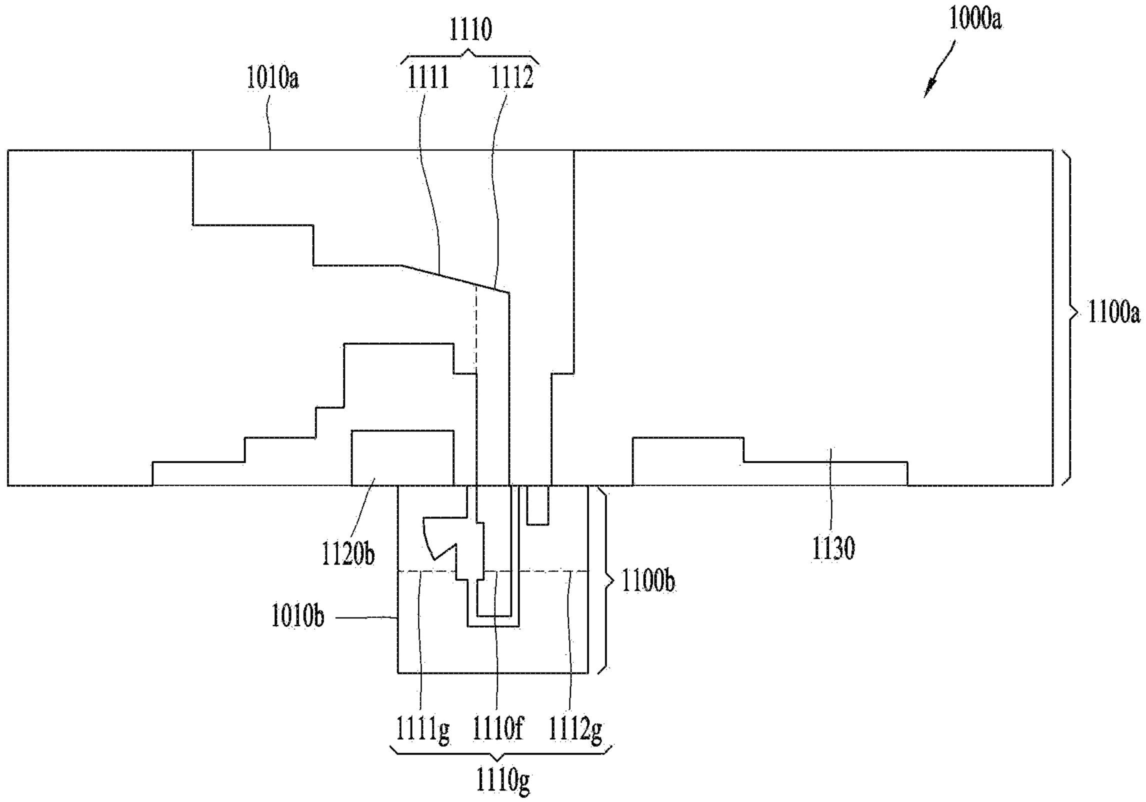
FIGS. 16A and 16B are respective views of a structure in which the shape of a second conductive pattern has changed, and a structure in which the shape of a third conductive pattern has changed.

The conductive patterns of the antenna assembly according to the specification may change to various shapes. In this regard, FIGS. 16A and 16B are views of a structure in which the shape of the second conductive pattern has changed, and a structure in which the shape of the third conductive pattern has changed, respectively.

Referring to FIG. 11, a portion of the top of the second conductive pattern 1120 of the antenna assembly 1000 may be formed in a triangular shape. Referring to FIG. 16A, a second conductive pattern 1120*b* of an antenna assembly 1000*a* may be formed in a rectangular shape. The second conductive pattern 1120*b* may be arranged in one side region or lower region of the first conductive pattern 1110. The second conductive pattern 1120*b* may be electrically connected to the first part 1111*g* of the ground conductive pattern 1110*g*. The antenna assembly 1000 may operate as a radiator in the third frequency band by the second conductive pattern 1120*b*. With regard to this, the antenna assembly 1000 may also operate as a radiator in the third frequency band by the second conductive pattern 1120. As the shape of the second conductive pattern 1120*b* changes, the impedance matching characteristic in the third frequency band may change to some extent.

The size of the second conductive pattern 1120*b* may be smaller than that of the third conductive pattern 1130. Accordingly, the antenna assembly 1000 may operate as a radiator in the third frequency band, which is a higher frequency band, by the second conductive pattern 1120*b*. The second conductive pattern 1120*b* may be arranged between the first part 1111 of the first conductive pattern 1110 and the second part 1112 of the first conductive pattern 1110. Accordingly, the second conductive pattern 1120*b* may be arranged in a lower region of the first conductive pattern 1110, and the size of the antenna assembly 1000 may be reduced compared to the case where the second conductive pattern 1120*b* is arranged in one side region of the first conductive pattern 1110.

Figure 16B:
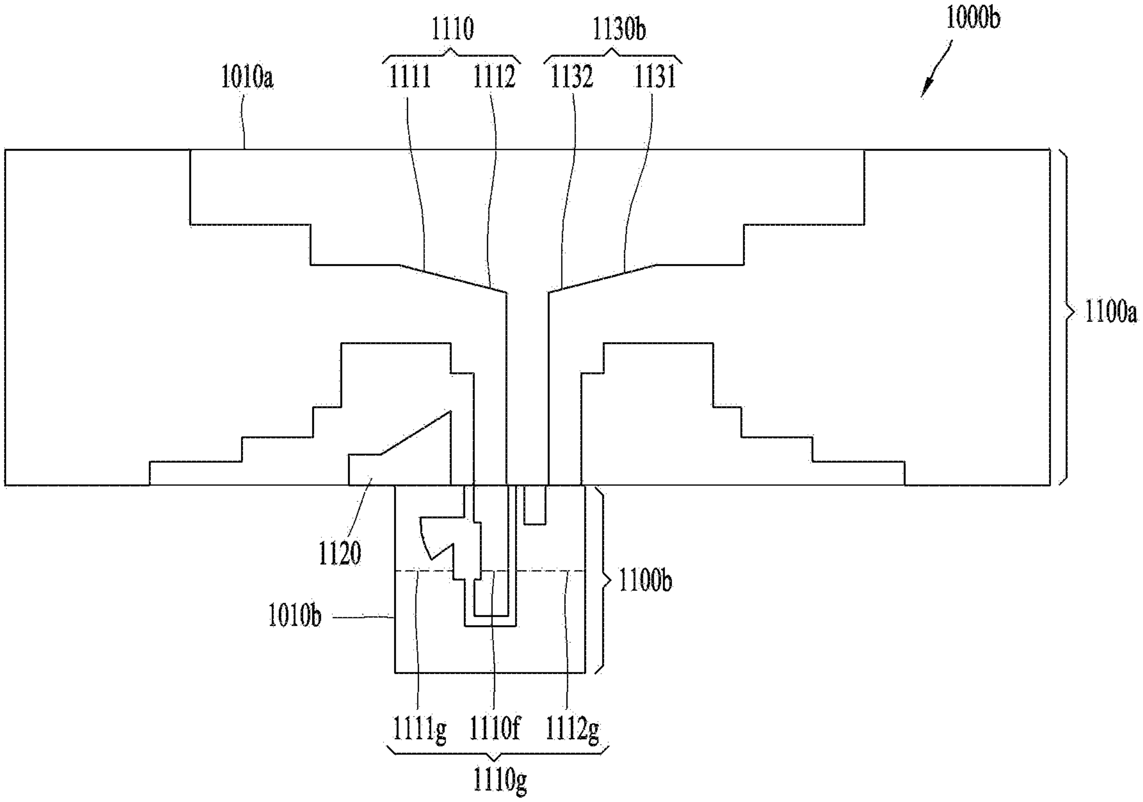

Referring to FIG. 16B, a third conductive pattern 1130*b* and a first conductive pattern 1110 of an antenna assembly 1000*b* may be formed in a symmetrical structure. Similar to the first conductive pattern 1110, the third conductive pattern 1130*b* may include a first part 1131 and a second part 1132. Similar to the first conductive pattern 1110, the third conductive pattern 1130*b* may also have upper and lower portions each formed in a step structure. The size of the third conductive pattern 1130 of FIG. 11B may be larger than the size of the third conductive pattern 1130*b* of FIG. 12B.

Figure 16C:
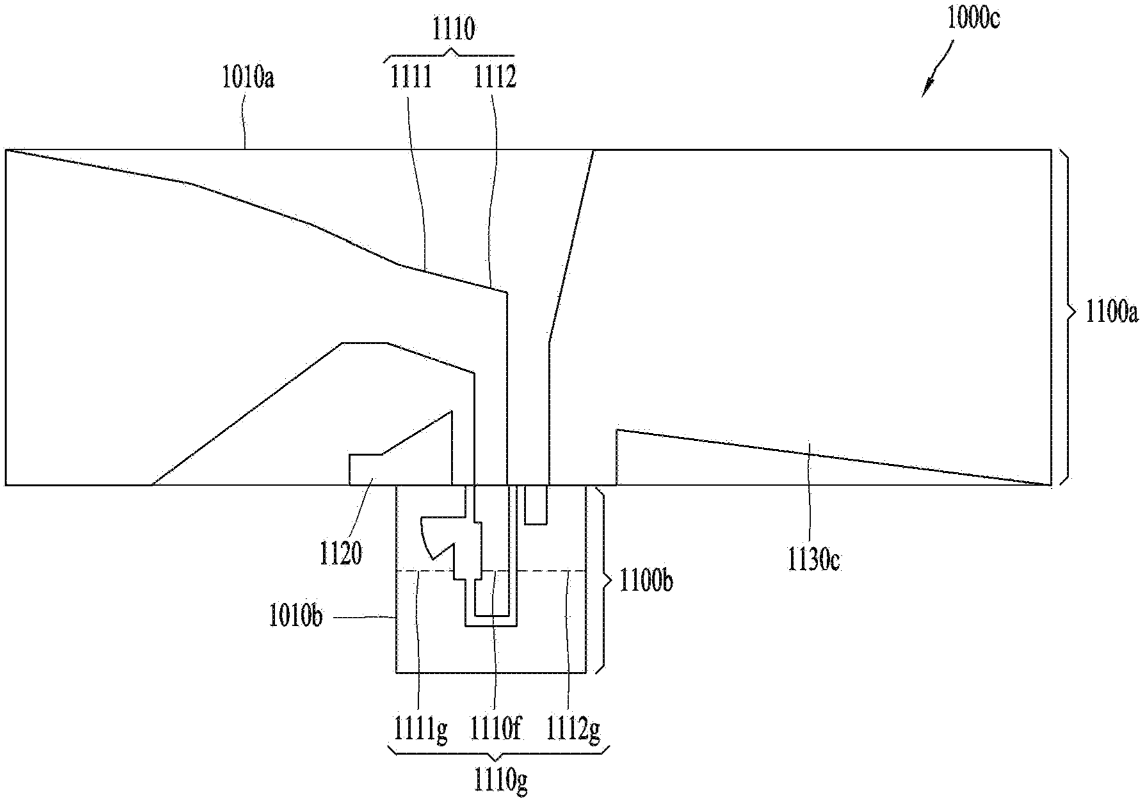
FIG. 16C is a view of a structure in which the shapes of first and third conductive patterns are formed in a continuous structure.

In some embodiments, the conductive patterns of the antenna assembly according to the disclosure may be implemented in a continuous structure other than a step structure. FIG. 16C is a view of a structure in which the shapes of first and third conductive patterns are formed in a continuous structure.

Referring to FIG. 16C, an antenna assembly 1000*c* may include a first conductive pattern 1110*c*, a second conductive pattern 1120, and a third conductive pattern 1130*c*. The first conductive pattern 1110*c* may be formed in a connection structure continuous at each connection point. The third conductive pattern 1130*c* may also be formed in a connection structure continuous at each connection point.

Referring to FIGS. 16A and 16B, the first conductive pattern 1110 may be formed in the step structure in the vertical direction at each connection point. Therefore, the first conductive pattern 1110 formed in the step structure may increase a vertical current component. The third conductive pattern 1130, 1130*b* may be formed in a step structure in the vertical direction at each connection point. Therefore, the third conductive pattern 1110 formed in the step structure may increase the vertical current component.

Figure 17A:
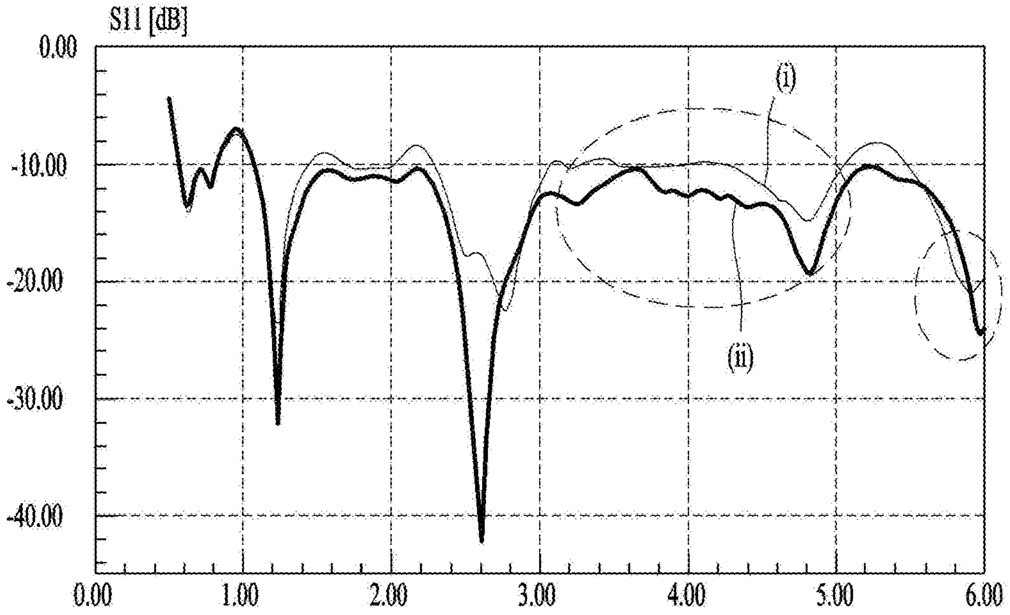
FIG. 17A is a view of comparing reflection coefficient characteristics of the antenna assemblies of FIGS. 11 and 16C.
Figure 17B:
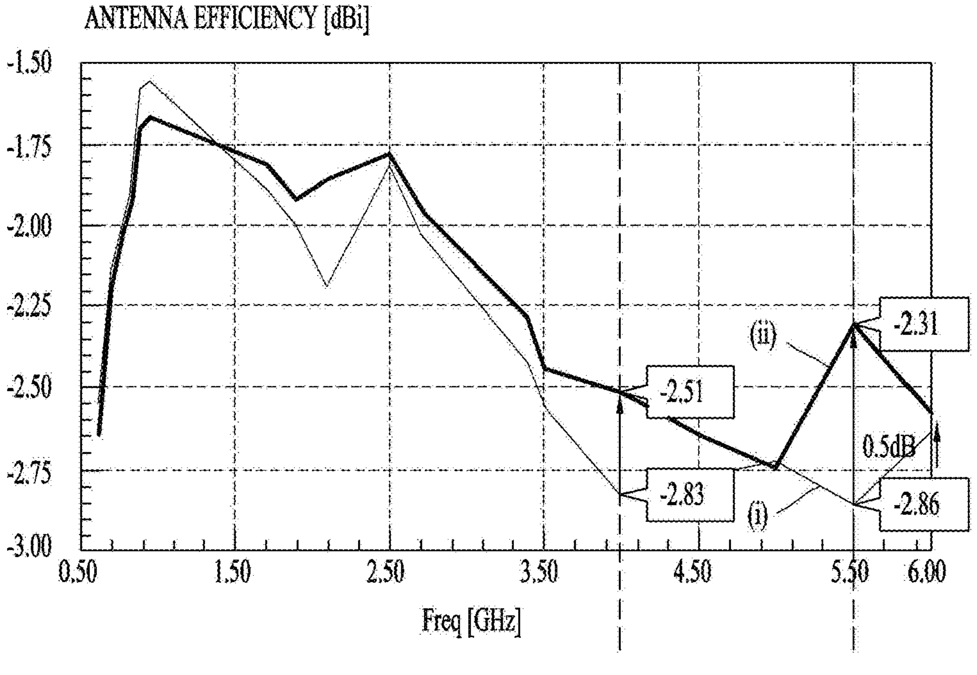
FIG. 17B is a view of comparing antenna efficiency characteristics of the antenna assemblies of FIGS. 11 and 16C.

In this regard, FIG. 17A is a view of comparing reflection coefficient characteristics of the antenna assemblies of FIGS. 11 and 16C. FIG. 17B is a view of comparing antenna efficiency characteristics of the antenna assemblies of FIGS. 11 and 16C.

Referring to FIG. 11, the first conductive pattern 1110 of the antenna assembly 1000 may be formed in the step structure in the vertical direction at each connection point, thereby increasing the vertical current component. In some examples, referring to FIG. 16C, the first conductive pattern 1110 of the antenna assembly 1000*c* may be formed in the connection structure continuous at each connection point, thereby decreasing the vertical current component. Referring to FIG. 17A, (i) the reflection coefficient of the antenna assembly 1000*c* formed in the continuous structure may deteriorate in a frequency band of at least about 3 GHZ, compared to (ii) the reflection coefficient of the antenna assembly 1000 formed in the step structure.

Referring to FIG. 11, the first conductive pattern 1110 of the antenna assembly 1000 may be formed in the step structure in the vertical direction at each connection point, thereby increasing the vertical current component. In some examples, referring to FIG. 16C, the first conductive pattern 1110 of the antenna assembly 1000*c* may be formed in the connection structure continuous at each connection point, thereby decreasing the vertical current component. Referring to FIG. 17B, (i) the antenna efficiency of the antenna assembly 1000*c* formed in the continuous structure may deteriorate in a frequency band of at least about 1.5 GHz, compared to (ii) the antenna efficiency of the antenna assembly 1000 formed in the step structure. In particular, (i) the antenna efficiency of the antenna assembly 1000*c* formed in the continuous structure may deteriorate in a frequency band of at least about 1.5 GHz, compared to (ii) the antenna efficiency of the antenna assembly 1000 formed in the step structure. (i) The antenna efficiency of the antenna assembly 1000*c* formed in the continuous structure may be degraded by 0.5 dB or more at about 5.5 GHZ, compared to the antenna efficiency of the antenna assembly 1000 formed in the step structure.

Figure 18A:
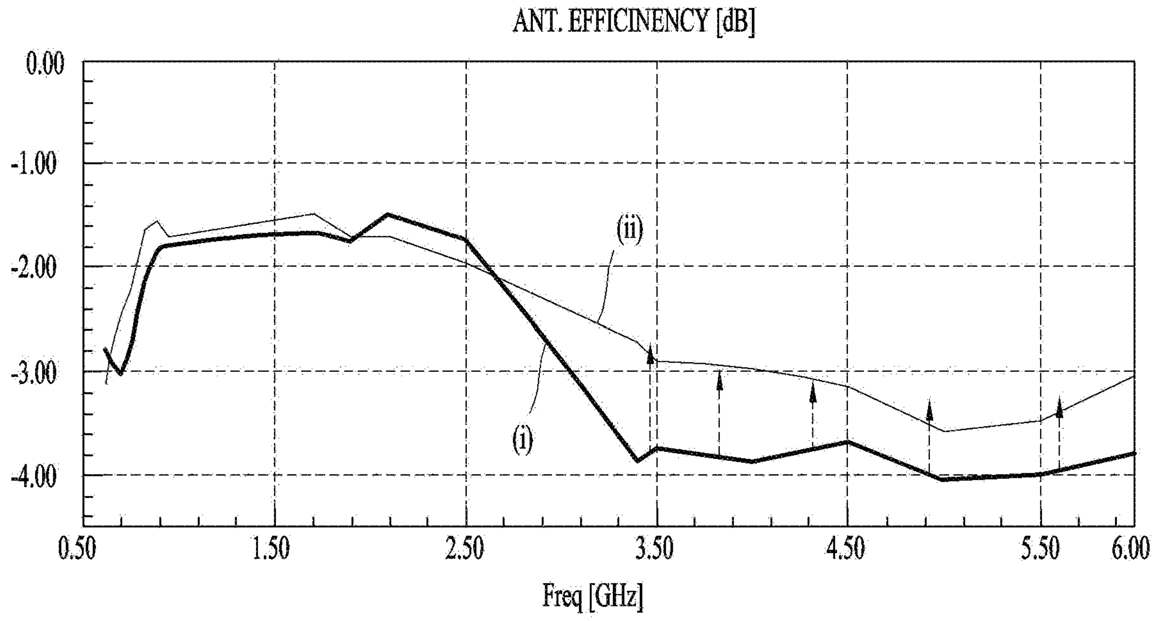
FIG. 18A is a view of antenna efficiencies of the antenna assemblies respectively having asymmetrical and symmetrical structures of FIGS. 11 and 16B.
Figure 18B:
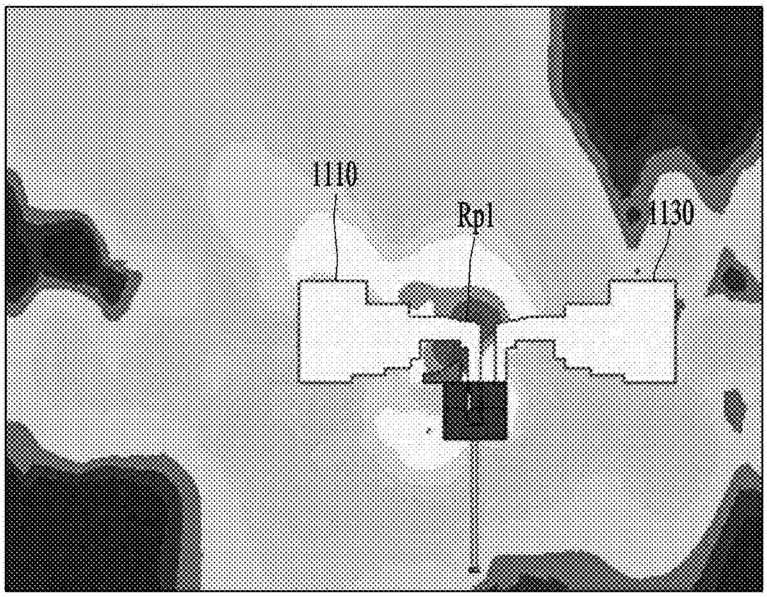
FIG. 18B is a view of electric field distributions of the antenna assemblies respectively having the asymmetrical and symmetrical structures of FIGS. 11 and 16B.
Figure 18B:
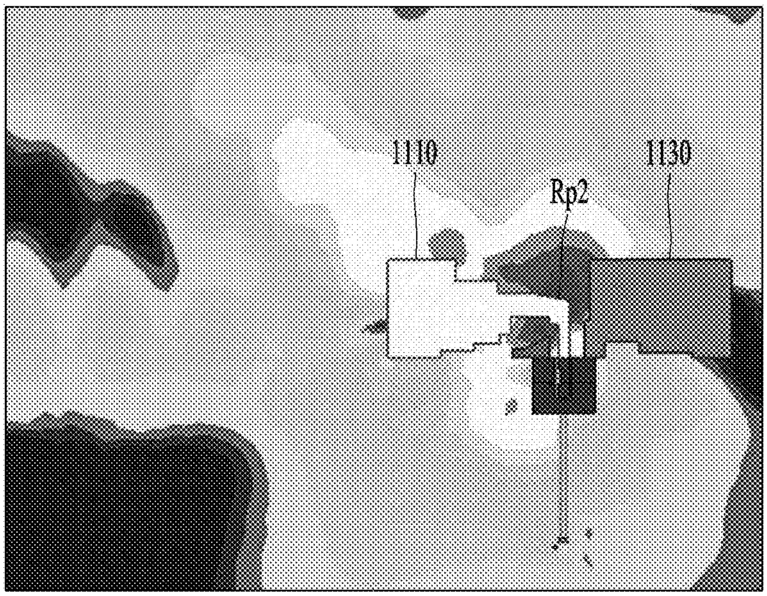

Hereinafter, the electrical characteristic of the antenna assembly 1000*b* of FIG. 16B having the symmetrical structure and the electrical characteristic of the antenna assembly 1000*b* of FIG. 11 having the asymmetrical structure will be compared and described. In this regard, FIG. 18A is a view of antenna efficiencies of the asymmetrical antenna assembly and the symmetrical antenna assembly illustrated in FIGS. 11 and 16B, respectively. FIG. 18B illustrates electric field distributions of the asymmetrical and symmetrical antenna assemblies of FIGS. 11 and 16B.

Referring to FIG. 16B and FIG. 18A, (i) the antenna efficiency of the antenna assembly 1000*b* having the symmetrical structure may have a value of about −4 dBi in a frequency band of at least 3.5 GHz. Referring to FIG. 11B and FIG. 15A, (ii) the antenna efficiency of the antenna assembly 1000 having the asymmetrical structure may have a value of about −3 dBi to −3.5 dBi in the frequency band of at least 3.5 GHz. Accordingly, the antenna efficiency of the antenna assembly 1000 of FIG. 11B having the asymmetrical structure may have a value that is about 0.5 to 1.0 dB higher than the antenna efficiency of the antenna assembly 1000*b* of FIG. 12B having the symmetrical structure.

The antenna assembly 1000 having the asymmetrical structure may have the antenna efficiency that is about 0.5 to 1.0 dB higher than that of the antenna assembly 1000*b* having the symmetrical structure, in a frequency band of at least about 3 GHZ. Accordingly, the antenna efficiency of the antenna assembly 1000 having the asymmetrical structure may be improved in the frequency band of at least about 3 GHz of the second frequency band and in the third frequency band.

(a) of FIG. 18B shows the electric field distribution of the antenna assembly 1000*b* having the symmetrical structure of FIG. 16B at 3.5 GHZ. And, (b) of FIG. 18B shows the electric field distribution of the antenna assembly 1000 having the asymmetrical structure of FIG. 11 at 3.5 GHz. The size of the third conductive pattern 1130 of the antenna assembly 1000 of FIG. 11 having the asymmetrical structure may be larger than the size of the third conductive pattern 1130*b* of FIG. 16B. This may correspond to an increase in ground size of a monopole antenna by the third conductive pattern 1130 of the antenna assembly 1000 having the asymmetrical structure, which is larger than the third conductive pattern 1130*b*. As the size of the third conductive pattern 1130 of the antenna assembly 1000 having the asymmetrical structure increases, an electric field radiation of a monopole antenna mode may increase in the second frequency band.

Referring to FIG. 16B and (a) of FIG. 18B, the peak region of the electric field distribution may appear in a first region R1*p* between the first conductive pattern 1100 and the third conductive pattern 1130, by the third conductive pattern 1130 which is symmetrical with the first conductive pattern 1100. Referring to FIG. 11 and (b) of FIG. 18B, the peak region of the electric field distribution may appear in a second region R2*p*, which is adjacent to the third conductive pattern 1130, rather than the first region R1*p*, due to the third conductive pattern 1130 larger than the first conductive pattern 1100. In some examples, as the size of the third conductive pattern 1130 of the antenna assembly 1000 having the asymmetrical structure increases, an area of the second region R2*p*, which is the peak region of the electric field distribution, may also increase compared to an area of the first region RP1. Accordingly, the antenna assembly 1000 with the asymmetrical structure may obtain improved antenna efficiency in a frequency band of at least about 3 GHz or higher and in the third frequency band.

Figure 19A:
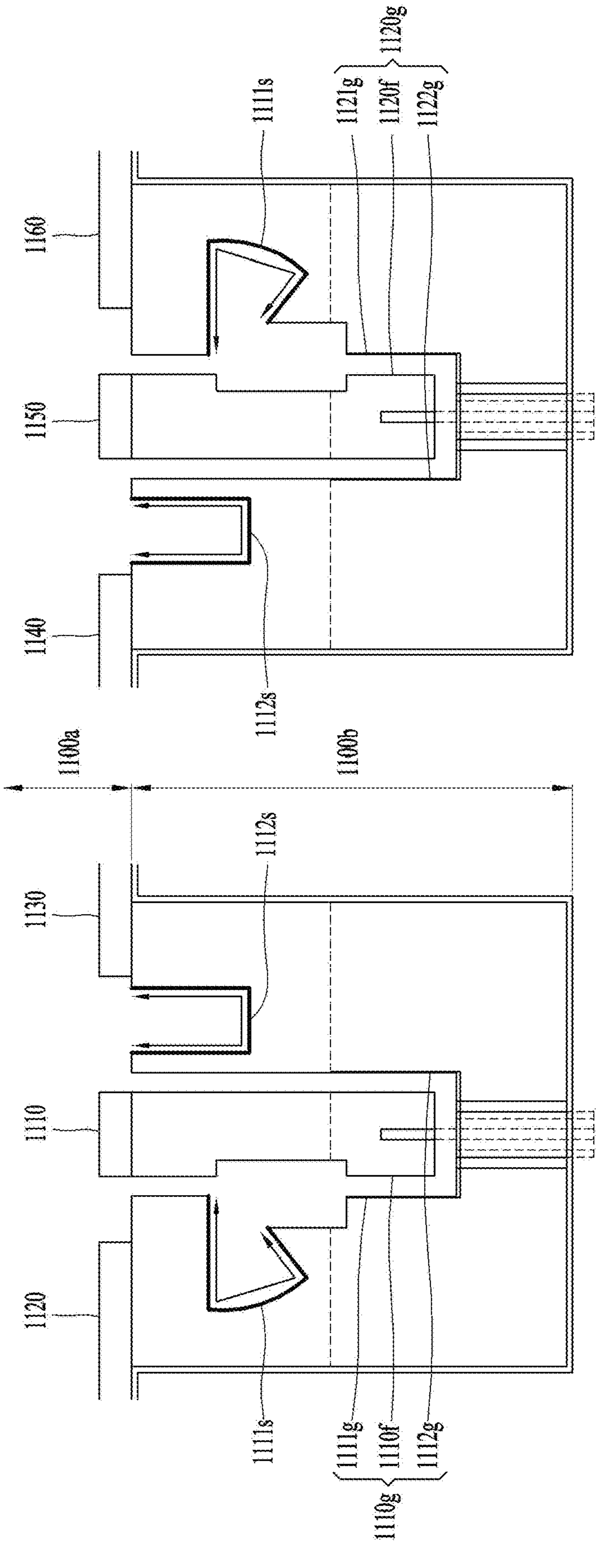
FIG. 19A is a view of first and second slot structures formed in a ground conductive pattern of an antenna assembly according to the disclosure.
Figure 19B:
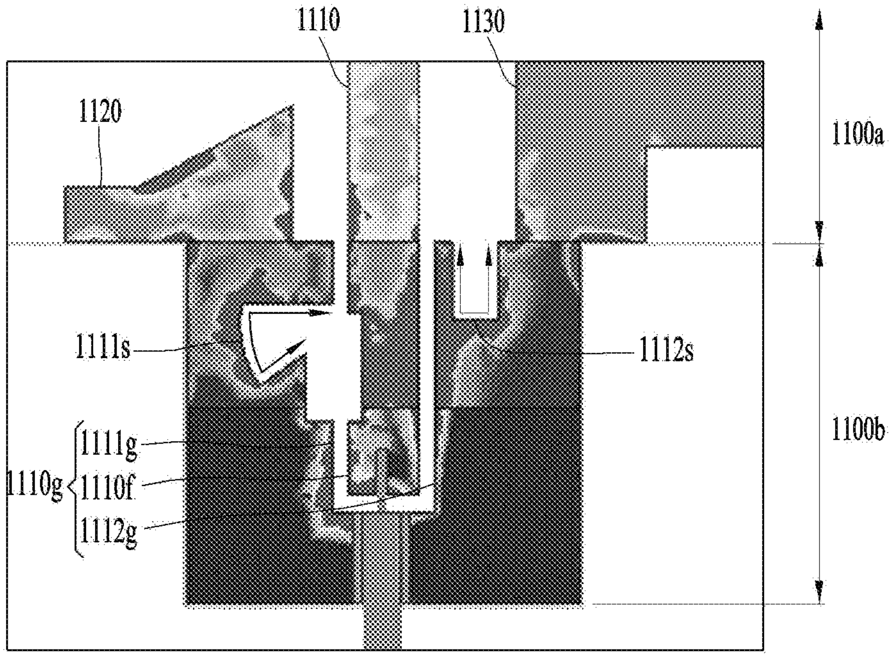
FIG. 19B is a view of current distribution around the first and second slot structures, which are formed in the ground conductive pattern of the antenna assembly of FIG. 19A, and the ground conductive pattern.

In some embodiments, the ground conductive pattern 1110*g* of the second region 1100*b* of the antenna assembly 1000 according to the specification may have one or more slots for broadband impedance matching. In this regard, FIG. 19A is a view of first and second slot structures formed in a ground conductive pattern of an antenna assembly according to the disclosure. And, FIG. 19B is a view of current distribution around the first and second slot structures formed in the ground conductive pattern of the antenna assembly of FIG. 19A and the ground conductive pattern.

Referring to FIG. 19A, a first part 1111*g*, 1121*g* of a second region 1100*b* corresponding to a ground region may include a first slot 1111*s*. A second part 1112*g*, 1122*g* of the second region 1100*b* corresponding to the ground region may include a second slot 1112*s*.

The first ground conductive pattern 1110*g* may include the first slot 1111*s* and the second slot 1112*s*. The second ground conductive pattern 1120*g* may include the first slot 1111*s* and the second slot 1112*s*.

The first part 1111*g* of the first ground conductive pattern 1110*g* may include the first slot 1111*s*. The first part 1121*g* of the second ground conductive pattern 1120*g* may include the first slot 1111*s*. The first slot 1111*s* may have a length in the range of λ/2 to λ based on about 5 GHz. An open region of the first slot 1111*s* may be formed to oppose the feeding pattern 1110*f*. The second part 1112*g* of the first ground conductive pattern 1110*g* may include the second slot 1112*s*. The second part 1122*g* of the second ground conductive pattern 1120*g* may include the second slot 1112*s*. The second slot 1112*s* may have a length in the range of λ/2 to λ based on about 5 GHz. An open region of the second slot 1112*s* may be formed to oppose the first region 1110*a*, which is a radiator region.

Referring to FIG. 19B, it may be seen that current distribution is concentrated around the feeding pattern 1110*f* and the first and second slots 1111_s_ and 1112_s_ formed on opposite sides of the feeding pattern 1110_f_. Accordingly, the impedance matching characteristic may be improved in the HB band and UHB band, i.e., in the band of 3.5 to 6 GHZ, so that the antenna assembly may operate as a broadband antenna.

Figure 19C:
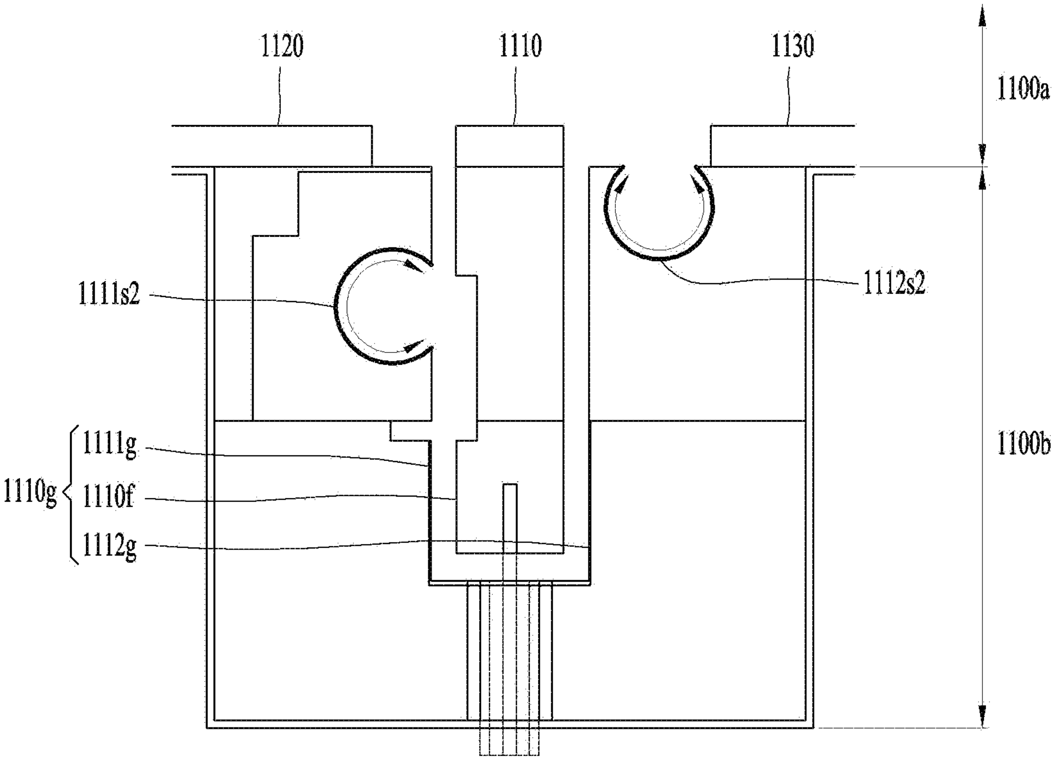
FIG. 19C is a view of a circular slot structure of an antenna assembly according to an embodiment.

In some embodiments, the slot structure of the antenna assembly according to the specification is not limited to a rectangular slot. In this regard, FIG. 19C is a view of a circular slot structure of an antenna assembly according to an embodiment. Referring to FIG. 19C, a first slot 1111_s_2 and a second slot 1112_s_2 each having a circular shape may be formed in the first part 1111_g_ and the second part 1112_g_ of the ground conductive pattern 1110_g_, respectively. In this regard, the shape of the first and second slots 1111_s_1 and 1112_s_2 is not limited to the circular shape, and may be implemented in an elliptical shape or any polygonal shape. Referring to FIGS. 19A and 19C, one of the first slots 1111_s_ and 1111_s_2 may be formed in the first part 1111_g_ of the ground conductive pattern 1110_g_. And, one of the second slots 1112_s_ and 1112_s_ may be formed in the second part 1111_g_ of the ground conductive pattern 1110_g_.

Figure 20A:
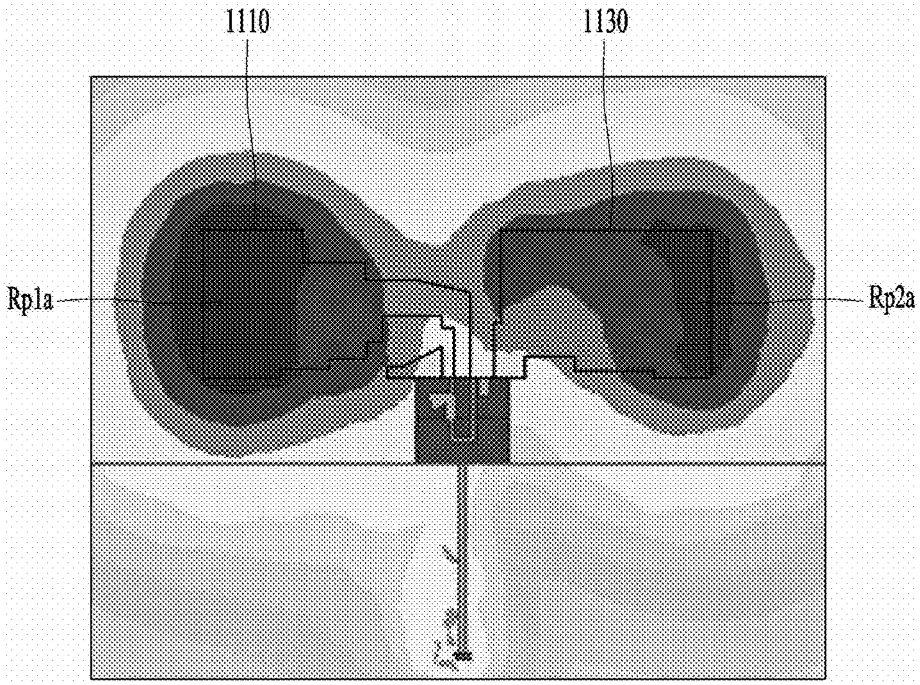
FIGS. 20A to 20C are views of electric field distributions formed on conductive patterns of the antenna assembly in first to third frequency bands.
Figure 20B:
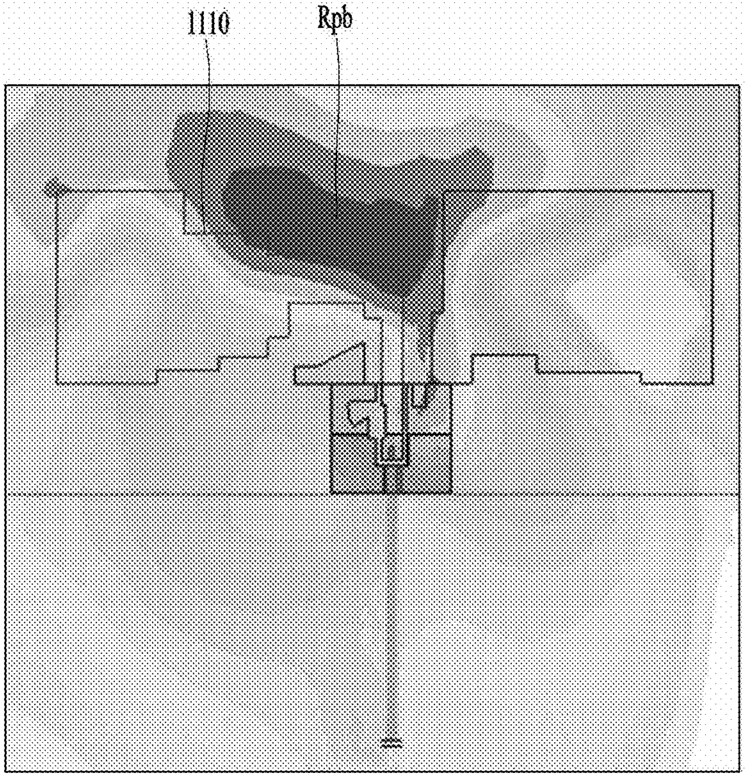
Figure 20C:
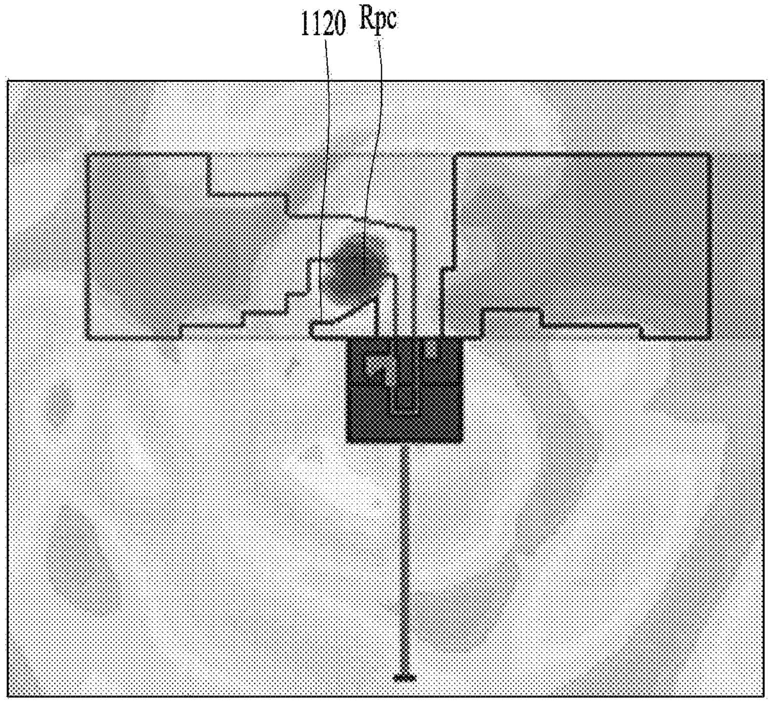

The antenna assembly according to the disclosure may operate as a broadband antenna by differently configuring conductive patterns operating as a radiator, according to a plurality of antenna operating modes. In this regard, FIGS. 20A to 20C are views of electric field distributions formed on the conductive patterns of the antenna assembly in the first to third frequency bands. FIGS. 20A to 20C illustrate the electric field distribution formed in the first radiation structure 1000-1 of FIG. 11, but may also be equally applied to the second radiation structure 1000-2.

Referring to FIGS. 11A, 15A, and 20A, current distribution on the first and third conductive patterns 1110 and 1130 of the antenna assembly 1000 in the first frequency band may be shown to be higher than current distribution in other regions. A first region Rp1_a_ that is a peak region of the current distribution may be formed in one region of the first conductive pattern 1110. A second region Rp2_a_ that is a peak region of the current distribution may be formed in one region of the third conductive pattern 1130. Accordingly, the first conductive pattern 1110 and the third conductive pattern 1130 may operate as a radiator in the first frequency band.

The first frequency band may be set to 617 to 960 MHz, but is not limited thereto. The first and third conductive patterns 1110 and 1130 may operate as a dipole antenna in the first frequency band. The first and third conductive patterns 1110 and 1130 may operate in a dipole antenna mode, so that a radiation pattern may be formed in the vertical direction, as illustrated in (b) of FIG. 12A.

Referring to FIGS. 11, 15B, and 20B, the current distribution on the first conductive pattern 1110 of the antenna assembly 1000 in the second frequency band may be shown to be higher than the current distribution in other regions. A peak region Rpb of the current distribution may be formed in the boundary region of the first conductive pattern 1110. Also, the first conductive pattern 1110 may operate as a radiator in the second frequency band.

The second frequency band may be set to 1520 to 4500 MHZ, but is not limited thereto. Therefore, the first conductive pattern 1110 may operate as a monopole antenna in the second frequency band. The first conductive pattern 1110 may operate in a monopole antenna mode, so that a radiation pattern may be formed in a lateral direction, as illustrated in (a) of FIG. 12A.

Referring to FIGS. 11, 15C, and 20C, the current distribution on the second conductive pattern 1120 of the antenna assembly 1000 in the third frequency band may be shown to be higher than the current distribution in other regions. A peak region Rpc of the current distribution may be formed in the boundary region of the second conductive pattern 1120. Also, the second conductive pattern 1120 may operate as a radiator in the third frequency band. The third frequency band may be set to 4500 to 6000 MHz, but is not limited thereto. Therefore, the second conductive pattern 1120 may operate as a monopole antenna in the third frequency band. The second conductive pattern 1120 may operate in the monopole antenna mode, so that a radiation pattern may be formed in the lateral direction, as illustrated in (a) of FIG. 14A.

In some embodiments, an antenna assembly operating in a plurality of operating modes according to the specification may operate as a radiator in a plurality of frequency bands. In this regard, FIG. 21 is a view of reflection coefficient characteristics according to the presence or absence of slots for impedance matching in a CPW antenna structure according to the specification.

Figure 21:
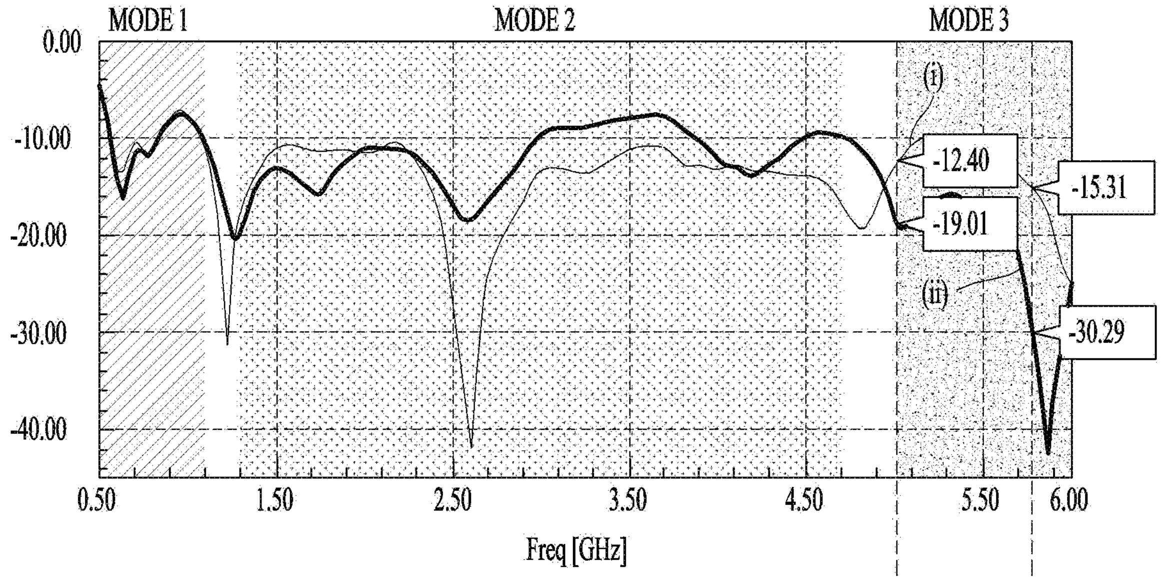
FIG. 21 is a view of reflection coefficient characteristics according to the presence or absence of slots for impedance matching in a CPW antenna structure according to the specification.

In FIG. 21, (i) shows the reflection coefficient of a first structure in which slots for impedance matching are not formed in a feeding region of the CPW antenna structure. In FIG. 21, (ii) shows the reflection coefficient of a second structure in which slots for impedance matching are formed in the feeding region of the CPW antenna structure. In FIG. 16, (ii) shows the reflection coefficient of a second structure in which the first slot 1111_s_ and the second slot 1112_s_2 of FIG. 14A are formed for impedance matching in the feeding region of the CPW antenna structure. Referring to FIG. 16, the reflection coefficient of the first structure in which slots are not formed may have a value of −12.4 to −15.3 dB in the third frequency band. The reflection coefficient of the second structure in which the first slot 1111_s_ and the second slot 1112_s_2 are formed may have a value of −19 to −30.3 dB in the third frequency band. Therefore, it may be seen that the impedance matching characteristic is improved in the third frequency band as the slots for impedance matching are formed in the feeding region of the CPW antenna structure.

Referring to FIG. 15A and FIG. 21, the antenna assembly 1000 may operate as a radiator in a first operating mode in the first frequency band. In the first frequency band of 617 to 960 MHz, the reflection coefficient may have a value of about −10 dB or less. Referring to FIG. 15B and FIG. 21, the antenna assembly 1000 may operate as a radiator in a second operating mode in the second frequency band. In the second frequency band of 1520 to 4500 MHz, the reflection coefficient may have a value of about −10 dB or less. Referring to FIG. 15C and FIG. 21, the antenna assembly 1000 may operate as a radiator in a third operating mode in the third frequency band. In the third frequency band of 4500 to 6000 MHz, the reflection coefficient may have a value of about −10 dB or less.

As the first and second slots 1111_s_ and 1112_s_ of FIG. 19A are added, the reflection coefficient value may be improved in a frequency band of about 5 GHz. In this regard, it may be seen that the reflection coefficient is significantly improved in the frequency band between 5 GHz and 6 GHz as the first and second slots 1111_s_ and 1112_s_ are additionally formed. For example, with the addition of the first and second slots 1111_s_ and 1112_s_, the reflection coefficient may have a value of about −15 dB or less in the frequency band between 5 GHz and 6 GHz.

The foregoing description has been given of the antenna assembly according to one aspect of the present disclosure. Hereinafter, an antenna assembly configured with a plurality of dielectric substrates according to another aspect of the specification will be described.

Figure 22A:
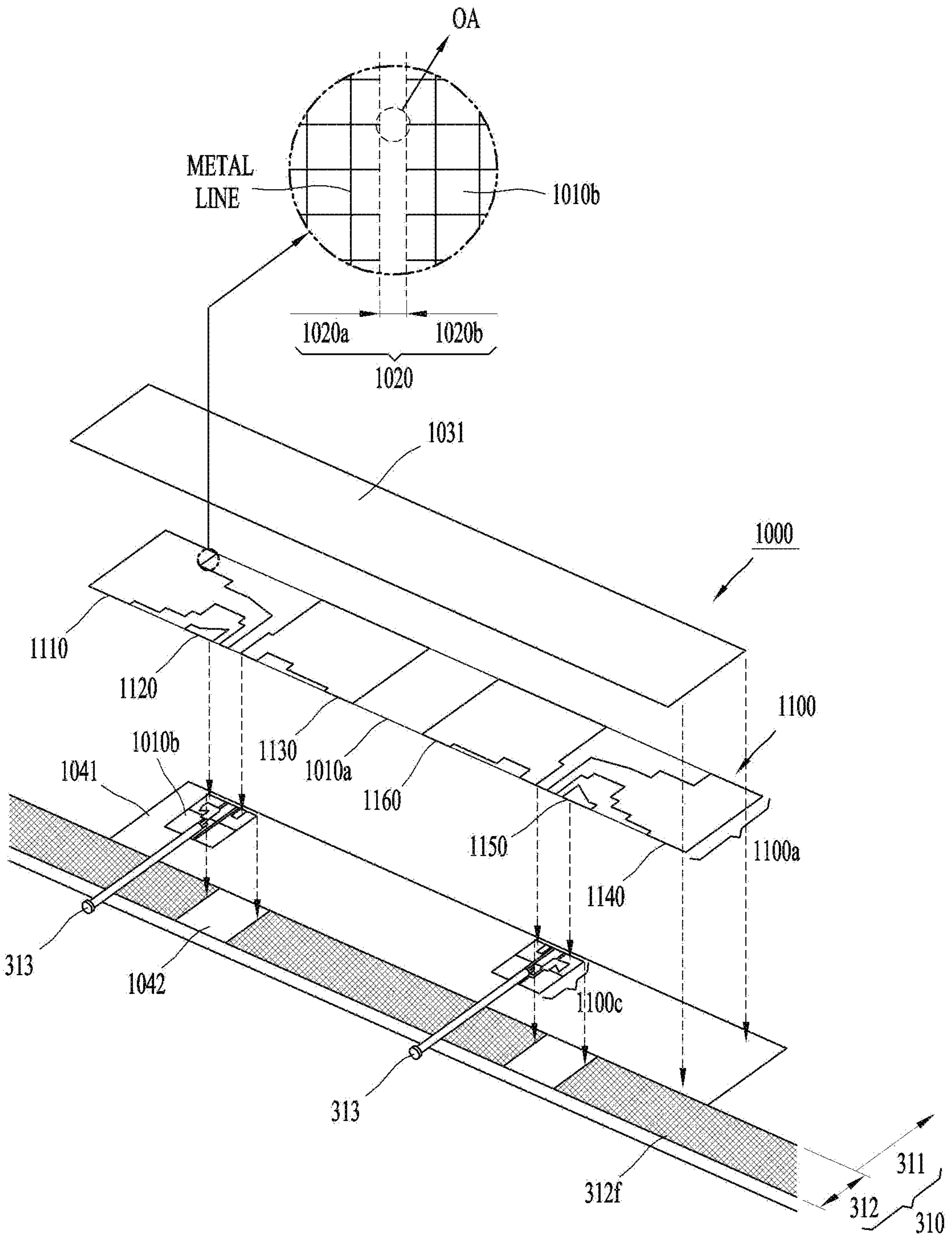
FIG. 22A is a view of a structure in which first and second dielectric substrates of an antenna assembly according to an embodiment are coupled.
Figure 22B:
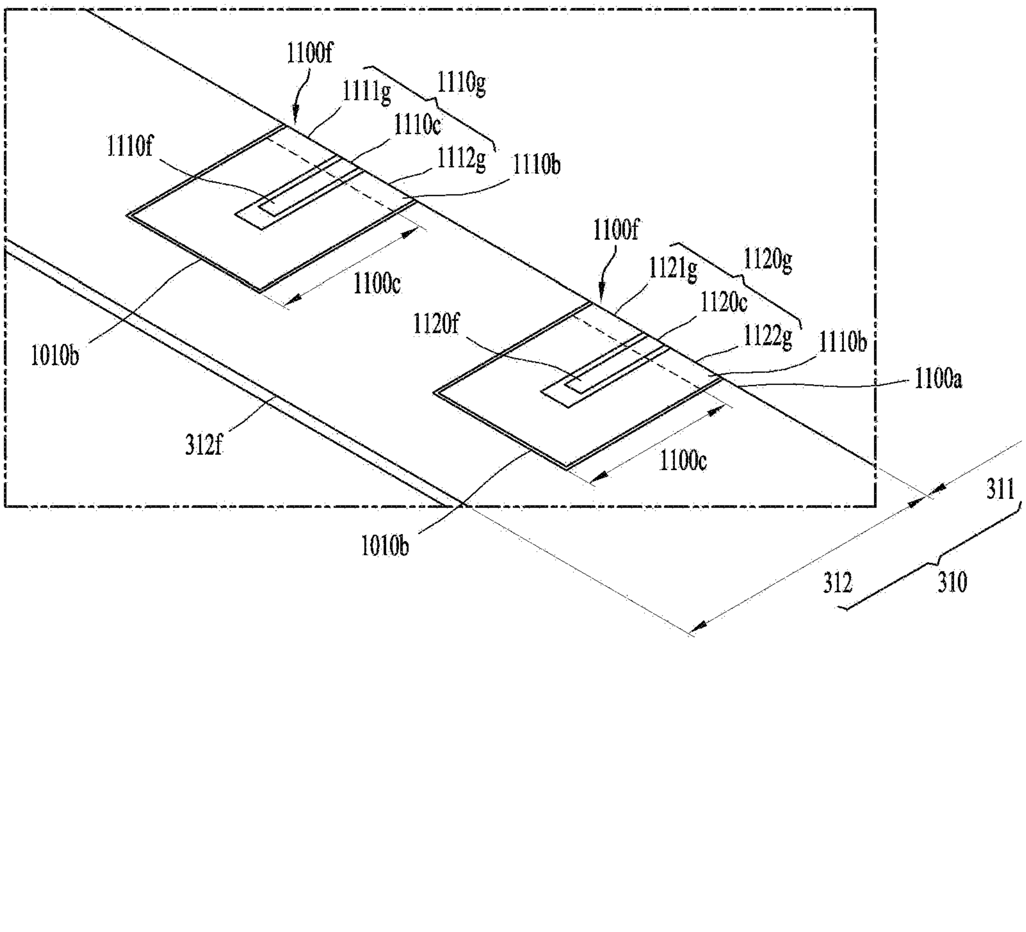
FIG. 22B is a view of a structure in which a feeding structure of the antenna assembly of FIG. 22A is arranged in an opaque region of a glass panel.

In this regard, FIG. 22A is a view of a structure in which first and second dielectric substrates of an antenna assembly according to an embodiment are coupled. FIG. 22B is a view of a structure in which a feeding structure of the antenna assembly of FIG. 22A is arranged in an opaque region of a glass panel.

Referring to FIGS. 22A and 22B, the antenna assembly 1000 may include a first dielectric substrate 1010*a* as a transparent substrate and a second dielectric substrate 1010*b* as an opaque substrate. The antenna assembly 1000 may include a first region 1100*a* corresponding to a radiator region, and a second region 1100*b* corresponding to a feeding region. The antenna assembly 1000 may further include a protective layer 1031 and adhesive layers 1041 and 1042. An antenna module 1100 implemented with one or more transparent antenna elements may be arranged in the first region 1100*a*. A feeding structure implemented with one or more second dielectric substrates 1010*b* may be arranged in the second region 1100*b*.

A glass panel 310 to which the antenna assembly 1000 may be attached may include a transparent region 311 and an opaque region 312. The first dielectric substrate 1010*a*, on which transparent antenna elements are formed, may be attached to the transparent region 311 of the glass panel 310 through the adhesive layer 1041. The protective layer 1031 may be formed in an upper region of the first dielectric substrate 1010*a*.

A frit layer 312*f* on which the frit pattern of FIG. 6A is formed may be formed in the opaque region 312 of the glass panel 310. The frit pattern may be removed from a region, in which the second dielectric substrate 1010*b* is arranged, on the frit layer 312*f* of the opaque region 312. The second dielectric substrate 1010*b* may be arranged in the opaque region 312 from which the frit pattern has been removed. The adhesive layer 1042 may be formed in the opaque region 312, from which the frit pattern has been removed, and the second dielectric substrate 1010*b* may be attached to the opaque region 312 of the glass panel 310 through the adhesive layer 1042.

Hereinafter, a vehicle including an antenna assembly 1000, which includes a plurality of dielectric substrates, will be described with reference to FIGS. 1, 9A to 9C, 11, 19A, 22A, and 22B.

The vehicle may include a glass panel 310 and an antenna assembly 1000 arranged on the glass panel 310. The glass panel 310 may include a transparent region 311 and an opaque region 312. The antenna assembly 1000 may include a first dielectric substrate 1010*a*, a second dielectric substrate 1010*b*, a second region 1100*b*, and a third region 1100*c*.

The first region 1100*a* may include antenna elements that include conductive patterns on one side of the first dielectric substrate 1010*a* and are configured to radiate radio signals. The second region 1100*b* may include connection patterns 1110*c* and 1120*c* connected to the antenna elements and arranged in the opaque region 312 of the glass panel 310. The first connection patterns 1110*c* may be electrically connected to the second connection patterns 1120*c* of (b) of FIG. 7A. The third region 1100*c* may include ground conductive patterns 1110*g* and 1120*g* and feeding patterns 1110*f* and 1120*f* on one side of the second dielectric substrate 1010*b*. The first region 1100*a* and the third region 1100*c* may also be referred to as a radiator region and a ground region (or a feeding region), respectively.

The antenna elements 1100 may be configured to include a plurality of antenna structures and may also be referred to as an antenna module 1100. The antenna elements 1100 may include a first radiation structure 1100-1 and a second radiation structure 1110-2.

Each of the first radiation structure 1100-1 and the second radiation structure 1100-2 formed in the first region 1100*a* of the antenna assembly 1000 may be implemented with two or more conductive patterns and configured to operate in a plurality of frequency bands. The plurality of conductive patterns formed in the first region 1100*a* may include a first conductive pattern 1110 and a third conductive pattern 1130. The plurality of conductive patterns may further include a first conductive pattern 1110, a second conductive pattern 1120, and a third conductive pattern 1130.

The first radiation structure 1100-1 may include the first conductive pattern 1110, the second conductive pattern 1120, and the third conductive pattern 1130. The first conductive pattern 1110 may include a plurality of sub-patterns, namely, a plurality of conductive parts. The first conductive pattern 1110 may include a first part 1111 and a second part 1112. The first part 1111 may be formed perpendicularly to the second section 1112. The second part 1112 may be electrically connected to the feeding pattern 1110*f*. In this regard, "being electrically connected" may mean that the respective conductive parts are connected directly or by being spaced apart at a certain gap.

The second conductive pattern 1120 may be arranged in one side region or lower region of the first conductive pattern 1110. The second conductive pattern 1120 may be electrically connected to a first part 1111*g* of the ground conductive pattern 1110*g*. The second conductive pattern 1120 may further be arranged on the antenna assembly 1000 to resonate further in a frequency band different from the operating frequency bands of the first conductive pattern 1110 and the third conductive pattern 1130.

The third conductive pattern 1130 may be arranged in another side region of the first conductive pattern 1110. The third conductive pattern 1130 may be electrically connected to a second part 1112*g* of the ground conductive pattern 1110*g*. The size of the second conductive pattern 1120 may be smaller than the size of the third conductive pattern 1130. Accordingly, the antenna assembly 1000 may operate as a radiator in a higher frequency band by the second conductive pattern 1120.

The second conductive pattern 1120 may be located between the first part 1111 of the first conductive pattern 1110 and the ground conductive pattern 1110*g*. The second conductive pattern 1110 may be located between the first part 1111 of the first conductive pattern 1110 and the second part 1112 of the first conductive pattern 1110. Accordingly, the second conductive pattern 1120 may be arranged in a lower region of the first conductive pattern 1110, and the size of the antenna assembly 1000 may be reduced compared to the case where the second conductive pattern 1120 is arranged in one side region of the first conductive pattern 1110. The first part 1111 of the first conductive pattern 1110 and the third conductive pattern 1130 may be arranged on opposite sides with respect to the second part 1112 of the first conductive pattern 1110. The first part 1111 of the first conductive pattern 1110 and the third conductive pattern 1130 may be arranged in one side region and another side region with respect to the second part 1112 of the first conductive pattern 1110.

The second radiation structure 1100-2 may include a fourth conductive pattern 1140, a fifth conductive pattern 1150, and a third conductive pattern 1160. The fourth conductive pattern 1140 may include a plurality of sub-patterns, namely, a plurality of conductive parts. The fourth conductive pattern 1140 may include a third part 1141 and a fourth part 1142. The third part 1141 may be formed perpendicularly to the fourth part 1142. The fourth part 1142 may be electrically connected to the feeding pattern 1110*f*. In this regard, "being electrically connected" may mean that the respective conductive parts are connected directly or by being spaced apart at a certain gap.

The fifth conductive pattern 1150 may be located in one side region or a lower region of the fourth conductive pattern 1140. The fifth conductive pattern 1150 may be electrically connected to the first part 1121*g* of the second ground conductive pattern 1120*g*. The fifth conductive pattern 1150 may further be arranged on the antenna assembly 1000 to resonate further in a frequency band different from the operating frequency bands of the fourth conductive pattern 1140 and the sixth conductive pattern 1160.

The sixth conductive pattern 1160 may be arranged in another side region of the fourth conductive pattern 1140. The sixth conductive pattern 1160 may be electrically connected to the second part 1122*g* of the second ground conductive pattern 1120*g*. The size of the fifth conductive pattern 1150 may be smaller than the size of the sixth conductive pattern 1160. Accordingly, the antenna assembly 1000 may operate as a radiator in a higher frequency band by the fifth conductive pattern 1150.

The fifth conductive pattern 1150 may be located between the third part 1141 of the fourth conductive pattern 1140 and the second ground conductive pattern 1120*g*. The fifth conductive pattern 1140 may be located between the third part 1141 of the fourth conductive pattern 1140 and the fourth part 1142 of the fourth conductive pattern 1110. Accordingly, the fifth conductive pattern 1150 may be arranged in a lower region of the fourth conductive pattern 1140, and the size of the antenna assembly 1000 may be reduced compared to the case where the fifth conductive pattern 1150 is arranged in one side region of the fourth conductive pattern 1140. The third part 1141 of the fourth conductive pattern 1140 and the sixth conductive pattern 1160 may be arranged on opposite sides with respect to the fourth part 1142 of the fourth conductive pattern 1140. The third part 1141 of the fourth conductive pattern 1140 and the sixth conductive pattern 1160 may be arranged in one side region and another side region with respect to the fourth part 1142 of the fourth conductive pattern 1140.

The first radiation structure 1100-1 and the second radiation structure 1100-2 may have a symmetrical structure with respect to one axis. With regard to this, the third conductive pattern 1130 of the first radiation structure 1100-1 may be arranged to oppose the sixth conductive pattern 1160 of the second radiation structure 1100-2. The first radiation structure 1100-1 and the second radiation structure 1100-2 may be configured to perform MIMO.

In some embodiments, an antenna assembly according to the specification may be configured in a transparent antenna structure. In this regard, referring to FIGS. 7B, 11A, and 19, the first conductive pattern 1110 and the third conductive pattern 1130 of the antenna assembly 1000 may be formed in a metal mesh shape 1020 having a plurality of open regions OA on the dielectric substrate 1010*a*. The first conductive pattern 1110 and the third conductive pattern 1130 may include metal grid patterns 1020*a*. The metal grid patterns 1020*a* and dummy metal grid patterns 1020*b* may form open regions OA. The first conductive pattern 1110 and the third conductive pattern 1130 may configure a CPW structure on the dielectric substrate 1010*a*.

Referring to FIGS. 7B, 11B, and 19, the first conductive pattern 1110, the second conductive pattern 1120, and the third conductive pattern 1130 may be formed in the metal mesh shape 1020 having the plurality of open regions OA on the dielectric substrate 1010. The first conductive pattern 1110, the second conductive pattern 1120, and the third conductive pattern 1130 may be formed in the CPW structure on the dielectric substrate 1010. The first conductive pattern 1110, the second conductive pattern 1120, and the third conductive pattern 1130 may include the metal grid patterns 1020*a*. The metal grid patterns 1020*a* and dummy metal grid patterns 1020*b* may form open regions OA. The first conductive pattern 1110, the second conductive pattern 1120, and the third conductive pattern 1130 may be formed in the CPW structure on the dielectric substrate 1010*a*.

The antenna assembly 1000 may include a plurality of dummy mesh grid patterns 1020*b* on an outer portion of the radiator region, namely, the first region 1100*a* on the dielectric substrate 1010*a*. The plurality of dummy mesh grid patterns 1020*b* may also be arranged even in a dielectric region between the first to third conductive patterns 1110 to 1130. The plurality of dummy mesh grid patterns 1020*b* may be formed not to be connected to the feeding pattern 1110*f* and the ground pattern region 1110*g*. The plurality of dummy mesh grid patterns 1020*b* may be separated from each other.

Figure 23A:
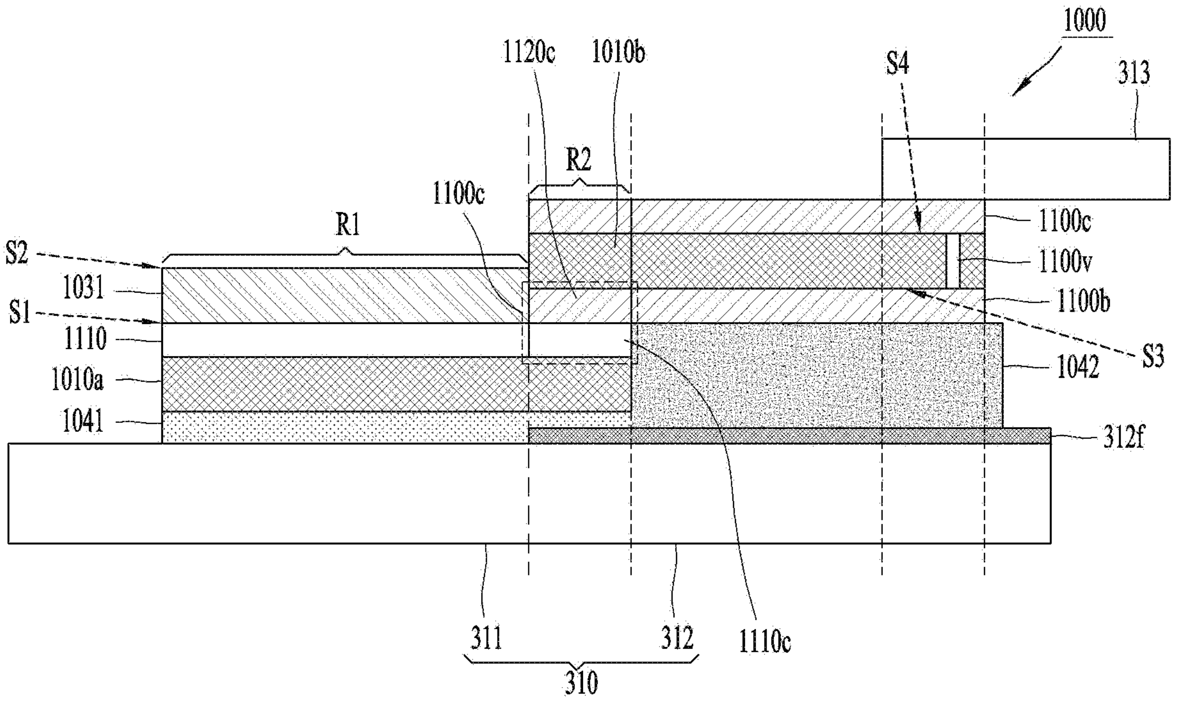
FIG. 23A is a view of a stacked structure of an antenna assembly according to another aspect of the specification.
Figure 23B:
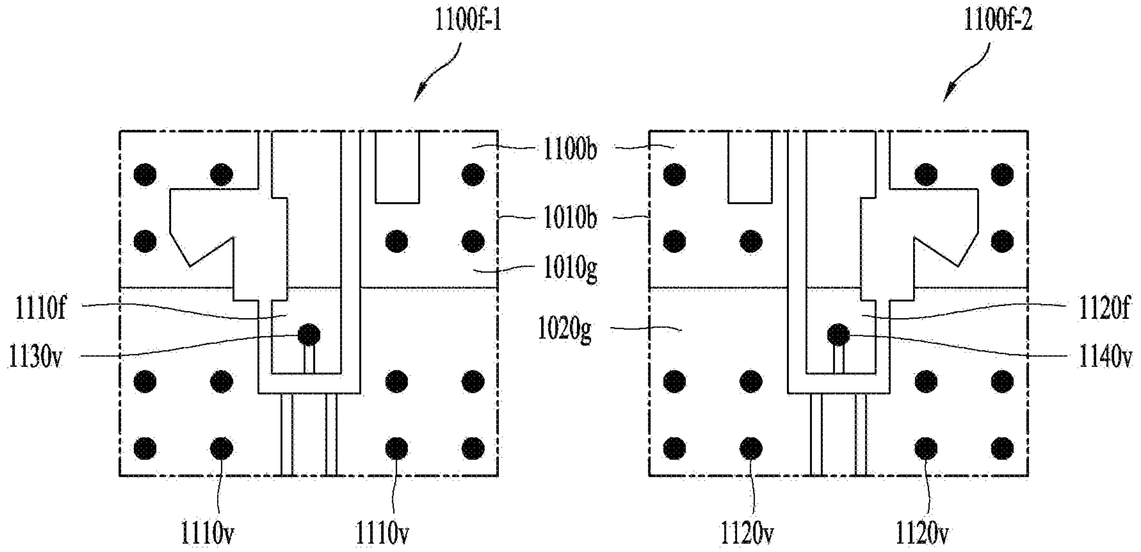
FIG. 23B is a front view of each layer constituting a via connection structure between conductive patterns of a feeding structure of FIG. 20A.
Figure 23B:
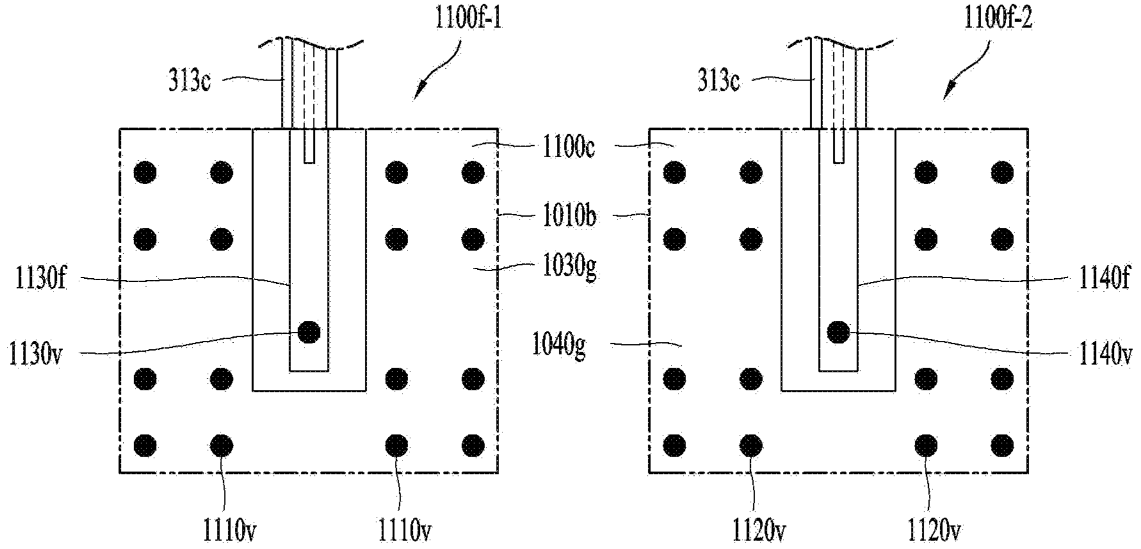
Figure 23C:
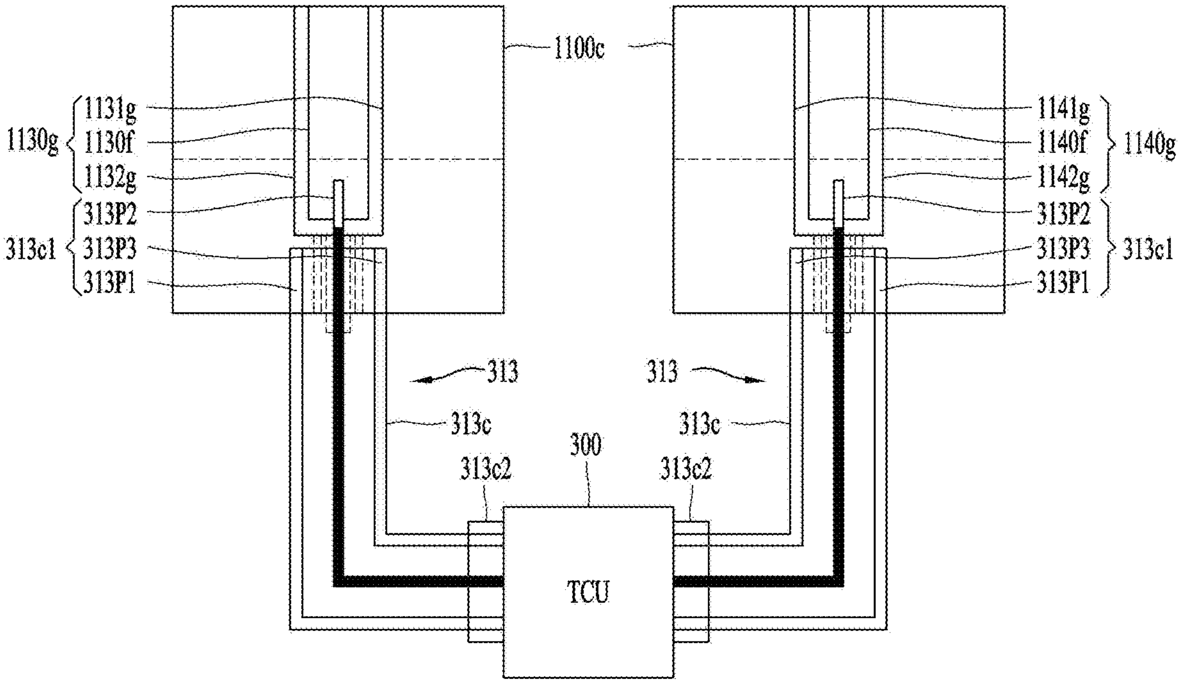
FIG. 23C is a view of a structure in which connection elements are connected to an upper conductive pattern of the feeding structure of FIG. 23A.

Hereinafter, an antenna assembly configured with a plurality of dielectric substrates according to still another aspect of the specification will be described. In this regard, FIG. 23A is a view of a stacked structure of an antenna assembly according to still another aspect of the specification. FIG. 23B is a front view of each layer constituting a via connection structure between conductive patterns of a feeding structure of FIG. 20A. FIG. 23C is a view of a structure in which connection elements are connected to an upper conductive pattern of the feeding structure of FIG. 23A.

With regard to this, a description will be given of a vehicle including an antenna assembly 1000, which includes a plurality of dielectric substrates, with reference to FIGS. 1, 8A to 9C, 11, 19A, and 23A to 23C.

The vehicle may include a glass panel 310 and an antenna assembly 1000 arranged on the glass panel 310. The antenna assembly 1000 may include a first dielectric substrate 1010*a*, a first region 1100*a*, a second dielectric substrate 1010*b*, a second region 1100*b*, and a connection region 1100*c*.

The first region 1100*a* may include antenna elements that include conductive patterns on one side of the first dielectric substrate 1010*a* and are configured to radiate radio signals. The second region 1100*b* may include first and second ground conductive patterns 1110*g* and 1120*g* and first and second feeding patterns 1110*f* and 1120*f* on one side of the second dielectric substrate 1010*b*. The first region 1100*a* and the second region 1100*b* may also be referred to as a radiator region and a ground region (or a feeding region), respectively. The connection region 1100*c* may include third and fourth ground conductive patterns 1130*g* and 1140*g* and third and fourth feeding patterns 1130*f* and 1140*f* on another side of the second dielectric substrate 1010*b*.

The antenna elements 1100 may include a plurality of antenna structures and may also be referred to as an antenna module 1100. The antenna elements 1100 may include a first radiation structure 1100-1 and a second radiation structure 1110-2.

Each of the first radiation structure 1100-1 and the second radiation structure 1100-2 formed in the first region 1100*a* of the antenna assembly 1000 may be implemented with two or more conductive patterns and configured to operate in a plurality of frequency bands. The plurality of conductive patterns formed in the first region 1100*a* may include a first conductive pattern 1110 and a third conductive pattern 1130. The plurality of conductive patterns may further include a first conductive pattern 1110, a second conductive pattern 1120, and a third conductive pattern 1130.

The first radiation structure 1100-1 may include the first conductive pattern 1110, the second conductive pattern 1120, and the third conductive pattern 1130. The first conductive pattern 1110 may include a plurality of sub-patterns, namely, a plurality of conductive portions. The first conductive pattern 1110 may include a first part 1111 and a second part 1112. The first part 1111 may be formed perpendicularly to the second part 1112. The second part 1112 may be electrically connected to the feeding pattern 1110*f*. In this regard, "being electrically connected" may mean that the respective conductive portions are connected directly or by being spaced apart at a certain gap.

The second conductive pattern 1120 may be arranged in one side region or lower region of the first conductive pattern 1110. The second conductive pattern 1120 may be electrically connected to a first part 1111*g* of the ground conductive pattern 1110*g*. The second conductive pattern 1120 may further be arranged on the antenna assembly 1000 to resonate further in a frequency band different from the operating frequency bands of the first conductive pattern 1110 and the third conductive pattern 1130.

The third conductive pattern 1130 may be arranged in another side region of the first conductive pattern 1110. The third conductive pattern 1130 may be electrically connected to a second part 1112*g* of the ground conductive pattern 1110*g*. The size of the second conductive pattern 1120 may be smaller than the size of the third conductive pattern 1130. Accordingly, the antenna assembly 1000 may operate as a radiator in a higher frequency band by the second conductive pattern 1120.

The second conductive pattern 1120 may be located between the first part 1111 of the first conductive pattern 1110 and the ground conductive pattern 1110*g*. The second conductive pattern 1110 may be located between the first part 1111 of the first conductive pattern 1110 and the second part 1112 of the first conductive pattern 1110. Accordingly, the second conductive pattern 1120 may be arranged in a lower region of the first conductive pattern 1110, and the size of the antenna assembly 1000 may be reduced compared to the case where the second conductive pattern 1120 is arranged in one side region of the first conductive pattern 1110. The first part 1111 of the first conductive pattern 1110 and the third conductive pattern 1130 may be arranged on opposite sides with respect to the second part 1112 of the first conductive pattern 1110. The first part 1111 of the first conductive pattern 1110 and the third conductive pattern 1130 may be arranged in one side region and another side region with respect to the second part 1112 of the first conductive pattern 1110.

The second radiation structure 1100-2 may include a fourth conductive pattern 1140, a fifth conductive pattern 1150, and a third conductive pattern 1160. The fourth conductive pattern 1140 may include a plurality of sub-patterns, namely, a plurality of conductive parts. The fourth conductive pattern 1140 may include a third part 1141 and a fourth part 1142. The third part 1141 may be formed perpendicularly to the fourth part 1142. The fourth part 1142 may be electrically connected to the feeding pattern 1110*f*. In this regard, "being electrically connected" may mean that the respective conductive portions are connected directly or by being spaced apart at a certain gap.

The fifth conductive pattern 1150 may be located in one side region or a lower region of the fourth conductive pattern 1140. The fifth conductive pattern 1150 may be electrically connected to a first part 1121*g* of the second ground conductive pattern 1120*g*. The fifth conductive pattern 1150 may further be arranged on the antenna assembly 1000 to resonate further in a frequency band different from the operating frequency bands of the fourth conductive pattern 1140 and the sixth conductive pattern 1160.

The sixth conductive pattern 1160 may be arranged in another side region of the fourth conductive pattern 1140. The sixth conductive pattern 1160 may be electrically connected to a second part 1122*g* of the second ground conductive pattern 1120*g*. The size of the fifth conductive pattern 1150 may be smaller than the size of the sixth conductive pattern 1160. Accordingly, the antenna assembly 1000 may operate as a radiator in a higher frequency band by the fifth conductive pattern 1150.

The fifth conductive pattern 1150 may be located between the third part 1141 of the fourth conductive pattern 1140 and the second ground conductive pattern 1120*g*. The fifth conductive pattern 1140 may be located between the third part 1141 of the fourth conductive pattern 1140 and the fourth part 1142 of the fourth conductive pattern 1110. Accordingly, the fifth conductive pattern 1150 may be arranged in a lower region of the fourth conductive pattern 1140, and the size of the antenna assembly 1000 may be reduced compared to the case where the fifth conductive pattern 1150 is arranged in one side region of the fourth conductive pattern 1140. The third part 1141 of the fourth conductive pattern 1140 and the sixth conductive pattern 1160 may be arranged on opposite sides with respect to the fourth part 1142 of the fourth conductive pattern 1140. The third part 1141 of the fourth conductive pattern 1140 and the sixth conductive pattern 1160 may be arranged in one side region and another side region with respect to the fourth part 1142 of the fourth conductive pattern 1140.

The first radiation structure 1100-1 and the second radiation structure 1100-2 may have a symmetrical structure with respect to one axis. With regard to this, the third conductive pattern 1130 of the first radiation structure 1100-1 may be arranged to oppose the sixth conductive pattern 1160 of the second radiation structure 1100-2. The first radiation structure 1100-1 and the second radiation structure 1100-2 may be configured to perform MIMO.

Meanwhile, the ground conductive patterns of the antenna assembly 1000 according to the specification may be interconnected by vias formed in the vertical structure, so that ground conductive patterns on different layers may be electrically connected. In some examples, the feeding patterns may also be interconnected by the vertical vias, so that signals may be transmitted through the feeding patterns of different layers.

Referring to FIG. 23A, the antenna module 1100 and the feeding structure 1100*f* may be coupled to each other. In this regard, the antenna module 1100 may include a first dielectric substrate 1010*a* which is a transparent substrate and a conductive region 1110. The antenna module 1100 may include a protective layer 1031 arranged above the first conductive pattern 1100. The antenna module 1100 may include an adhesive layer 1041 by which the first dielectric substrate 1010*a* is attached to the transparent region 311 of the glass panel 310. The feeding structure 1100*f* may have conductive regions 1100*b* and 1100*c* arranged respectively above and below the second dielectric substrate 1010*b*, which is the opaque substrate. The lower conductive region 1100*b* may be arranged in the opaque region 312 of the glass panel 310 through the adhesive layer 1042.

The conductive region 1110 of the antenna module 1100 may be referred to as a radiator region. The conductive regions 1100*b* and 1100*c* of the feeding structure 1100*f* may be referred to as a ground region (or feeding region) and a connection region, respectively.

The antenna assembly 1000 may include a first dielectric substrate 1010*a*, a first region 1100*a*, a second dielectric substrate 1010*b*, a second region 1100*b*, and a connection region 1100*c*.

Referring to FIG. 23B, the conductive regions 1100*b* and 1100*c* arranged on different layers may be interconnected by vertically connected vias 1110*v*. Referring to FIGS. 23A and 23B, the via 1100*v* vertically connecting conductive patterns arranged on different layers may include at least one of a first via 1110*v* to a fourth via 1140*v*.

(a) of FIG. 23B shows the first conductive region 1100*b* of the first and second feeding structures 1100*f*-1 and 1100*f*-2 formed on one side of the second dielectric substrate 1010*b*. (b) of FIG. 23B shows the second conductive region 1100*c* of the first and second feeding structures 1100*f*-1 and 1100*f*-2 formed on another side of the second dielectric substrate 1010*b*. The first conductive region 1100*b*, like the second region 1100*b* of FIG. 19A, may include first and second slits 1111*s* and 1112*s*. The second conductive region 1100*c*, like the second conductive region 1100*c* of FIG. 23C, may have a structure without a slit. However, it is not limited to this structure, and the second conductive region 1100*c* may be formed in a slit structure as in FIG. 19A.

Referring to FIG. 19A and FIGS. 23A to 23C, the first ground conductive pattern 1110*g* may be electrically connected to the third ground conductive pattern 1130*g* by at least one first via 1110*v*. The second ground conductive pattern 1120*g* may be electrically connected to the fourth ground conductive pattern 1140*g* by at least one second via 1120*v*. The first feeding pattern 1110*f* may be electrically connected to the third feeding pattern 1130*f* by at least one third via 1130*v*. The second feeding pattern 1120*f* may be electrically connected to the fourth feeding pattern 1140*f* by at least one fourth via 1140*v*.

Referring to FIG. 23C, the vehicle including the antenna assembly 1000 according to the specification may further include connection elements 313 and a TCU 300.

The connection elements 313 may include a first connecting portion 313*cl*, a second connecting portion 313*c*2, and a cable 313*c* connected between the first connecting portion 313*cl* and the second connecting portion 313*c*2. The first connecting portion 313*cl* may include a first pin 313P1, a second pin 313P2, and a third pin 313P3. The first pin 313P1 may be connected to the first part 1131*g* of the third ground conductive pattern 1130*g*. The second pin 313P2 may be connected to the third feeding pattern 1130*f*. The third pin 313P3 may be connected to the second part 1132*g* of the third ground conductive pattern 1130*g*.

The connection elements 313 may be implemented as coaxial cables, but are not limited thereto. The connection elements 313 may also be implemented as a flat cable assembly. The first pin 313P1 and the third pin 313P3 of the first connecting portion 313*cl* may be implemented as outer conductors of a coaxial cable. The first pin 313P1 and the third pin 313P3 of the first connecting portion 313*cl* may be implemented as outer conductors of a single body. The second pin 313P2 of the first connecting portion 313*cl* may be implemented as an inner conductor of a coaxial cable. The second connecting portion 313*c*2 may be connected to the TCU 300.

Hereinafter, an antenna assembly configured with a plurality of dielectric substrates according to still another aspect of the specification will be described. Hereinafter, a vehicle including an antenna assembly 1000, which includes a plurality of dielectric substrates, will be described with reference to FIGS. 1, 9A to 9C, 11, 13A, and 23A to 23C.

The vehicle may include a glass panel 310 and an antenna assembly 1000 arranged on the glass panel 310. The glass panel 310 may include a transparent region 311 and an opaque region 312. The antenna assembly 1000 may include a first dielectric substrate 1010*a*, a radiator region 1100*a*, a second dielectric substrate 1010*b*, a first conductive region 1100*b*, and a second conductive region 1100*c*.

The radiator region 1100*a* may include antenna elements that include conductive patterns on one side of the first dielectric substrate 1010*a* and are configured to radiate radio signals. The first conductive region 1100*b* may include first and second ground conductive patterns 1110*g* and 1120*g* and first and second feeding patterns 1110*f* and 1120*f* on one side of the second dielectric substrate 1010*b*. The second conductive region 1100*c* may include third and fourth ground conductive patterns 1130*g* and 1140*g* and third and fourth feeding patterns 1130*f* and 1140*f* on another side of the second dielectric substrate 1010*b*.

The antenna elements 1100 may include a plurality of antenna structures and may also be referred to as an antenna module 1100. The antenna elements 1100 may include a first radiation structure 1100-1 and a second radiation structure 1110-2.

Each of the first radiation structure 1100-1 and the second radiation structure 1100-2 formed in the first region 1100*a* of the antenna assembly 1000 may be implemented with two or more conductive patterns and configured to operate in a plurality of frequency bands. The plurality of conductive patterns formed in the first region 1100*a* may include a first conductive pattern 1110 and a third conductive pattern 1130. The plurality of conductive patterns may further include a first conductive pattern 1110, a second conductive pattern 1120, and a third conductive pattern 1130.

The first radiation structure 1100-1 may include the first conductive pattern 1110, the second conductive pattern 1120, and the third conductive pattern 1130. The first conductive pattern 1110 may include a plurality of sub-patterns, namely, a plurality of conductive parts. The first conductive pattern 1110 may include a first part 1111 and a second part 1112. The first part 1111 may be formed perpendicularly to the second part 1112. The second part 1112 may be electrically connected to the feeding pattern 1110*f*. In this regard, "being electrically connected" may mean that the respective conductive parts are connected directly or by being spaced apart at a certain gap.

The second conductive pattern 1120 may be arranged in one side region or lower region of the first conductive pattern 1110. The second conductive pattern 1120 may be electrically connected to a first part 1111*g* of a ground conductive pattern 1110*g*. The second conductive pattern 1120 may further be arranged on the antenna assembly 1000 to resonate further in a frequency band different from the operating frequency bands of the first conductive pattern 1110 and the third conductive pattern 1130.

The third conductive pattern 1130 may be arranged in another side region of the first conductive pattern 1110. The third conductive pattern 1130 may be electrically connected to the second part 1112*g* of the ground conductive pattern 1110*g*. The size of the second conductive pattern 1120 may be smaller than the size of the third conductive pattern 1130. Accordingly, the antenna assembly 1000 may operate as a radiator in a higher frequency band by the second conductive pattern 1120.

The second conductive pattern 1120 may be located between the first part 1111 of the first conductive pattern 1110 and the first ground conductive pattern 1110*g*. The second conductive pattern 1110 may be located between the first part 1111 of the first conductive pattern 1110 and the second part 1112 of the first conductive pattern 1110. Accordingly, the second conductive pattern 1120 may be arranged in a lower region of the first conductive pattern 1110, and the size of the antenna assembly 1000 may be reduced compared to the case where the second conductive pattern 1120 is arranged in one side region of the first conductive pattern 1110. The first part 1111 of the first conductive pattern 1110 and the third conductive pattern 1130 may be arranged on opposite sides with respect to the second part 1112 of the first conductive pattern 1110. The first part 1111 of the first conductive pattern 1110 and the third conductive pattern 1130 may be arranged in one side region and another side region with respect to the second part 1112 of the first conductive pattern 1110.

The second radiation structure 1100-2 may include a fourth conductive pattern 1140, a fifth conductive pattern 1150, and a third conductive pattern 1160. The fourth conductive pattern 1140 may include a plurality of sub-patterns, namely, a plurality of conductive parts. The fourth conductive pattern 1140 may include a third part 1141 and a fourth part 1142. The third part 1141 may be formed perpendicularly to the fourth part 1142. The fourth part 1142 may be electrically connected to the feeding pattern 1110*f*. In this regard, "being electrically connected" may mean that the respective conductive parts are connected directly or by being spaced apart at a certain gap.

The fifth conductive pattern 1150 may be arranged in one side region or a lower region of the fourth conductive pattern 1140. The fifth conductive pattern 1150 may be electrically connected to a first part 1121*g* of a second ground conductive pattern 1120*g*. The fifth conductive pattern 1150 may further be arranged on the antenna assembly 1000 to resonate further in a frequency band different from the operating frequency bands of the fourth conductive pattern 1140 and the sixth conductive pattern 1160.

The sixth conductive pattern 1160 may be arranged in another side region of the fourth conductive pattern 1140. The sixth conductive pattern 1160 may be electrically connected to the second part 1122*g* of the second ground conductive pattern 1120*g*. The size of the fifth conductive pattern 1150 may be smaller than the size of the sixth conductive pattern 1160. Accordingly, the antenna assembly 1000 may operate as a radiator in a higher frequency band by the fifth conductive pattern 1150.

The fifth conductive pattern 1150 may be located between the third part 1141 of the fourth conductive pattern 1140 and the second ground conductive pattern 1120*g*. The fifth conductive pattern 1140 may be located between the third part 1141 of the fourth conductive pattern 1140 and the fourth part 1142 of the fourth conductive pattern 1110. Accordingly, the fifth conductive pattern 1150 may be arranged in a lower region of the fourth conductive pattern 1140, and the size of the antenna assembly 1000 may be reduced compared to the case where the fifth conductive pattern 1150 is arranged in one side region of the fourth conductive pattern 1140. The third part 1141 of the fourth conductive pattern 1140 and the sixth conductive pattern 1160 may be arranged on opposite sides with respect to the fourth part 1142 of the fourth conductive pattern 1140. The third part 1141 of the fourth conductive pattern 1140 and the sixth conductive pattern 1160 may be arranged in one side region and another side region with respect to the fourth part 1142 of the fourth conductive pattern 1140.

The first radiation structure 1100-1 and the second radiation structure 1100-2 may have a symmetrical structure with respect to one axis. With regard to this, the third conductive pattern 1130 of the first radiation structure 1100-1 may be arranged to face the sixth conductive pattern 1160 of the second radiation structure 1100-2. The first radiation structure 1100-1 and the second radiation structure 1100-2 may be configured to perform MIMO.

Meanwhile, the ground conductive patterns of the antenna assembly 1000 according to the specification may be interconnected by vias formed in the vertical structure, so that ground conductive patterns on different layers may be electrically connected. In some examples, the feeding patterns may also be interconnected by the vertical vias, so that signals may be transmitted through the feeding patterns on different layers.

In this regard, the first ground conductive pattern 1110*g* may be electrically connected to the third ground conductive pattern 1130*g* by at least one first via 1110*v*. The second ground conductive pattern 1120*g* may be electrically connected to the fourth ground conductive pattern 1140*g* by at least one second via 1120*v*. The first feeding pattern 1110*f* may be electrically connected to the third feeding pattern 1130*f* by at least one third via 1130*v*. The second feeding pattern 1120*f* may be electrically connected to the fourth feeding pattern 1140*f* by at least one fourth via 1140*v*.

Meanwhile, an antenna assembly according to the specification may include a first transparent dielectric substrate, on which a transparent electrode layer is formed, and a second dielectric substrate. In this regard, FIGS. 24A and 24B are views of a flowchart of processes in which an antenna assembly is manufactured by being coupled to a glass panel according to embodiments.

Figure 24A:
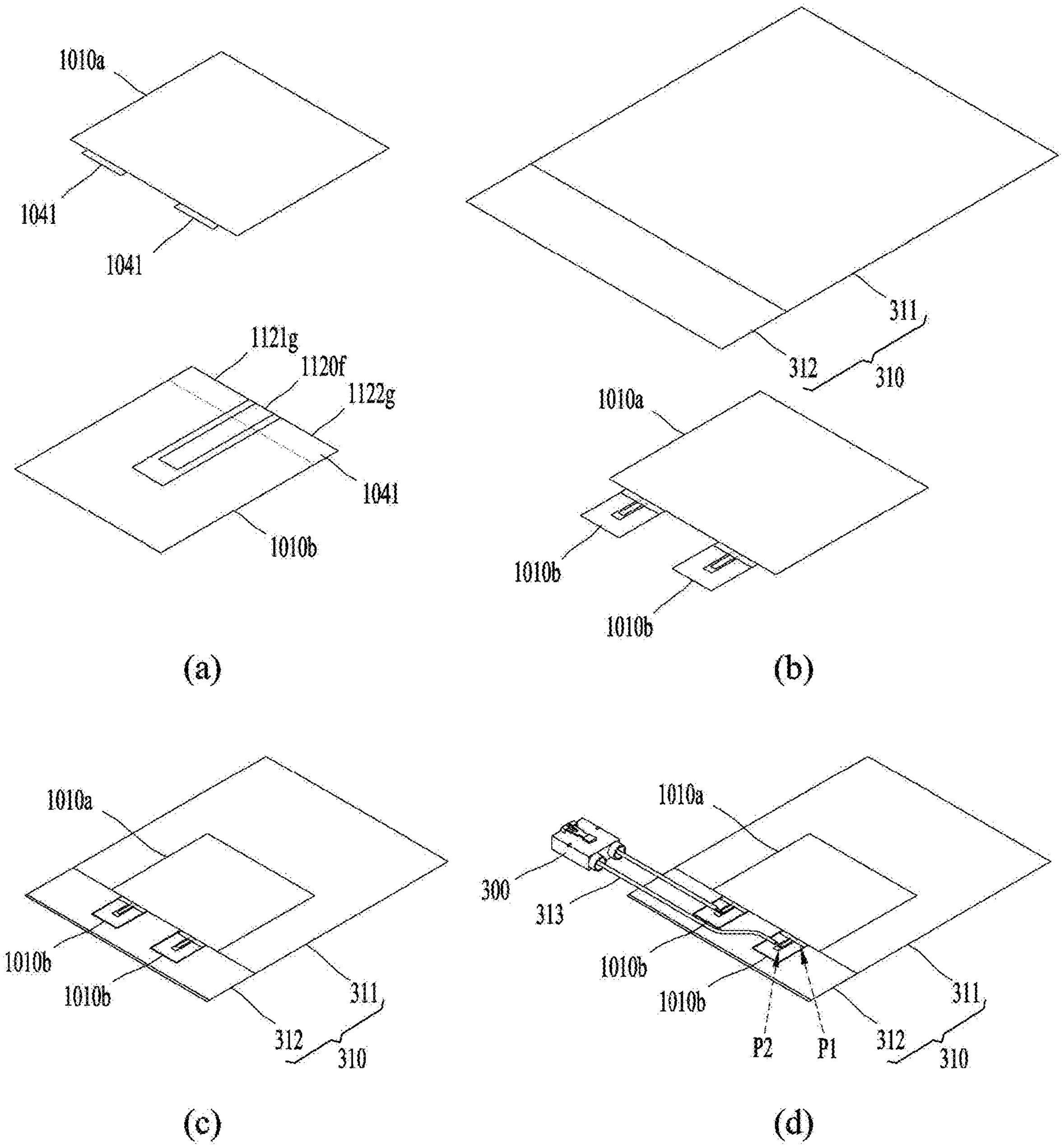
FIGS. 24A and 24B are views of a flowchart of processes in which an antenna assembly according to one or more embodiments is manufactured by being coupled to a glass panel.
Figure 24B:
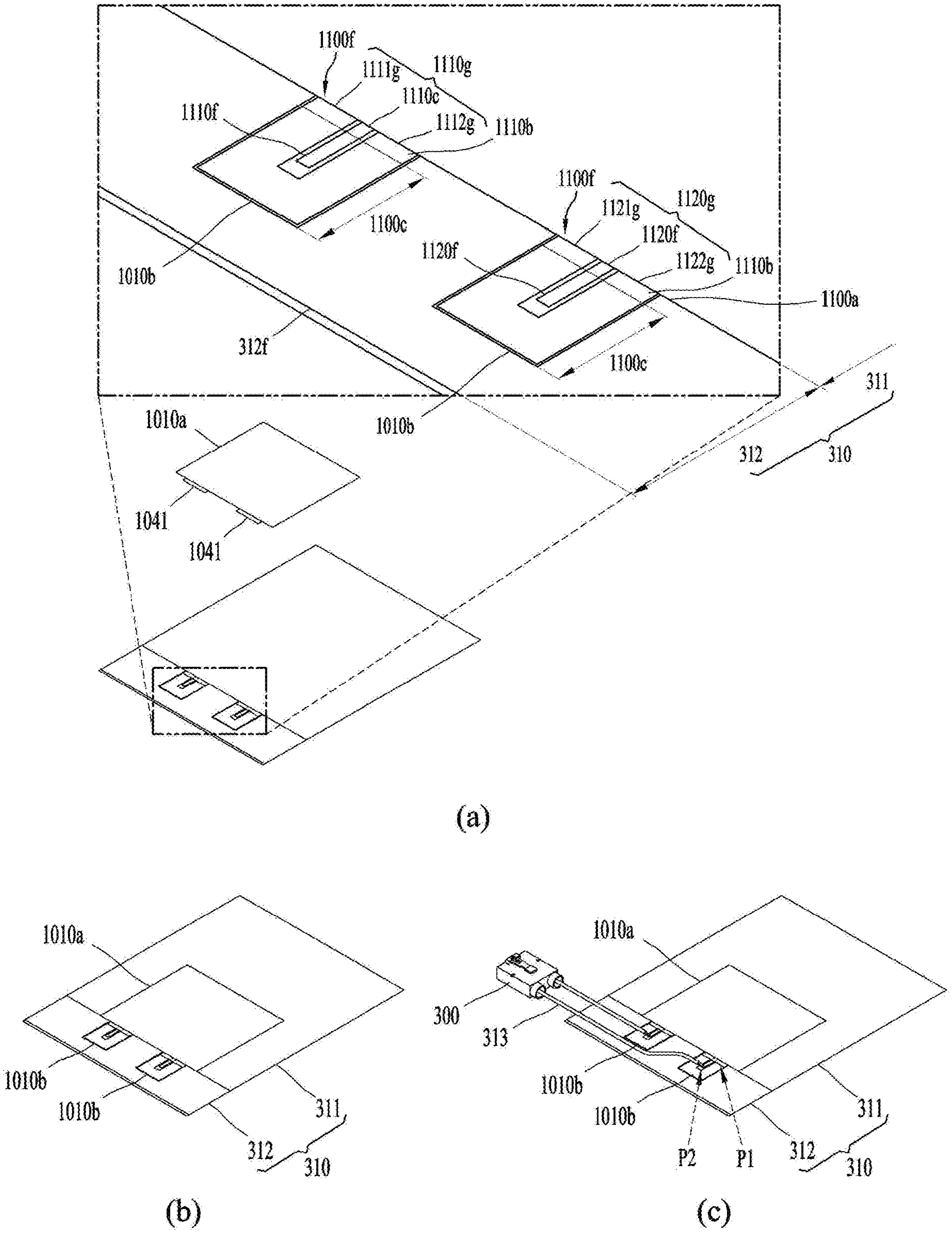

Referring to (a) of FIG. 24A, a first transparent dielectric substrate 1000*a* on which a transparent electrode layer is formed may be manufactured. In addition, a second dielectric substrate 1000*b* that includes a feeding pattern 1120*f* and ground patterns 1121*g* and 1122*g* formed on opposite sides of the feeding pattern 1120*f* may be manufactured. The second dielectric substrate 1000*b* may be implemented as an FPCB, but is not limited thereto. Adhesion regions corresponding to adhesive layers 1041 may be formed on the first transparent dielectric substrate 1000*a* and the second dielectric substrate 1000*b*, respectively.

Referring to (b) of FIG. 24A, a glass panel 310 with a transparent region 311 and an opaque region 312 may be manufactured. In addition, an antenna assembly 1000 may be manufactured by coupling at least one second dielectric substrate 1000*b* to a lower region of the first transparent dielectric substrate 1000*a*. The first transparent dielectric substrate 1000*a* and the second dielectric substrate 1000*b* may be coupled through ACF bonding or low-temperature soldering to be implemented as a transparent antenna assembly. Through this, a first conductive pattern formed on the first transparent dielectric substrate 1000*a* may be electrically connected to a second conductive pattern formed on the second dielectric substrate 1000*b*. When a plurality of antenna elements are implemented on the glass panel 310, a feeding structure 1100*f* manufactured by the second dielectric substrate 1000*b* may also be implemented as a plurality of feeding structures.

Referring to (c) of FIG. 24A, the transparent antenna assembly 1000 may be attached to the glass panel 310. In this regard, the first transparent dielectric substrate 1000*a* on which the transparent electrode layer is formed may be arranged in the transparent region 311 of the glass panel 310. Meanwhile, the second dielectric substrate 1000*b*, which is an opaque substrate, may be arranged in the opaque region 312 of the glass panel 310.

Referring to (d) of FIG. 24A, the first transparent dielectric substrate 1000*a* and the second dielectric substrate 1000*b* may be bonded at a first position P1. A connector part 313, such as a Fakra cable, may be bonded to the second dielectric substrate 1000*b* at a second position P2. The transparent antenna assembly 1000 may be coupled to a telematics control unit (TCU) 300 through the connector part 313. To this end, the second conductive pattern formed on the second dielectric substrate 1010*b* may be electrically connected to a connector on one end of the connector part 313. A connector on another end of the connector part 313 may be electrically connected to the TCU 300.

The antenna assembly of FIG. 24B may have a structural difference, compared to the antenna assembly of FIG. 24A, in that the opaque substrate is not manufactured separately but is manufactured integrally with the glass panel 310. The antenna assembly of FIG. 24B may be implemented in such a way that the feeding structure implemented as the opaque substrate is not manufactured as the FPCB but is directly printed on the glass panel 310.

Referring to (a) of FIG. 24B, the first transparent dielectric substrate 1000*a* on which the transparent electrode layer is formed may be manufactured. In addition, the glass panel 310 with the transparent region 311 and the opaque region 312 may be manufactured. In the process of manufacturing of the glass panel of the vehicle, metal wires/pads for connection of the connectors may be implemented (fired). Like heat lines implemented on the vehicle glass, a transparent antenna mounting portion may be implemented in a metal form on the glass panel 310. In this regard, the second conductive pattern may be implemented in a region where an adhesive layer 1041 is formed for electrical connection to the first conductive pattern of the first transparent dielectric substrate 1000*a*.

In this regard, the second dielectric substrate 1000*b* on which the second conductive pattern is formed may be manufactured integrally with the glass panel 310. The second dielectric substrate 1000*b* may be formed integrally with the glass panel 310 in the opaque region 312 of the glass panel 310. The frit pattern 312 may be removed from the opaque region 312 where the second dielectric substrate 1000*b* is formed. The second conductive pattern may be implemented on the second dielectric substrate 1000*b* by forming the feeding pattern 1120*f* and the ground patterns 1121*g* and 1122*g* on both sides of the feeding pattern 1120*f*.

Referring to (b) of FIG. 24B, the transparent antenna assembly 1000 may be attached to the glass panel 310. In this regard, the first transparent dielectric substrate 1000*a* on which the transparent electrode layer is formed may be arranged in the transparent region 311 of the glass panel 310. The antenna assembly 1000 may be manufactured by coupling at least one second dielectric substrate 1000*b* to the lower region of the first transparent dielectric substrate 1000*a*. The first transparent dielectric substrate 1000*a* and the second dielectric substrate 1000*b* may be coupled through ACF bonding or low-temperature soldering to be implemented as a transparent antenna assembly. Through this, a first conductive pattern formed on the first transparent dielectric substrate 1000*a* may be electrically connected to a second conductive pattern formed on the second dielectric substrate 1000*b*. When a plurality of antenna elements are implemented on the glass panel 310, a feeding structure 1100*f* manufactured by the second dielectric substrate 1000*b* may also be implemented as a plurality of feeding structures.

Referring to (c) of FIG. 24B, the first transparent dielectric substrate 1000*a* and the second dielectric substrate 1000*b* may be bonded at a first position P1. The connector part 313, such as a Fakra cable, may be bonded to the second dielectric substrate 1000*b* at a second position P2. The transparent antenna assembly 1000 may be coupled to the TCU 300 through the connector part 313. To this end, the second conductive pattern formed on the second dielectric substrate 1010*b* may be electrically connected to a connector on one end of the connector part 313. A connector on another end of the connector part 313 may be electrically connected to the TCU 300.

Figure 25:
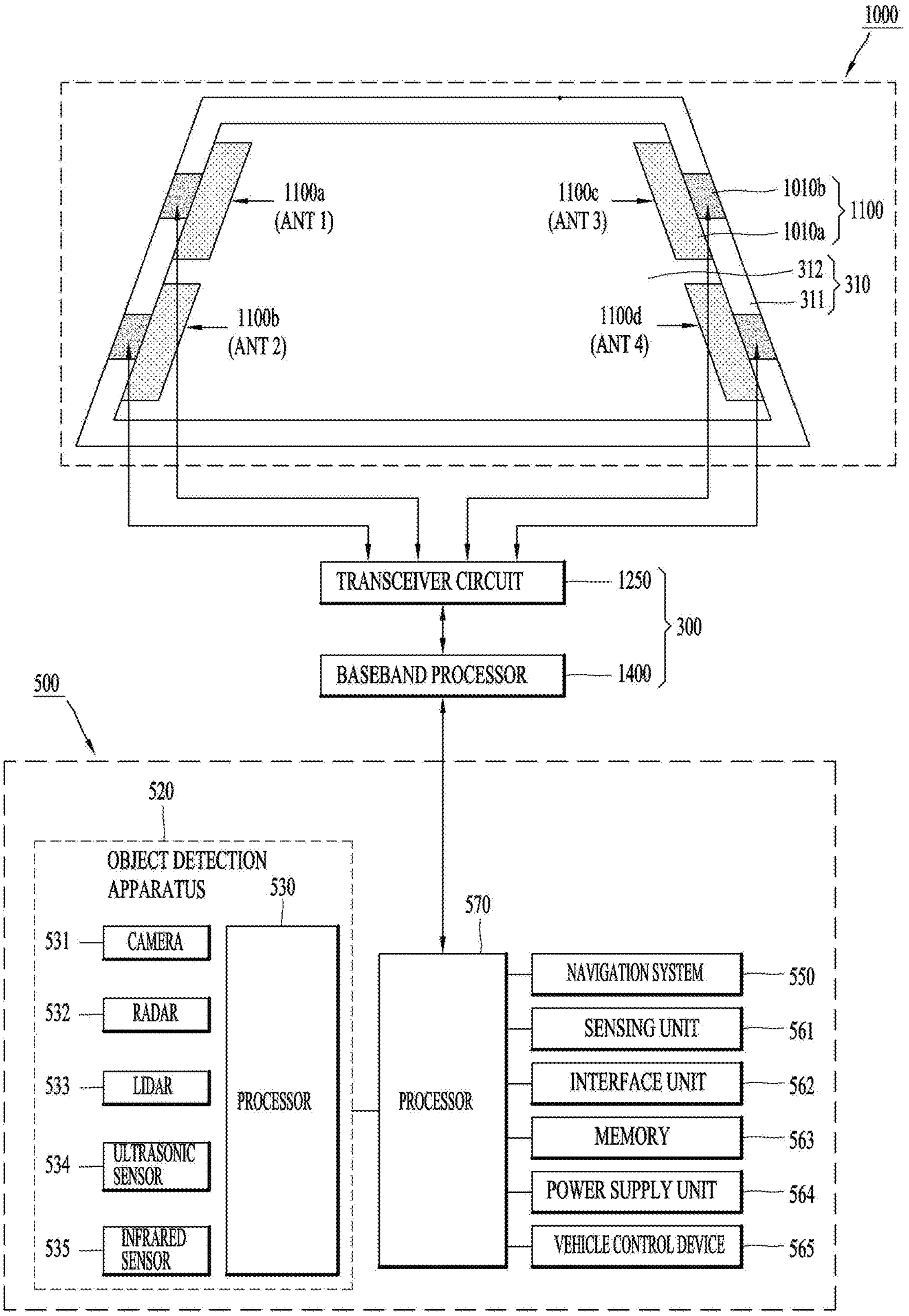
FIG. 25 is a view of a configuration in which a plurality of antenna modules arranged at different positions of a vehicle according to the disclosure are coupled with other components of the vehicle.

Hereinafter, a vehicle having an antenna module according to one aspect of the specification will be described in detail. FIG. 25 is a view of an example of a configuration in which a plurality of antenna modules arranged at different positions of a vehicle are coupled with other components of the vehicle.

Referring to FIGS. 1 to 25, the vehicle 500 may include a conductive vehicle body operating as an electrical ground. The vehicle 500 may include a plurality of antennas 1100*a* to 1100*d* that may be arranged at different positions on the glass panel 310. The antenna assembly 1000 may include the plurality of antennas 1100*a* to 1100*d* and a communication module 300. The communication module 300 may include a transceiver circuit 1250 and a processor 1400. The communication module 300 may correspond to the TCU of the vehicle or may constitute at least a portion of the TCU.

The vehicle 500 may include an object detection device 520 and a navigation system 550. The vehicle 500 may further include a separate processor 570 in addition to the processor 1400 included in the communication module 300. The processor 1400 and the separate processor 570 may be physically or functionally separated and may be implemented on one substrate. The processor 1400 may be implemented as a TCU, and the processor 570 may be implemented as an electronic control unit (ECU).

In the case where the vehicle 500 is an autonomous vehicle, the processor 570 may be an autonomous driving control unit (ADCU) integrated with the ECU. Based on information detected by a camera 531, radar 532, and/or LiDAR 533, the processor 570 may search for a path and control the vehicle 500 to be accelerated or decelerated. To this end, the processor 570 may interwork with a processor 530 corresponding to a micro control unit (MCU) within the object detection device 520 and/or the communication module 300 corresponding to the TCU.

The vehicle 500 may include the first transparent dielectric substrate 1010*a* and the second dielectric substrate 1010*b* arranged on the glass panel 310. The first transparent dielectric substrate 1010*a* may be formed inside the glass panel 310 of the vehicle or may be attached to the surface of the glass panel 310. The first transparent dielectric substrate 1010*a* may be configured such that conductive patterns in the shape of metal mesh grids are formed. The vehicle 500 may include an antenna module 1100 having conductive patterns formed in a metal mesh shape on one side of the dielectric substrate 1010 to radiate radio signals.

The antenna assembly 1000 may include a first antenna module 1100*a* to a fourth antenna module 1100*d* to perform MIMO. The first antenna module 1100*a*, the second antenna module 1100*b*, the third antenna module 1100*c*, and the fourth antenna module 1100*d* may be arranged on the upper left, lower left, upper right, and lower right sides of the glass panel 310, respectively. The first antenna module 1100*a* to the fourth antenna module 1100*d* may be referred to as a first antenna ANT1 to a fourth antenna ANT4, respectively. The first antenna ANT1 to the fourth antenna ANT4 may be referred to as a first antenna module ANT1 to a fourth antenna module ANT4, respectively.

As described above, the vehicle 500 may include the telematics control unit (TCU) 300, which corresponds to the communication module. The TCU 300 may control signals to be received and transmitted through at least one of the first to fourth antenna modules 1100*a* to 1100*d*. The TCU 300 may include a transceiver circuit 1250 and a processor 1400.

Accordingly, the vehicle may further include the transceiver circuit 1250 and the processor 1400. A portion of the transceiver circuit 1250 may be arranged in units of antenna modules or in combination thereof. The transceiver circuit 1250 may control a radio signal of at least one of first to third frequency bands to be radiated through the antenna modules ANT1 to ANT4. The first to third frequency bands may be a low band (LB), a mid band (MB), and a high band (HB) for 4G/5G wireless communications, but are not limited thereto.

The processor 1400 may be operably coupled to the transceiver circuit 1250 and may be configured as a modem operating in a baseband. The processor 1400 may receive or transmit a signal through at least one of the first antenna module ANT1 and the second antenna module ANT2. The processor 1400 may perform a diversity operation or MIMO using the first antenna module ANT1 and the second antenna module ANT2 such that a signal is transmitted to the inside of the vehicle.

Antenna modules may be arranged in different regions of one side surface and another side surface of the glass panel 310. The antenna modules may perform MIMO by simultaneously receiving signals from the front of the vehicle. In this regard, to perform 4×4 MIMO, the antenna modules may further include the third antenna module ANT3 and the fourth antenna module ANT4 in addition to the first antenna module ANT1 and the second antenna module ANT2.

The processor 1400 may select an antenna module to perform communication with an entity communicating with the vehicle based on a driving path of the vehicle and a communication path with the entity. The processor 1400 may perform MIMO by using the first antenna module ANT1 and the second antenna module ANT2 based on a direction that the vehicle travels. Alternatively, the processor 1400 may perform MIMO through the third antenna module ANT2 and the fourth antenna module ANT4 based on the direction that the vehicle travels.

The processor 1400 may perform MIMO in a first band through at least two of the first antenna ANT1 to the fourth antenna ANT4. The processor 1400 may perform MIMO in at least one of a second band and a third band through at least two of the first antenna ANT1 to the fourth antenna ANT4.

Accordingly, when signal transmission/reception performance of the vehicle deteriorates in any one band, signal transmission/reception in the vehicle may be performed in other bands. For example, the vehicle may preferentially perform communication linkage in the first band, which is the low band, for wide communication coverage and linkage reliability, and then perform communication linkage in the second and third bands.

The processor 1400 may control the transceiver circuit 1250 to perform carrier aggregation (CA) or dual connectivity (DC) through at least one of the first antenna ANT1 to the fourth antenna ANT4. In this regard, a communication capacity may be expanded through the aggregation of the second band and the third band, which are wider than the first band. In addition, communication reliability may be improved through the DC with neighboring vehicles or entities by using the plurality of antenna elements arranged at the different regions of the vehicle.

The foregoing description has been given of the broadband transparent antenna assembly that may be arranged on the vehicle glass and the vehicle having the same. Hereinafter, the technical effects of a broadband transparent antenna assembly that may be arranged on vehicle glass and a vehicle having the same will be described.

According to the specification, 4G/5G broadband wireless communications in a vehicle may be enabled by providing a broadband transparent antenna assembly having a plurality of conductive patterns that may be arranged on vehicle glass.

According to the specification, the shapes of conductive patterns in a broadband transparent antenna assembly, which may be arranged on vehicle glass, may be optimized, and antenna efficiency may be improved through an asymmetrical conductive pattern structure.

According to the specification, first and second radiation structures may be formed in a symmetrical structure in one axial direction, thereby improving isolation characteristics between the first and second radiation structures.

According to the specification, first and second radiation structures may be formed in a symmetrical structure along one axis while internal conductive patterns may be formed in an asymmetrical structure, thereby performing a multi-input/multi-output (MIMO) operation with improved isolation characteristics for each of a plurality of frequency bands.

According to the specification, the end of a conductive pattern of a transparent dielectric substrate and the end of a conductive pattern of an opaque substrate may be interconnected to overlap each other, thereby reducing feeding loss.

According to the specification, a broadband antenna structure made of a transparent material may be implemented, which may improve antenna efficiency by setting a different antenna operation mode for each frequency band while reducing feeding loss.

According to the specification, the efficiency of a feeding structure of a broadband transparent antenna assembly may be improved by coupling a feeding pattern of the feeding structure, which is implemented with an opaque substrate arranged in an opaque region of vehicle glass, directly with a transparent antenna.

According to the specification, the reliability of a mechanical structure including a feeding structure, may be secured by coupling a feeding pattern of the feeding structure and a conductive pattern of an antenna module through low-temperature bonding.

According to the specification, the difference in visibility between a region where an antenna made of a transparent material is arranged and other regions may be minimized by forming open dummy regions, in which slits are formed, in a dielectric region.

According to the specification, the boundary of an antenna region and the boundary of a dummy pattern region may be spaced apart by a certain gap, thereby securing the invisibility of a transparent antenna and an antenna assembly including the same without deterioration of antenna performance.

According to the specification, an open dummy structure may be formed such that an intersection between metal lines of a dummy region or a point of the corresponding metal line is disconnected, thereby securing the invisibility of a transparent antenna and an antenna assembly including the same without deterioration of antenna performance.

According to the specification, the visibility of a transparent antenna may be improved without deterioration of antenna performance through an optimal design of slits of a dummy pattern having an open region and an open region with a radiator region.

According to the specification, a broadband antenna structure made of a transparent material may be provided through vehicle glass or a display region of an electronic device, thereby reducing feeding loss and improving antenna efficiency while operating in a wide band.

According to the specification, a transparent antenna structure, which is capable of performing wireless communications in 4G and 5G frequency bands while minimizing the variation of antenna performance and a difference in transparency between an antenna region and a surrounding region, may be provided.

Further scope of applicability of the disclosure will become apparent from the following detailed description. It should be understood, however, that the detailed description and specific examples, such as the preferred embodiments, are given by way of illustration only, since various changes and modifications within the spirit and scope of the disclosure will be apparent to those skilled in the art.

In relation to the aforementioned disclosure, the design and operations of an antenna assembly having transparent antennas and a vehicle controlling the same may be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. A glass panel assembly comprising:
an antenna assembly comprising a dielectric substrate;
a first region comprising antenna elements having conductive patterns on one side of the dielectric substrate, wherein a portion of the conductive patterns are configured to radiate radio signals; and
a second region comprising ground conductive patterns and feeding patterns,
wherein each of the antenna elements comprises:
a first radiation structure comprising:
a first conductive pattern comprising a first part and a second part, wherein the first part is substantially perpendicularly connected to the second part, and the second part is electrically connected to a first feeding pattern of the feeding patterns;
a second conductive pattern electrically connected to a first part of a first ground conductive pattern of the ground conductive patterns; and
a third conductive pattern electrically connected to a second part of the first ground conductive pattern,
wherein:
a size of the second conductive pattern is smaller than a size of the third conductive pattern;
the second conductive pattern is arranged between the first part of the first conductive pattern and the first ground conductive pattern;
an area of the third conductive pattern is larger than an area of the first conductive pattern; and
the first part of the first conductive pattern and the third conductive pattern are arranged on opposite sides with respect to the second part of the first conductive pattern; and
a second radiation structure comprising:
a fourth conductive pattern comprising a third part and a fourth part, wherein the third part is substantially perpendicularly connected to the fourth part, and the fourth part is electrically connected to a second feeding pattern of the feeding patterns;
a fifth conductive pattern electrically connected to a first part of a second ground conductive pattern of the ground conductive patterns; and
a sixth conductive pattern electrically connected to a second part of the second ground conductive pattern,
wherein:
a size of the fifth conductive pattern is smaller than a size of the sixth conductive pattern;
the fifth conductive pattern is arranged between the third part of the fourth conductive pattern and the second ground conductive pattern;
an area of the sixth conductive pattern is larger than an area of the fourth conductive pattern; and
the third part of the fourth conductive pattern and the sixth conductive pattern are arranged on opposite sides with respect to the fourth part of the fourth conductive pattern, and
the third conductive pattern of the first radiation structure is spaced apart from the sixth conductive pattern of the second radiation structure.

2. The glass panel assembly of claim 1, further comprising a plurality of heat line patterns,
wherein one of the plurality of heat line patterns is spaced apart from the antenna elements by a first gap.

3. The glass panel assembly of claim 1, wherein:
the dielectric substrate comprises a first dielectric substrate and a second dielectric substrate,
the antenna elements are disposed on the first dielectric substrate, and
the second dielectric substrate comprises the ground conductive patterns and feeding patterns.

4. The glass panel assembly of claim 1, wherein:
a length of the first ground conductive pattern in a first direction is less than a distance from the first conductive pattern to the third conductive pattern in the first direction, and
a length of the first ground conductive pattern in a second direction perpendicular to the first direction is less than a distance from the first conductive pattern to the first ground conductive pattern in the second direction.

5. The glass panel assembly of claim 1, wherein:
the first conductive pattern and the third conductive pattern are configured to operate in a first dipole antenna mode in a first frequency band,
the first conductive pattern and the third conductive pattern form an asymmetrical structure,
the fourth conductive pattern and the sixth conductive pattern are configured to operate in a second dipole antenna mode in the first frequency band, and the fourth conductive pattern and the sixth conductive pattern form an asymmetrical structure.

6. The glass panel assembly of claim 5, wherein:

the first conductive pattern is configured to operate in a first monopole antenna mode in a second frequency band, the fourth conductive pattern is configured to operate in a second monopole antenna mode in the second frequency band, and the second frequency band is higher than the first frequency band.

7. The glass panel assembly of claim 6, wherein:

the second conductive pattern is configured to operate in a third frequency band, the fifth conductive pattern is configured to operate in the third frequency band, and the third frequency band is higher than the second frequency band.

8. The glass panel assembly of claim 1, wherein:

a first boundary side of the first part of the first conductive pattern has a first stepped structure, a second boundary side of the first part of the first conductive pattern has a second stepped structure different from the first stepped structure, a third boundary side of the first part of the first conductive pattern is arranged between a first end of the first boundary side of the first part of the first conductive pattern and a first end of the second boundary side of the first part of the first conductive pattern, and a fourth boundary side of the first part of the first conductive pattern is arranged between a second end of the first boundary side of the first part of the first conductive pattern and a second end of the second boundary side of the first part of the first conductive pattern.

9. The glass panel assembly of claim 8, wherein:

a portion of the first boundary side of the first part of the first conductive pattern opposes a first boundary side of the second conductive pattern, and a portion of a first boundary side of the second part of the first conductive pattern opposes a second boundary side of the second conductive pattern.

10. The glass panel assembly of claim 8, wherein:

a first boundary side of the third conductive pattern has a third stepped structure, a first end of the first boundary side of the third conductive pattern is connected to the second part of the first ground conductive pattern, a second boundary side of the third conductive pattern is arranged opposite to the first boundary side of the third conductive pattern, a third boundary side of the third conductive pattern is arranged between a first end of the first boundary side of the third conductive pattern and a first end of the second boundary side of the third conductive pattern, a fourth boundary side of the third conductive pattern is arranged between a second end of the first boundary side of the third conductive pattern and a second end of the second boundary side of the third conductive pattern, the third boundary side of the third conductive pattern is arranged opposite to the fourth boundary side of the fourth conductive pattern, and the second part of the first conductive pattern opposes the fourth boundary side of the third conductive pattern.

11. The glass panel assembly of claim 10, wherein a length of the third boundary side of the third conductive pattern is equal to a length of the third boundary side of the first conductive pattern.

12. The glass panel assembly of claim 1, wherein:

a first part of the second region comprises a first slot, a length of the first slot is in a range of λ/2 to λ, and an open region of the first slot opposes the feeding patterns.

13. The glass panel assembly of claim 1, wherein:

a second part of the second region comprises a second slot, a length of the second slot is in a range of λ/2 to λ, and an open region of the second slot opposes the first region.

14. The glass panel assembly of claim 1, wherein the first conductive pattern, the second conductive pattern, and the third conductive pattern are formed in a metal mesh shape with a plurality of open regions on the dielectric substrate, and the first conductive pattern, the second conductive pattern, and the third conductive pattern are configured to form a coplanar waveguide (CPW) structure on the dielectric substrate.

15. The glass panel assembly of claim 1, wherein:

the antenna assembly comprises a plurality of dummy metal grid patterns at an outside portion of the first region on the dielectric substrate, the plurality of dummy metal grid patterns are not connected to the feeding patterns and the ground conductive patterns, and the plurality of dummy metal grid patterns are separated from each other.

* * * * *